(12) United States Patent
Kang et al.

(10) Patent No.: US 7,028,127 B2
(45) Date of Patent: Apr. 11, 2006

(54) METHOD OF CONTROLLING PORTABLE PERSONAL DEVICE HAVING FACILITIES FOR STORING AND PLAYING DIGITAL CONTENTS BY COMPUTER AND PORTABLE PERSONAL DEVICE OPERATION METHOD THEREFOR

(75) Inventors: Chun-un Kang, Seoul (KR); Dong-jin Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 884 days.

(21) Appl. No.: 09/758,127

(22) Filed: Jan. 12, 2001

(65) Prior Publication Data

US 2001/0038032 A1    Nov. 8, 2001

(30) Foreign Application Priority Data

Jan. 18, 2000    (KR) ................................. 2000-2224

(51) Int. Cl.
*G06F 13/00* (2006.01)

(52) U.S. Cl. ....................................... 710/303; 710/104
(58) Field of Classification Search .................. 710/15, 710/16, 10, 3, 6, 61, 36, 72, 104, 303; 709/200, 709/214, 250; 714/48, 724, 733, 734
See application file for complete search history.

(56) References Cited

U.S. PATENT DOCUMENTS

| 5,941,965 | A  | * | 8/1999 | Moroz et al. ................ 710/303 |
| 6,199,122 | B1 | * | 3/2001 | Kobayashi .................... 710/36 |
| 6,408,350 | B1 | * | 6/2002 | Kawamura et al. ........... 710/62 |
| 6,601,056 | B1 | * | 7/2003 | Kagle et al. .................... 707/1 |
| 6,609,167 | B1 | * | 8/2003 | Bastiani et al. ............. 710/104 |

FOREIGN PATENT DOCUMENTS

| CN | 1101776 A | 4/1995 |
| CN | 1178927 A | 4/1998 |

* cited by examiner

*Primary Examiner*—Khanh Dang
(74) *Attorney, Agent, or Firm*—Sughrue Mion, PLLC

(57) ABSTRACT

A method for controlling a portable personal device having facilities for storing and playing digital contents by a computer and an operation method of the portable personal device thereby are provided. The operation method of the portable personal device by control from a computer through a serial or parallel cable has the steps of (a) receiving a format request command from the computer for formatting an internal memory installed in the portable personal device or an external memory in an external memory card; (b) sending from the portable personal device a signal indicating that the portable personal device is ready to format to the computer; (c) receiving an execution command from the computer for executing the format request command received in the step (a); and (d) formatting the corresponding memory and then sending the result to the computer.

95 Claims, 58 Drawing Sheets

COMPUTER

PORTABLE PERSONAL DEVICE
(FOR EXAMPLE, MP3 PLAYER)

COMPUTER

DOCKING STATION

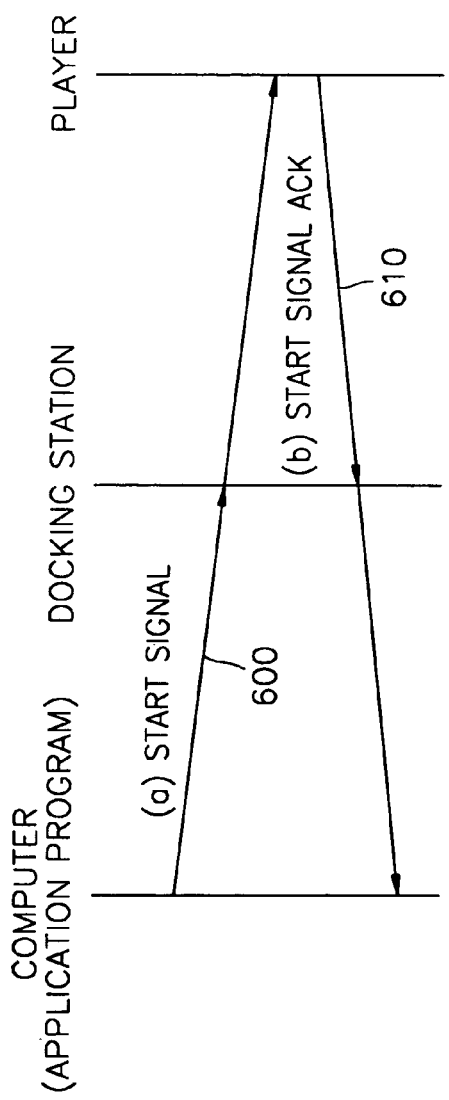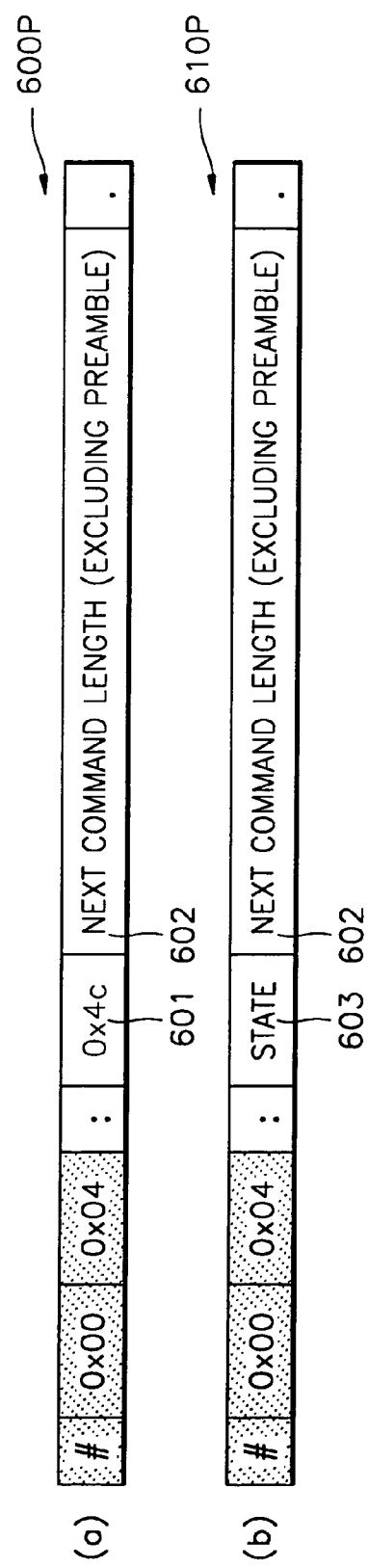

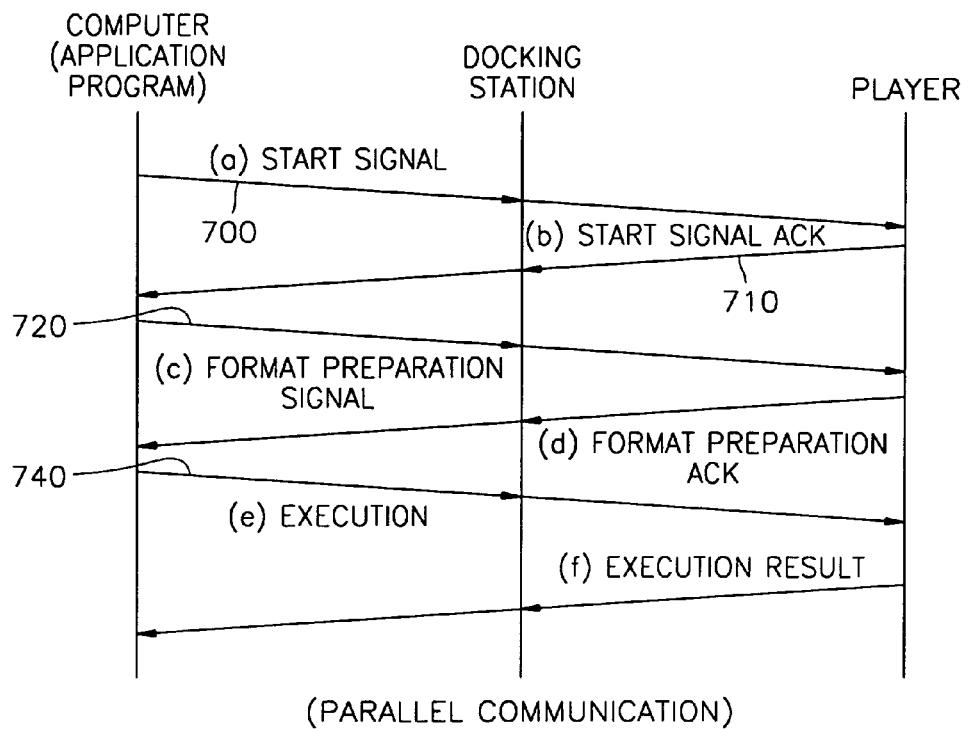
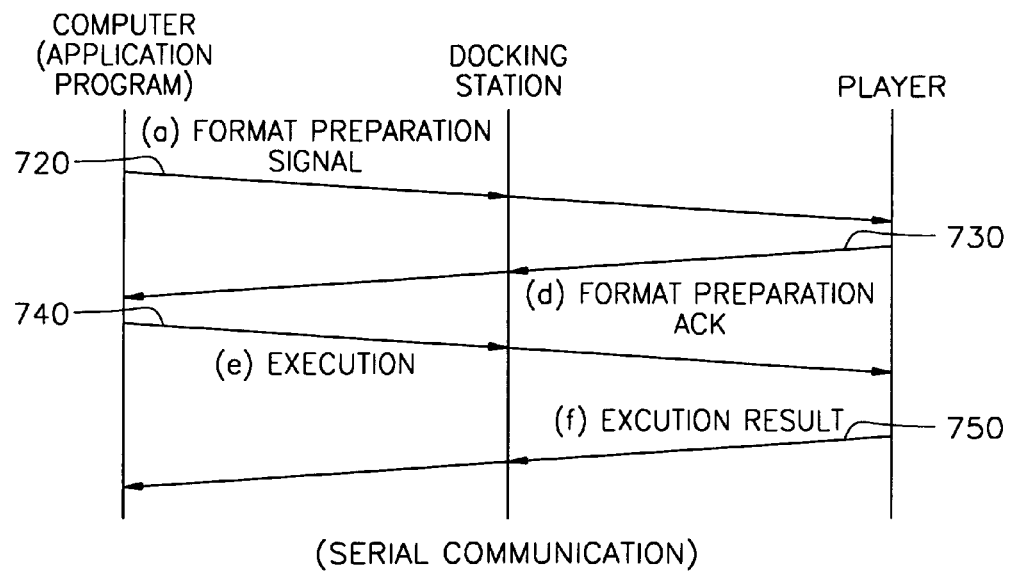

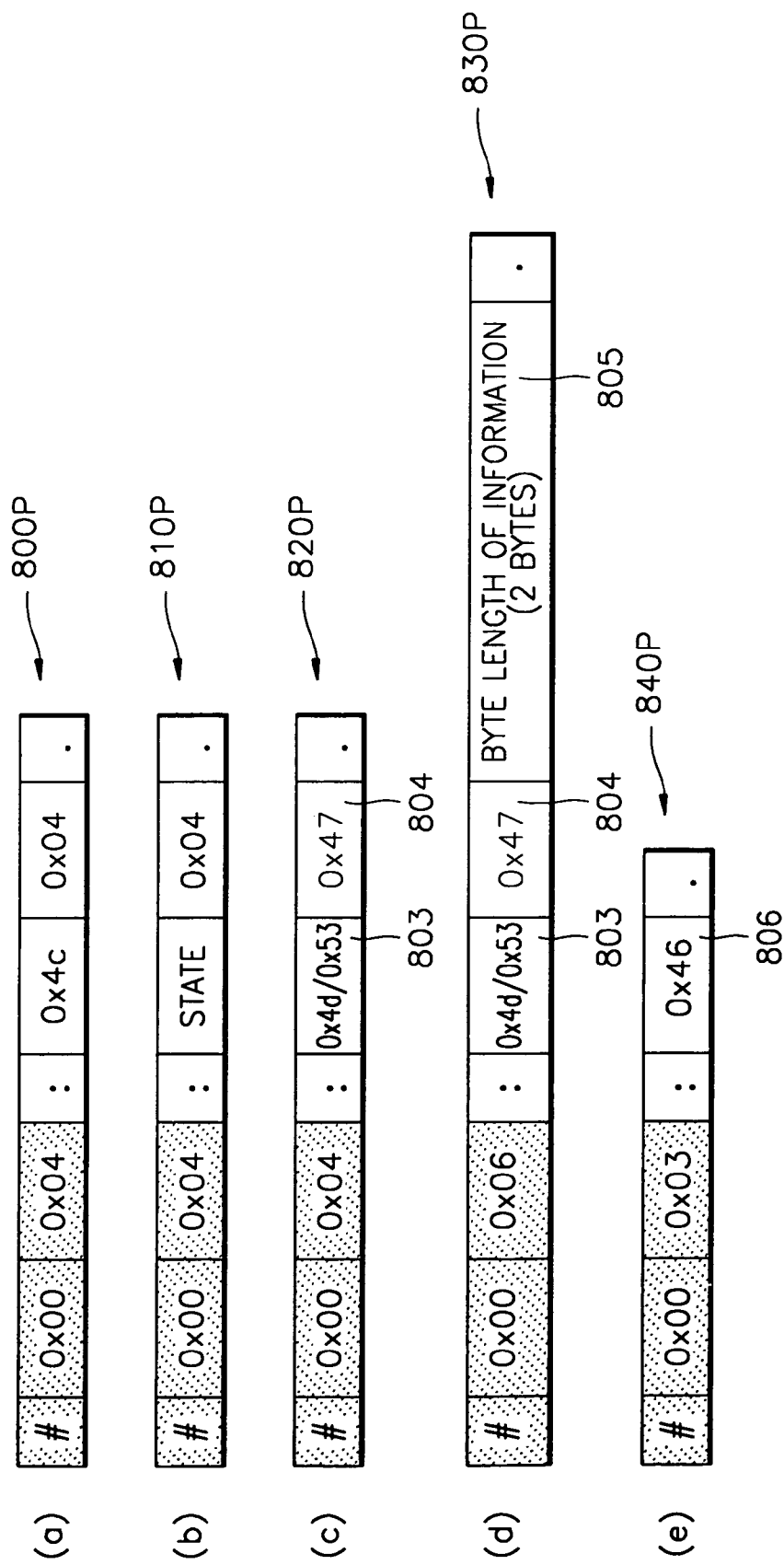

(PARALLEL COMMUNICATION)

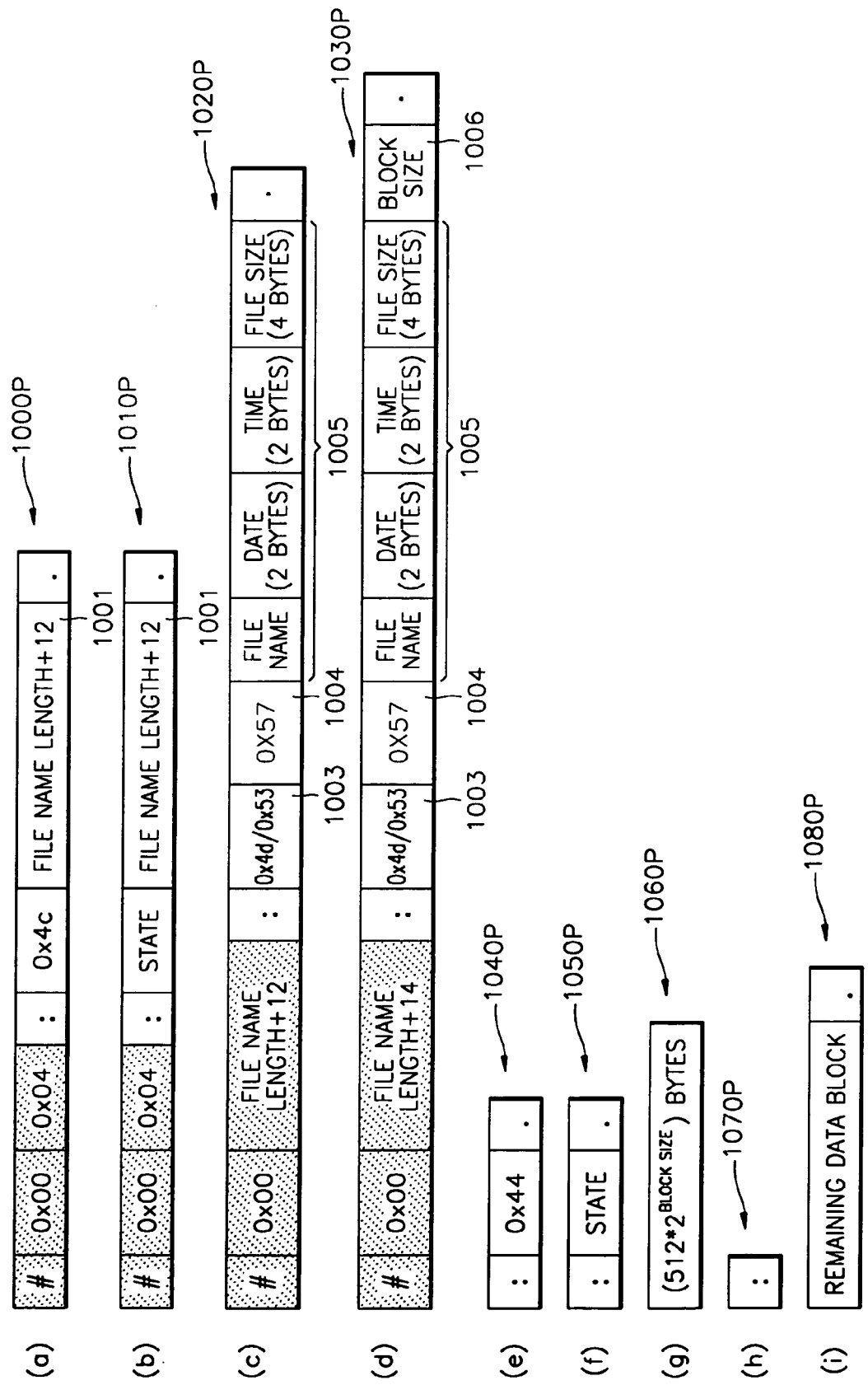

(PARALLEL COMMUNICATION)

(SERIAL COMMUNICATION)

(PARALLEL COMMUNICATION)

(SERIAL COMMUNICATION)

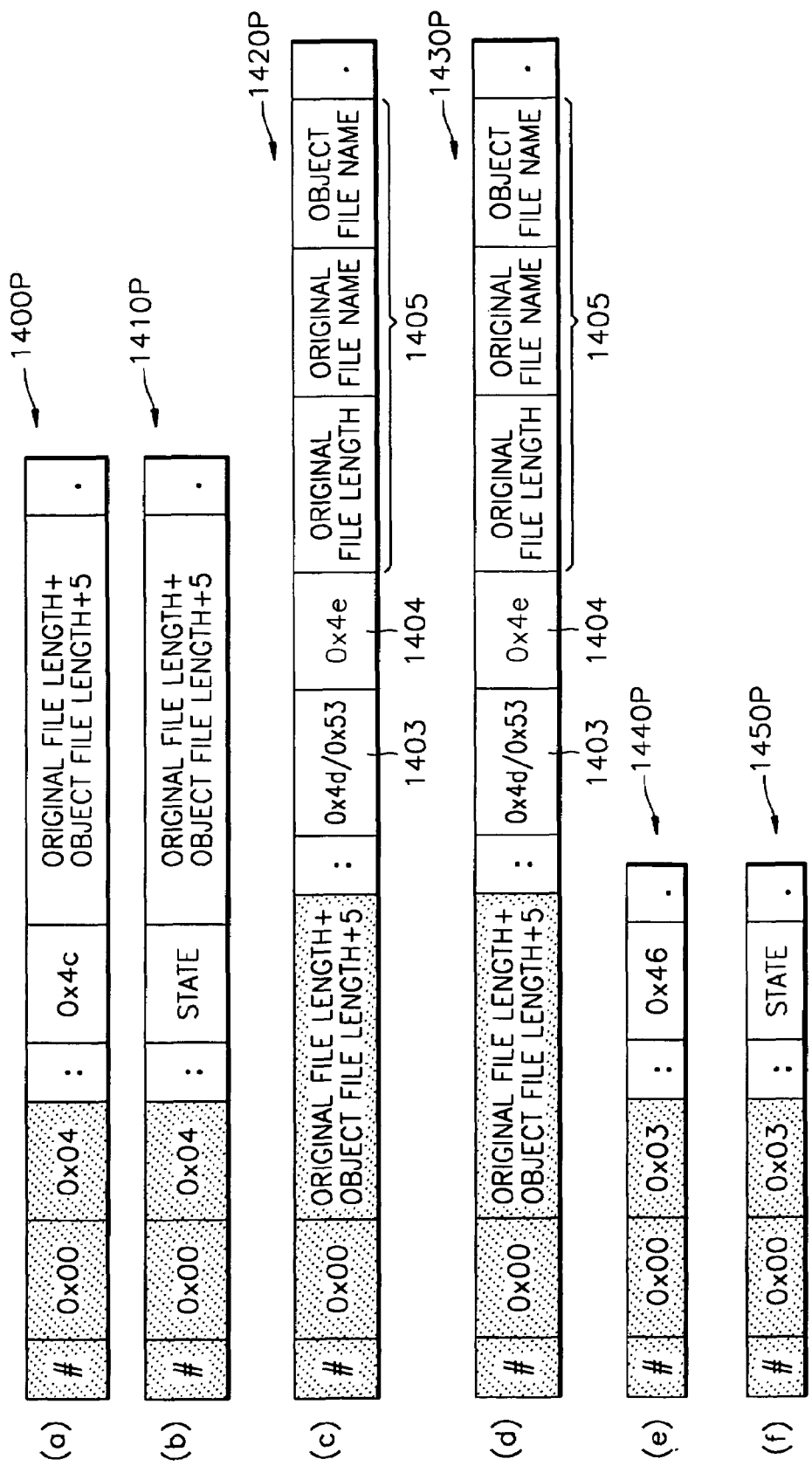

(PARALLEL COMMUNICATION)

(SERIAL COMMUNICATION)

(PARALLEL COMMUNICATION)

(SERIAL COMMUNICATION)

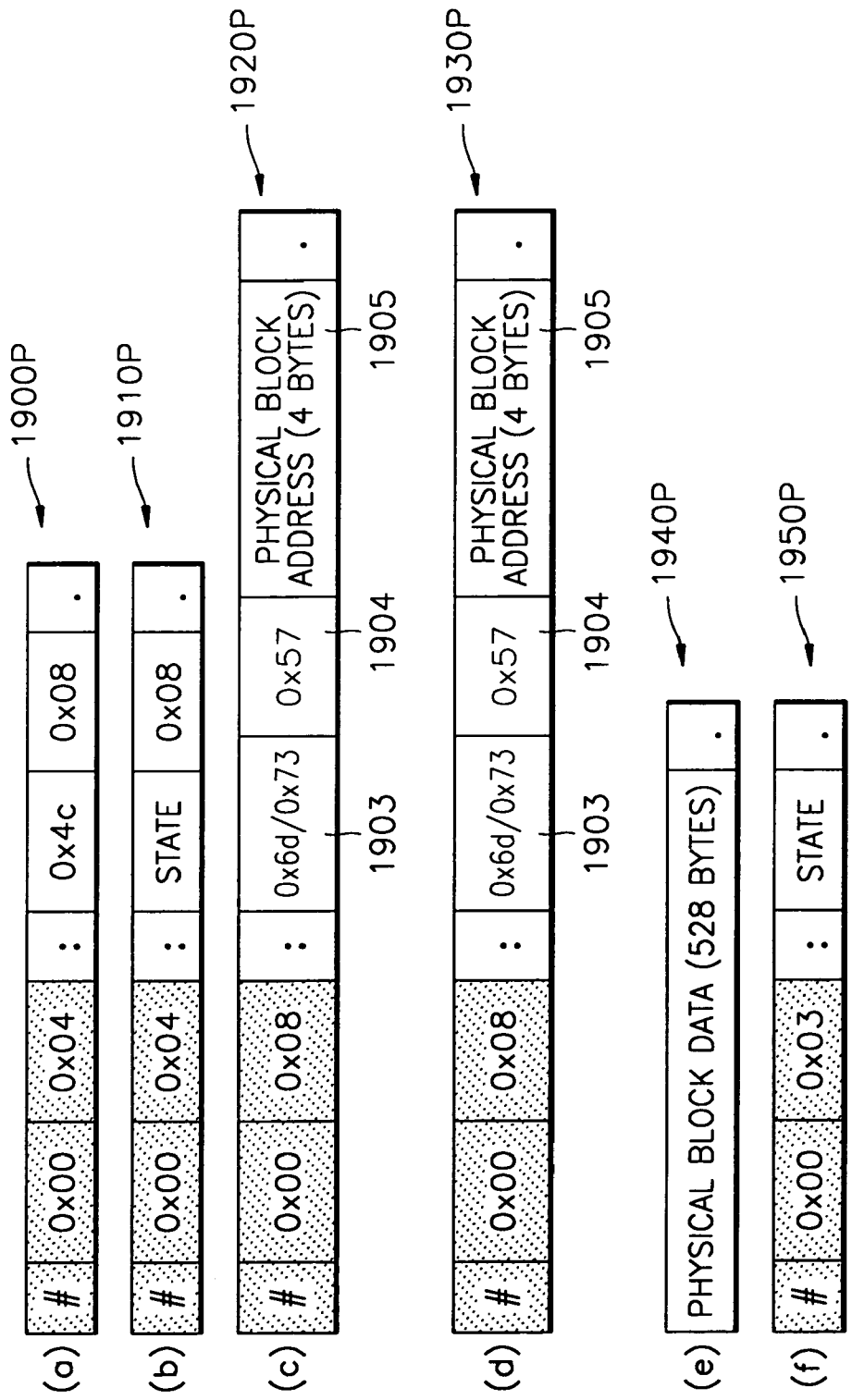

(PARALLEL COMMUNICATION)

(SERIAL COMMUNICATION)

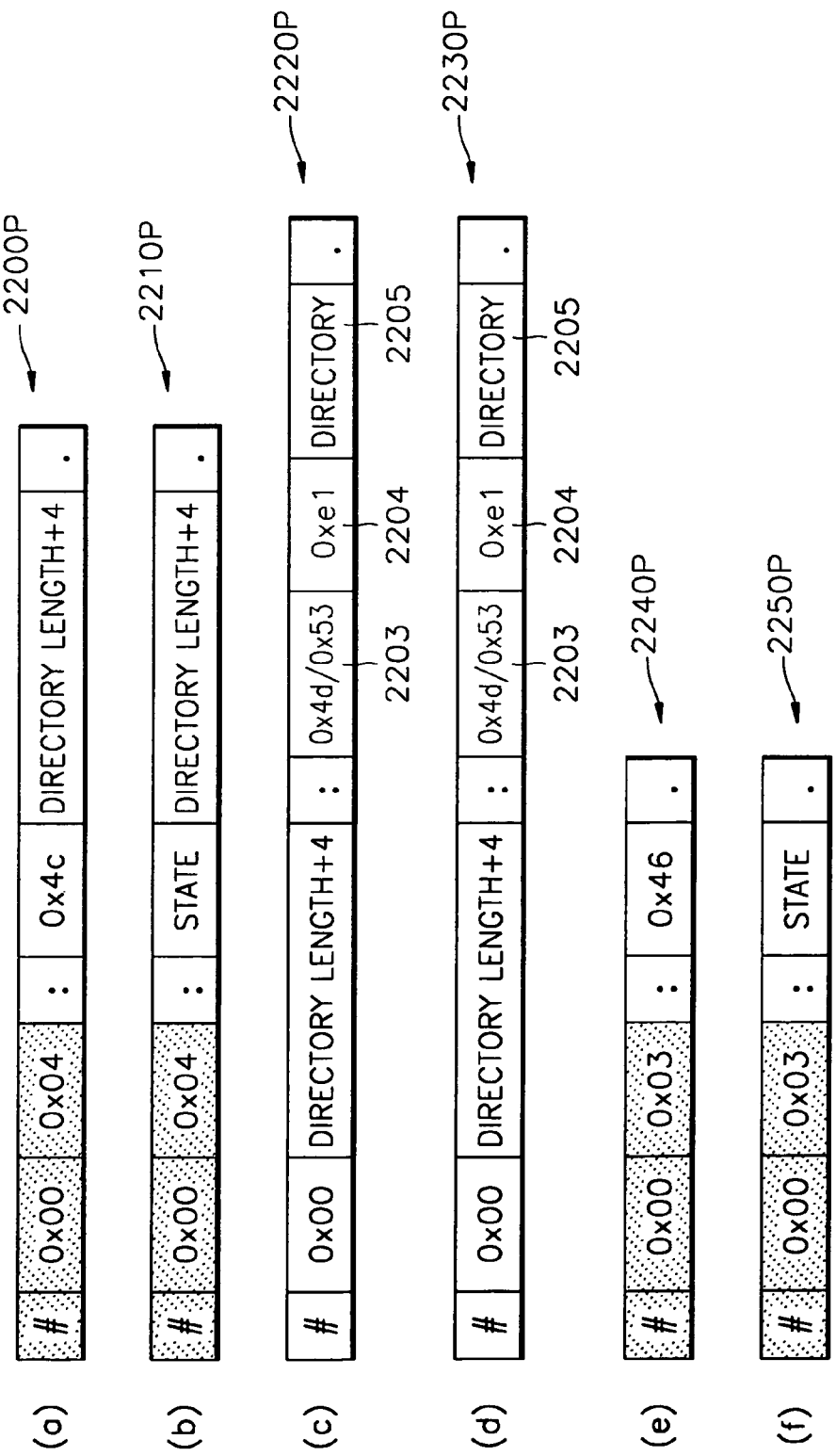

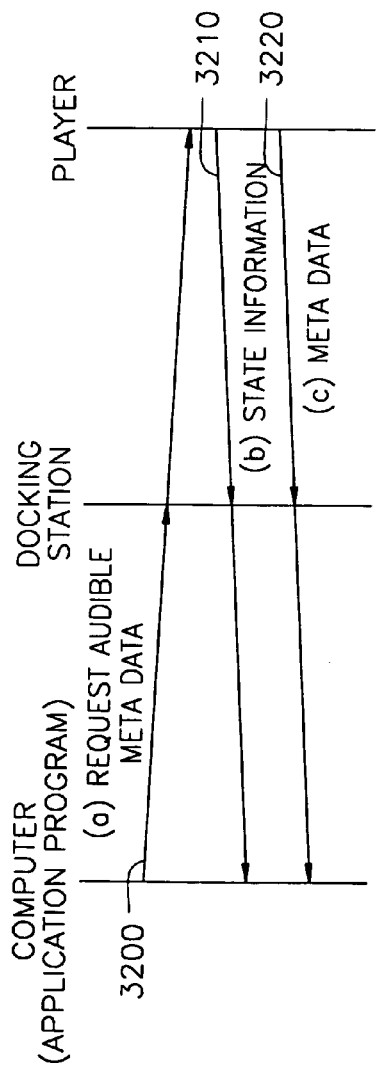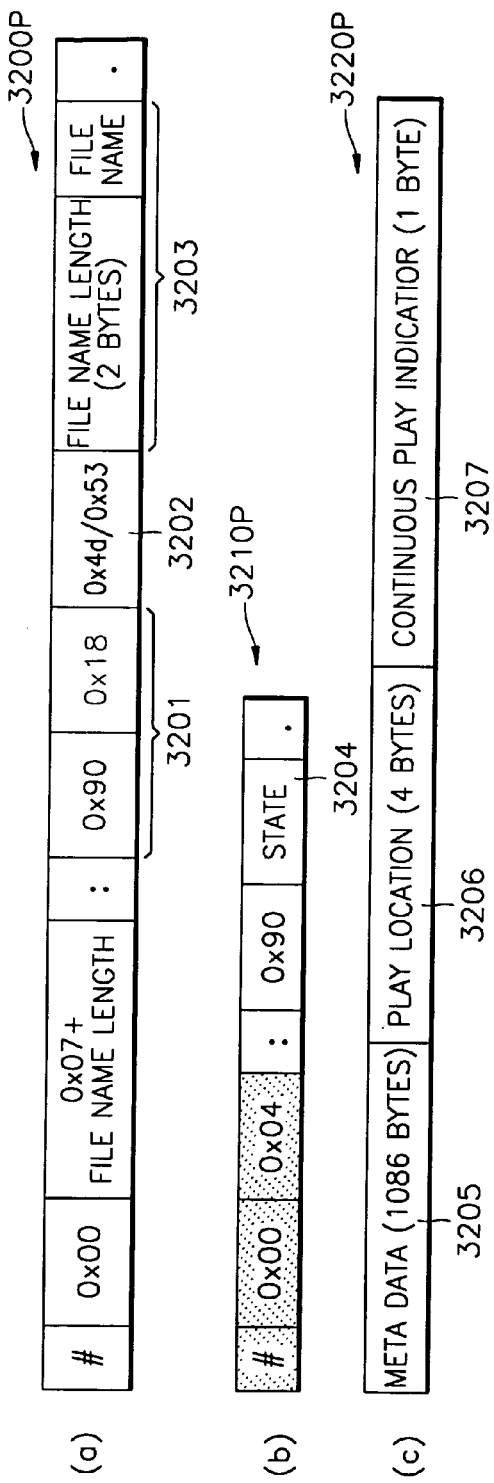

METHOD OF CONTROLLING PORTABLE PERSONAL DEVICE HAVING FACILITIES FOR STORING AND PLAYING DIGITAL CONTENTS BY COMPUTER AND PORTABLE PERSONAL DEVICE OPERATION METHOD THEREFOR

BACKGROUND OF THE INVENTION

1. Field of the Invention

The present invention relates to a portable personal device having facilities for storing and playing digital information (hereinafter, referred to as contents), and more particularly, to a method of controlling a portable personal device having facilities for storing and playing digital contents through a computer and the operation method of a portable personal device therefor. The present application is based on Korean Patent Application No. 00-2224, which is incorporated herein by reference.

2. Description of the Related Art

Among portable personal devices which have facilities for storing and playing sound, there is a small size cassette player. When a cassette player has recording facilities for voice or musical sound, it is referred to as a cassette recorder. Contents recorded or reproduced by the cassette player or cassette recorder are analog-type data.

However, in line with the development of digital technologies, such as a small size compact disc (CD) player, the portable personal device which can store contents in a digital format and has facilities for reproducing these digital data, has been developed. Generally, a CD player which adopts a digital format does not offer a recording function, but gives an improved sound quality compared to that of an analogue-type cassette player.

Also, in line with development of computer-related technologies, particularly with development of multimedia technologies, contents can be produced and stored in a variety of digital format files, and software players which can reproduce contents stored in these digital files through a computer have been developed. Among the types of those digital files, there are Microsoft's wave, Progressive Network's real audio (ra), and moving picture experts group (MPEG)'s MP3(MPEG1 Layer 3). Also, contents which can be stored in a digital file in a computer can include not only voice or musical sound, but also images. Among the types of these image files, are quicktime image, MPEG image, etc.

Meanwhile, next-generation products in which computer digital technologies are applied to a portable personal device, such as a hardware player, are being developed. The MP3 player is one example of these products.

The MP3 player manages digital contents in a memory in the form of a file and has a central processing unit (CPU) for controlling internal operations. Generally, having a serial port or parallel port, the MP3 player has communication functions (for example, a function for downloading a file) through a serial or parallel cable to a computer.

At present, however, there exist no standardized protocols defining a communication method between the MP3 player and a computer. Therefore, each MP3 player developer develops its own application program to support communications with its MP3 player so that communications between a computer and the MP3 player can be supported. However, this results in lack of compatibility between MP3 systems of different developers, because they each developed their own respective communication methods between an MP3 player and a computer. That is, the MP3 player of each MP3 developer can communicate only with a computer that has the communication application program of its own MP3 developer, and cannot communicate with those computers that have communication application programs of other MP3 developers.

The lack of compatibility due to the lack of a standardized communication protocol hinders mass production, and also puts barriers in the development period of communication application programs, and in quality verification of MP3 players. Also, the lack of a standardized communication protocol causes the entire communication module of an MP3 player and the corresponding communication program of a computer to be remade, when new functions are added or new models or products are developed.

SUMMARY OF THE INVENTION

To solve the above problems, it is an object of the present invention to provide a method of controlling a portable personal device having facilities for storing and playing digital contents by computer, and a portable personal device operation method therefor, after defining a communication protocol in which standardized interfaces through a serial or parallel cable between portable personal devices having facilities for storing and playing digital contents, such as an MP3 player, and a computer, are provided and functional extensibility and security function of digital contents are supported.

To accomplish the above object of the present invention, there is provided a operation method of a portable personal device having facilities for storing and playing digital contents by control from a computer through a serial or parallel cable, the method having the steps of (a) receiving a format request command from the computer through a serial or parallel cable for formatting an internal memory installed in the portable personal device or an external memory in an external memory card inserted from the outside; (b) when the portable personal device is ready to format, sending from the portable personal device through a serial or parallel cable a signal indicating that it is ready to format to the computer; (c) receiving an execution command from the computer through a serial or parallel cable for executing the format request command received in the step (a); and (d) when the execution command is received in the step (c), executing formatting the corresponding memory and then sending the result to the computer through a serial or parallel cable, in which the structure of the transmission data which is received or sent in the steps (a) through (d) includes a start separator character for indicating the start of transmission data, information on the length of the transmission data, an intermediate separator character for indicating the start of a command code or state information, the command code or state information, and an end separator character for indicating the end of transmission data.

To accomplish another object of the present invention, there is also provided an operation method of a portable personal device having facilities for storing and playing digital contents by control from a computer through a serial or parallel cable, the method having the steps of (a) receiving a refresh-directory request command from the computer through a serial or parallel cable for requesting the whole file information of a predetermined directory on an internal memory installed in the portable personal device or an external memory in an external memory card inserted from the outside; (b) when the portable personal device is ready to send the whole file information of the directory, sending from the portable personal device through a serial or parallel cable a signal indicating that it is ready for refresh-directory to the computer; (c) receiving an execution command from the computer through a serial or parallel cable for executing the refresh-directory request command received in the step (a); and (d) when the execution command is received in the step (c), sending file information including the file name, the file extension, the file attribute, time, date and the file size of each file in the directory, to the computer through a serial or parallel cable, in which in the step (b), information on the length of total data to be sent in the step (d) is sent together, and in the step (d), information on the size of total memories and usable memories is sent together.

To accomplish another object of the present invention, there is also provided an operation method of a portable personal device having facilities for storing and playing digital contents by control from a computer through a serial or parallel cable, the method having the steps of (a) receiving a file download request command from the computer through a serial or parallel cable for requesting to download a predetermined file into an internal memory installed in the portable personal device or into an external memory in an external memory card inserted from the outside; (b) when the portable personal device is ready to receive the predetermined file, sending to the computer through a serial or parallel cable a signal indicating that it is ready to receive the file; and (c) receiving the predetermined file sent on a block-by-block basis by the computer through a serial or parallel cable, in which in the step (b) information on the byte size of the unit block in the step (c) is also sent.

To accomplish another object of the present invention, there is also provided an operation method of a portable personal device having facilities for storing and playing digital contents by control from a computer through a serial or parallel cable, the method having the steps of (a) receiving a file download request command from the computer through a serial or parallel cable for requesting to download a predetermined file into an internal memory installed in the portable personal device or into an external memory in an external memory card inserted from the outside; (b) sending state information on file-receive readiness of the portable personal device to the computer through a serial or parallel cable; and (c) when the state information on file-receive readiness sent in the step (b) indicates that the portable personal device is ready to receive a file, receiving the predetermined file on a block-by-block basis sent by the computer through a serial or parallel cable, in which the file download request command in the step (a) includes the file attributes, date, time, the file size and name of the predetermined file, and the state information on file-receive readiness in the step (b) includes information on the byte size of the unit block in the step (c) and, when a file having the identical file name to that of the predetermined file exists in the portable personal device, the state information further includes information on the file size of the existing file.

To accomplish another object of the present invention, there is also provided an operation method of a portable personal device having facilities for storing and playing digital contents by control from a computer through a serial or parallel cable, the method having the steps of (a) receiving a file upload request command from the computer through a serial or parallel cable for requesting to upload a predetermined file in an internal memory installed in the portable personal device or in an external memory in an external memory card inserted from the outside, to the computer; (b) when the portable personal device is ready to upload the predetermined file to the computer, sending information on the size of the predetermined file to the computer through a serial or parallel cable; and (c) sending the predetermined file on a block-by-block basis to the computer through a serial or parallel cable.

To accomplish another object of the present invention, there is also provided an operation method of a portable personal device having facilities for storing and playing digital contents by control from a computer through a serial or parallel cable, the method having the steps of (a) receiving a file delete request command from the computer through a serial or parallel cable for requesting to delete a predetermined file in an internal memory installed in the portable personal device or in an external memory in an external memory card inserted from the outside; (b) when the portable personal device is ready to delete the predetermined file, sending information indicating that the portable personal device is ready to delete the predetermined file, to the computer through a serial or parallel cable; (c) receiving an execution command from the computer through a serial or parallel cable for executing the file delete request command received in the step (a); and (d) when the portable personal device receives the execution command in the step (c), deleting the file and sending the result to the computer through a serial or parallel cable, in which the structure of the transmission data which is received or sent in the steps (a) through (d) includes a start separator character for indicating the start of the transmission data, information on the length of the transmission data, an intermediate separator character for indicating the start of a command code or state information, the command code or state information, and an end separator character for indicating the end of transmission data.

To accomplish another object of the present invention, there is also provided an operation method of a portable personal device having facilities for storing and playing digital contents by control from a computer through a serial or parallel cable, the method having the steps of (a) receiving a key registration request command from the computer through a serial or parallel cable for requesting to register a key to the portable personal device; (b) when the portable personal device is ready to register the key, sending information indicating that the portable personal device is ready to register the key, to the computer through a serial or parallel cable; and (c) receiving the key sent by the computer through a serial or parallel cable, in which the key registration request command in the step (a) includes the byte length of the key.

To accomplish another object of the present invention, there is also provided an operation method of a portable personal device having facilities for storing and playing digital contents by control from a computer through a serial or parallel cable, the method having the steps of (a) receiving a make-directory request command from the computer through a serial or parallel cable for requesting to make a predetermined directory in an internal memory installed in the portable personal device or in an external memory in an external memory card inserted from the outside; (b) when the portable personal device is ready to make the predetermined directory, sending information indicating that the portable personal device is ready to make the predetermined directory, to the computer through a serial or parallel cable; (c) receiving an execution command from the computer through a serial or parallel cable for executing the make-directory request command received in the step (a); and (d) when the execution command is received in the step (c), making the predetermined directory and sending the result to the computer through a serial or parallel cable, in which the structure of the transmission data which is received or sent in the steps (a) through (d) includes a start separator character for indicating the start of transmission data, information on the length of the transmission data, an intermediate separator character for indicating the start of a command code or state information, the command code or state information, and an end separator character for indicating the end of transmission data.

To accomplish another object of the present invention, there is also provided an operation method of a portable personal device having facilities for storing and playing digital contents by control from a computer through a serial or parallel cable, the method having the steps of (a) receiving a state information request command from the computer through a serial or parallel cable for requesting the state information of the portable personal device; (b) when the state information request command is received in the step (a), sending total byte length information of the state information of the portable personal device to the computer through a serial or parallel cable; and (c) sending the state information, including the version, date, model name and the security key of the portable personal device, to the computer through a serial or parallel cable.

To accomplish another object of the present invention, there is also provided an operation method of a portable personal device having facilities for storing and playing digital contents by control from a computer through a serial or parallel cable, the method having the steps of (a) receiving a security key registration request command from the computer through a serial or parallel cable for registering the security key in the portable personal device; (b) when the portable personal device is ready to register the security key, sending information indicating that the portable personal device is ready to register the security key, to the computer through a serial or parallel cable; (c) receiving the security key sent by the computer through a serial or parallel cable; and (d) sending information indicating whether or not the security key is normally received in the step (c), to the computer through a serial or parallel cable, in which the structure of the transmission data which is received or sent in the steps (a) through (d) includes a start separator character for indicating the start of transmission data, information on the length of the transmission data, an intermediate separator character for indicating the start of a command code or state information, the command code or state information, and an end separator character for indicating the end of transmission data.

To accomplish another object of the present invention, there is also provided an operation method of a portable personal device having facilities for storing and playing digital contents by control from a computer through a serial or parallel cable, the method having the steps of (a) receiving in the portable personal device a meta data request command from the computer through a serial or parallel cable for requesting meta data that is information required for reproducing digital contents in which a security function is set, downloading a file from the computer, or uploading a file to the computer; (b) when the meta data request command is received in the step (a), returning the total byte length information of meta data to be sent to the computer through a serial or parallel cable; and (c) sending meta data, including the type of an encryption algorithm, the type of a hash algorithm, and the version of a random number generator, used by the portable personal device, to the computer through a serial or parallel cable.

To accomplish another object of the present invention, there is also provided an operation method of a portable personal device having facilities for storing and playing digital contents by control from a computer through a serial or parallel cable, the method having the steps of (a) receiving a security channel set request command from the computer through a serial or parallel cable for setting the security channel between the computer and the portable personal device; (b) when the security channel set request command is received in the step (a), sending information on whether or not to continue a security inspection process for setting the security channel between the computer and the portable personal device, to the computer through a serial or parallel cable; and (c) sending information on whether or not the security channel is successfully set, to the computer through a serial or parallel cable, in which the structure of the transmission data which is received or sent in the steps (a) through (d) includes a start separator character for indicating the start of transmission data, information on the length of the transmission data, an intermediate separator character for indicating the start of a command code or state information, the command code or state information, and an end separator character for indicating the end of transmission data.

To accomplish another object of the present invention, there is also provided an operation method of a portable personal device having facilities for storing and playing digital contents by control from a computer through a serial or parallel cable, the method having the steps of (a) receiving an audible meta data request command from the computer through a serial or parallel cable for requesting the audible meta data including the title, manufacturing number, author and narrator of digital contents recorded in a predetermined file in an internal memory installed in the portable personal device or in an external memory in an external memory card inserted from the outside; (b) when the audible meta data request command is received in the step (a), sending the state information of the predetermined file to the computer through a serial or parallel cable; and (c) sending the audible meta data of the predetermined file to the computer through a serial or parallel cable, in which in the step (c), the current play location and the continuous-reproduction indicator of the predetermined file are also sent.

To accomplish another object of the present invention, there is also provided a control method of a portable personal device having facilities for storing and playing digital contents by a computer connected to the portable personal device through a serial or parallel cable, the method having the steps of (a) sending a format request command to the portable personal device through a serial or parallel cable for formatting an internal memory installed in the portable personal device or an external memory in an external memory inserted from the outside; (b) receiving a response from the portable personal device through a serial or parallel cable for indicating that the portable personal device is ready for formatting; (c) sending an execution command to the portable personal device through a serial or parallel cable for executing the format request command sent in the step (a); and (d) receiving through a serial or parallel cable the result of the execution of formatting the corresponding memory in the portable personal device, in which the structure of the transmission data which is received or sent in the steps (a) through (d) includes a start separator character for indicating the start of transmission data, information on the length of the transmission data, an intermediate separator character for indicating the start of a command code or state information, the command or state information, and an end separator character for indicating the end of transmission data.

To accomplish another object of the present invention, there is also provided a control method of a portable personal device having facilities for storing and playing digital contents by a computer connected to the portable personal device through a serial or parallel cable, the method having the steps of (a) sending a refresh-directory request command to the portable personal device through a serial or parallel cable for requesting the whole file information of a predetermined directory in an internal memory installed in the portable personal device or an external memory in an external memory inserted from the outside; (b) receiving a response indicating that the portable personal device is ready to refresh the predetermined directory, from the portable personal device through a serial or parallel cable; (c) sending an execution command to the portable personal device through a serial or parallel cable for executing the refresh-directory request command sent in the step (a); (d) receiving file information including the file name, file extension, file attributes, time, date and file size of each file in the predetermined directory, from the portable personal device through a serial or parallel cable, in which the response received in the step (b) includes the length information of the whole data to be received in the step (d), and in the step (d), information on the size of the whole memory and available memory is also received.

To accomplish another object of the present invention, there is also provided a control method of a portable personal device having facilities for storing and playing digital contents by a computer connected to the portable personal device through a serial or parallel cable, the method having the steps of (a) sending a file download request command to the portable personal device through a serial or parallel cable for requesting to download a predetermined file into an internal memory installed in the portable personal device or into an external memory in an external memory card inserted from the outside; (b) receiving a response indicating that the portable personal device is ready to receive the predetermined file, from the portable personal device through a serial or parallel cable; and (c) sending the predetermined file on a block-by-block basis to the portable personal device through a serial or parallel cable, in which the response received in the step (b) includes the byte size information of the unit block of the predetermined file to be sent in the step (c).

To accomplish another object of the present invention, there is also provided a control method of a portable personal device having facilities for storing and playing digital contents by a computer connected to the portable personal device through a serial or parallel cable, the method having the steps of (a) sending a file download request command to the portable personal device through a serial or parallel cable for requesting to download a predetermined file into an internal memory installed in the portable personal device or into an external memory in an external memory card inserted from the outside; (b) receiving the state information of the portable personal device on preparation of receiving the file, from the portable personal device through a serial or parallel cable; and (c) when the state information of the portable personal device, received in the step (b), indicates that the portable personal device is ready to receive the file, sending the predetermined file on a block-by-block basis to the portable personal device through a serial or parallel cable, in which the file download request command in the step (a) includes the file attributes, date, time, file size and file name of the predetermined file, and the state information of the portable personal device, received in the step (b), includes the byte size information of the unit block of the predetermined file to be sent in the step (c), and when a file having the identical file name to that of the predetermined file exists in the portable personal device, the state information further includes the file size information of the file in the portable personal device.

To accomplish another object of the present invention, there is also provided a control method of a portable personal device having facilities for storing and playing digital contents by a computer connected to the portable personal device through a serial or parallel cable, the method having the steps of (a) sending a file upload request command to the portable personal device through a serial or parallel cable for requesting to upload a predetermined file in an internal memory installed in the portable personal device or in an external memory in an external memory card inserted from the outside, to the computer; (b) receiving the file size information of the predetermined file from the portable personal device through a serial or parallel cable; and (c) receiving the predetermined file on a block-by-block basis from the portable personal device through a serial or parallel cable.

To accomplish another object of the present invention, there is also provided a control method of a portable personal device having facilities for storing and playing digital contents by a computer connected to the portable personal device through a serial or parallel cable, the method having the steps of (a) sending a file delete request command to the portable personal device through a serial or parallel cable for requesting to delete a predetermined file in an internal memory installed in the portable personal device or in an external memory in an external memory card inserted from the outside; (b) receiving a response indicating that the portable personal device is ready to delete the predetermined file, from the portable personal device through a serial or parallel cable; (c) sending an execution command for executing the file delete request command sent in the step (a), to the portable personal device through a serial or parallel cable; and (d) receiving the result of deleting the corresponding file in the portable personal device, through a serial or parallel cable, in which the structure of the transmission data which is received or sent in the steps (a) through (d) includes a start separator character for indicating the start of transmission data, information on the length of the transmission data, an intermediate separator character for indicating the start of a command code or state information, the command code or state information, and an end separator character for indicating the end of transmission data.

To accomplish another object of the present invention, there is also provided a control method of a portable personal device having facilities for storing and playing digital contents by a computer connected to the portable personal device through a serial or parallel cable, the method having the steps of (a) sending a state information request command to the portable personal computer through a serial or parallel cable for requesting the state information of the portable personal device; (b) receiving the total byte length information of the state information of the portable personal device to be sent to the computer, from the portable personal device through a serial or parallel cable; and (c) receiving the state information including the version, date, model name and security key of the portable personal device, through a serial or parallel cable.

To accomplish another object of the present invention, there is also provided a control method of a portable personal device having facilities for storing and playing digital contents by a computer connected to the portable personal device through a serial or parallel cable, the method having the steps of (a) sending a security key registration request command to the portable personal device through a serial or parallel cable for requesting to register the security key in the portable personal device; (b) receiving a response indicating that the portable personal device is ready to register the security key, from the portable personal device through a serial or parallel cable; (c) sending the security key to the portable personal device through a serial or parallel cable; and (d) receiving a response indicating whether or not the security key sent in the step (c) is normally received, from the portable personal device through a serial or parallel cable, in which the structure of the transmission data which is received or sent in the steps (a) through (d) includes a start separator character for indicating the start of transmission data, information on the length of the transmission data, an intermediate separator character for indicating the start of a command code or state information, the command code or state information, and an end separator character for indicating the end of transmission data.

BRIEF DESCRIPTION OF THE DRAWINGS

The above objects and advantages of the present invention will become more apparent by describing in detail a preferred embodiment thereof with reference to the attached drawings in which:

FIG. 6A is a simplified view of the execution order of 'start' command according to an embodiment of the present invention, and FIG. 6B shows an example of the structure of data which are sent and received in each step in FIG. 6B;

FIGS. 7A and 7B are simplified views of the execution order of 'format' command according to an embodiment of the present invention.

FIG. 10C shows an example of the structure of data which are sent and received in each step of FIGS. 10A and 10B;

FIG. 14C shows the structure of data which are sent and received in each step of FIGS. 14A and 14B;

FIG. 19B shows the structure of data which are sent and received in each step of FIG. 19A;

FIG. 22C shows the structure of data which are sent and received in each step of FIGS. 22A and 22B;

FIG. 32A is a simplified view of the execution order of 'obtain audible meta data' command according to an embodiment of the present invention, and FIG. 32B shows the structure of data which are sent and received in each step of FIG. 32A;

DETAILED DESCRIPTION OF THE INVENTION

Figure 1A:
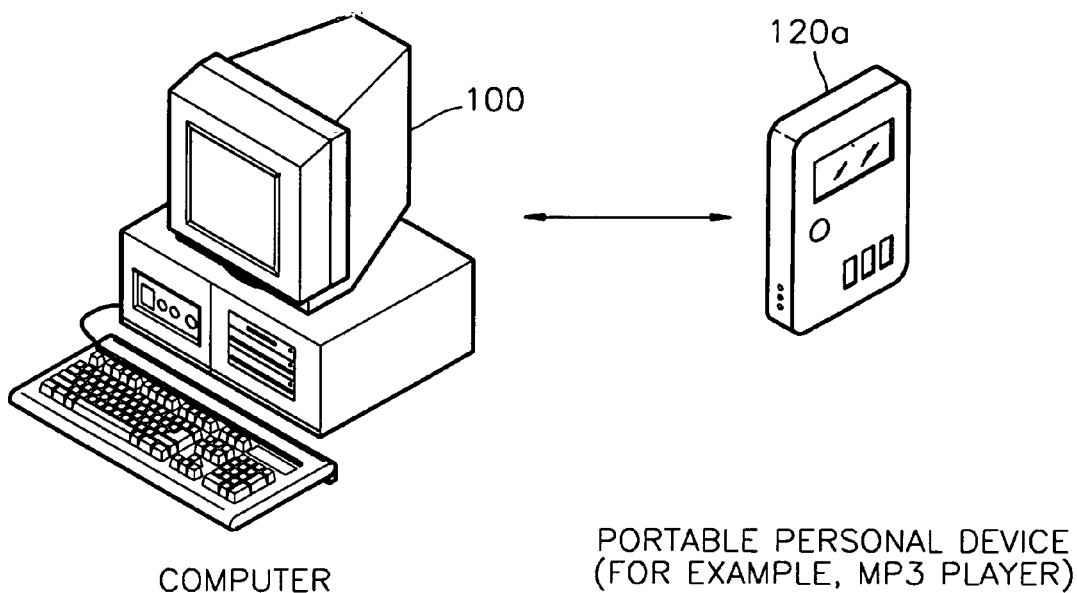
FIGS. 1A and 1B are simplified views of a communication system of a computer and a portable personal device according to the embodiments of the present invention.

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to anyone skilled in the art.

The present invention is defined for development of a portable personal device having facilities for storing and playing digital contents. Here, in the portable personal device, it is assumed that digital contents are stored and managed as a file system compatible to a solid state floppy disc card (SSFDC). However, the file system compatible to an SSFDC is an example of a file system which manages digital contents in the form of a file, and the present invention is not restricted to this example.

Also, though it is assumed here that examples of digital contents are acoustic data, that is sound, digital contents can include image data and other control information. Also, though description here is focused on facilities of storing and playing digital contents in order to define interfaces or communication methods between a computer and a portable personal device, the portable personal device can have facilities of recording sound or image without communicating with the computer.

Although the embodiments of the present invention are described to use interfaces or communication methods through serial port/cable or parallel port/cable between a portable personal device and a computer, the present invention can be extended to other communication methods, for example, a communication method through a network. Also, considering optimal performances, universal serial bus (USB) as a serial communication method, enhanced capabilities port (ECP) or enhanced parallel port (EPP) as parallel communication methods are mainly described here, as examples, to which the present invention is not restricted.

Here, the ECP, proposed by Hewlett Packard and Microsoft, enables bidirectional communications, and supports data transfer with industry standard architecture (ISA) bus speed. The ECP has an internal buffer and supports direct memory access (DMA) transfer and data compression. Therefore, the ECP is useful in interfacing to peripherals requiring transfer of multiple data blocks, like a printer and a scanner. The EPP, originally developed by chip maker Intel, personal computer manufacturer Zenith, and parallel port communication product manufacturer Xircom, can read or write 1-byte data in one cycle of ISA extended bus (approximately 1 microsecond). Since the EPP supports fast direction switch in bidirectional communication, it is useful in interfacing to peripherals performing frequently bidirectional communication like a disc driver. The USB, a protocol established in USB Implementation Forum, organized by 7 companies including IBM, Compaq, Intel, Microsoft, NEC, Northern Telecom, and DEC, provides an integrated interface for diverse peripherals, and supports easier and cheaper connection to peripherals.

FIG. 1A is a simplified view of a communication system of a computer 100 and a portable personal device 120A according to an embodiment of the present invention.

The computer 100 and a portable personal device 120a like an MP3 player communicate with each other, or are interfaced, through a serial port/cable (hereinafter, referred to as serial port), or a parallel port/cable (hereinafter, referred to as parallel port). The present invention defines a communication method between a computer 100 and a portable personal device 120a.

Figure 1B:
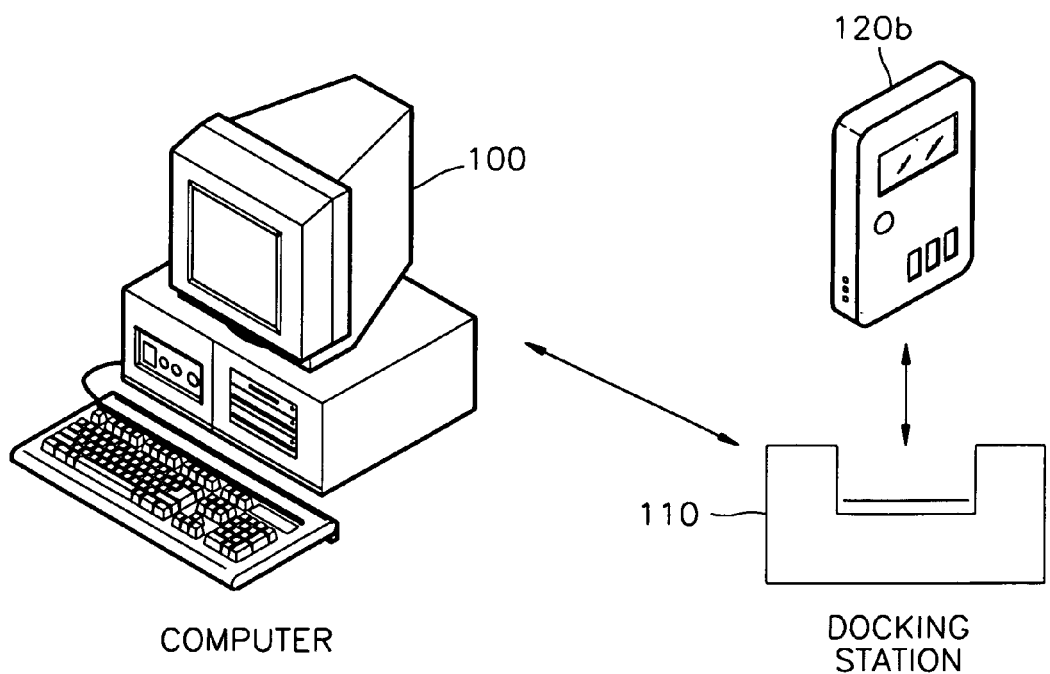

FIG. 1B is a simplified view of a communication system of a computer 100 and a portable personal device 120b according to another embodiment of the present invention.

Referring to FIG. 1B, a docking device/station 110 for a portable personal device 120b is added to the system of FIG. 1A, and the docking station 110 mediates communication between the computer 100 and the portable personal device 120b. In addition to its basic charging function, the docking station 110 can operate as an intelligent docking station having its own CPU and a memory.

Each control command in a communication protocol for controlling operations of a portable personal device by a computer according to embodiments of the present invention will now be explained.

1. Invoke a Docking Station

Figure 2A:
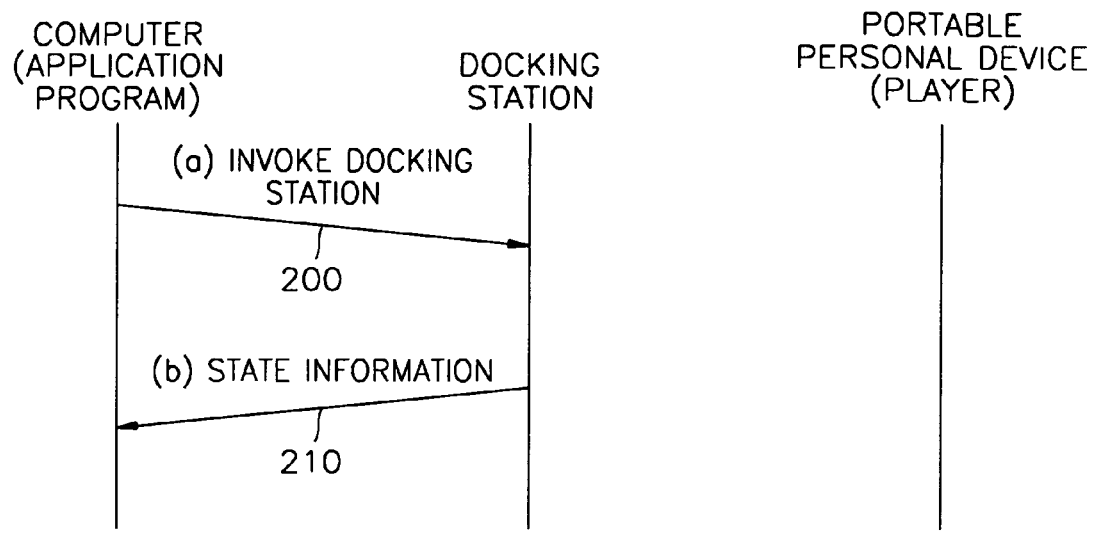
FIG. 2A is a simplified view of the execution order of 'invoke docking station' command according to an embodiment of the present invention.

'Invoke docking station' command is a command for checking whether or not a docking station operates normally in order to begin a communication. 'Invoke docking station' command, together with 'Invoke player' command to be explained here, is used for checking a stable communication with a docking station or a player, because the docking station or the player may have been damaged by an illegal control command, etc. FIG. 2A is a simplified view of the execution order of 'invoke docking station' command according to an embodiment of the present invention, and FIG. 2B shows an example of the structure of data which are sent and received in each step in FIG. 2A.

First, an application program sends 'invoke docking station' command to the docking station in step 200. Since the destination of the 'invoke docking station' command is the docking station, there occurs no communications with the portable personal device. The structure of data sent in step 200 (hereinafter, referred to as packet) is shown as (a) packet 200P in FIG. 2B. (a) packet 200P uses character ':' as a command start separator 201 (hereinafter, referred to as ':' separator, or ":" separator), 0x69 as the value of a command code field 202, and character '.' as a command end separator 203 (hereinafter, referred to as '.' separator, or "." separator). Here, 0x in 0x69 means hexadecimal notation.

Figure 2B:
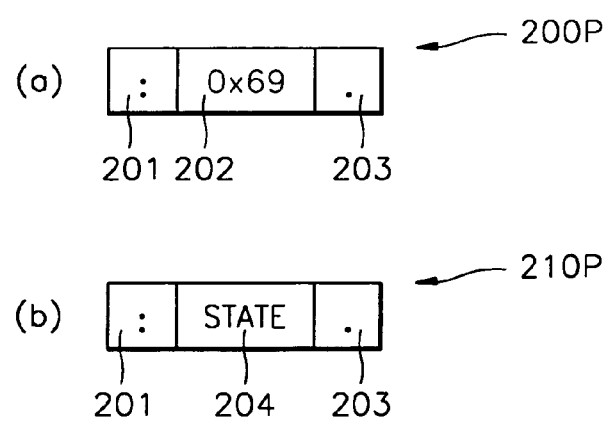
FIG. 2B shows an example of the structure of data which are sent and received in each step in FIG. 2A.

Next, after the docking station receives the 'invoke docking station' command, the docking station returns its state information in the form of (b) packet 210P shown in FIG. 2B to the application program in step 210. As (a) packet 200P, (b) packet 210P uses ':' separator 201 and '.' separator 203, and includes a 1-byte state information field 204. The value of the state information field 204 is an encoded number. For example, number '0' indicates the normal operation state of the docking station, while other numbers indicate that the docking station is not in a normal operation state. When the docking station is not in a normal operation state, the docking station may be unable to send (b) packet 210P. Therefore, the application program determines that the docking station is not in a normal operation state, when the value of the state information field 204 in (b) packet 210P is not '0', or there is no answer of (b) packet 210P.

In the embodiment of the present invention, a packet which uses character ":" and "." as command separators for communication between the application program and the docking station (excluding the case in which the docking station performs a mediating role for sending a command received from the application program to the player) is used. However, ":" and ".", the characters used as command separators, are just examples, and other characters can be used as command separators. Also, according to definitions of a communication specification between an application program and a docking station, the embodiment of the present invention can be modified to include only a command code or state information without command separators in a packet. Also, the embodiment can be modified to include any one of the start command separator or the end command separator in a packet. Also, the command separator does not need to have 1-byte length.

Also in other commands to be explained here, whether or not to use these command separators 201 and 203, the kind of characters to be used as command separators 201 and 203, and the byte length can be appropriately defined according to definitions of a communication specification between an application program and a player, which can be easily understood by a person skilled in the field of the present invention. Also in other commands to be explained here, characters or numbers used for indicating a command or state in the command code field 202 and the encoded state information field 204, and the byte length of each field can be appropriately defined according to definitions of a communication specification.

Also, in the embodiment of the present invention, in communications between a player and a docking station (excluding the case in which the docking station performs a mediating role for sending a command received from the player to the application program), a packet using characters ':' and '.' as command separators is used. Also, in communications between a computer and a player, according to necessity of corresponding commands (particularly related to request for synchronization), a packet using characters ":" and "." as command separators can be used.

2. Invoke a Player

Figure 3A:
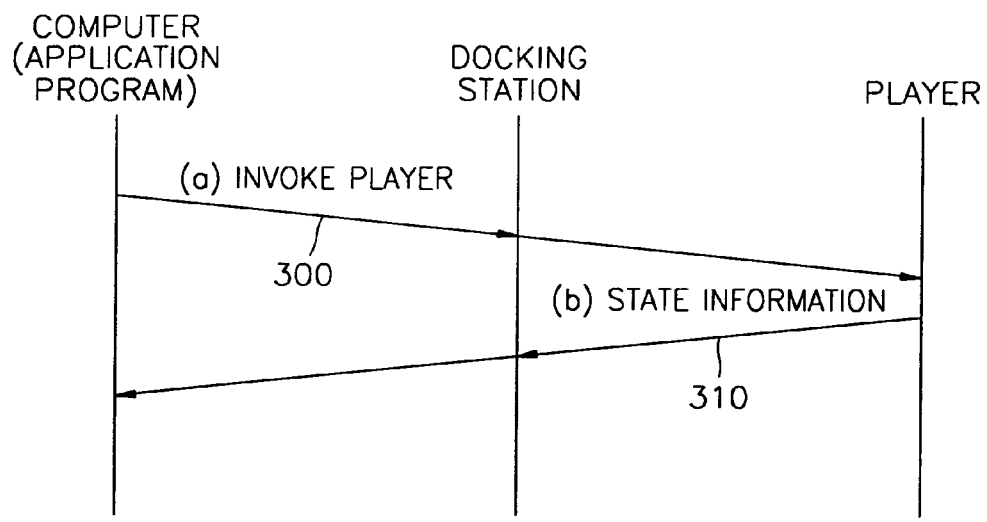
FIG. 3A is a simplified view of the execution order of 'invoke player' command according to an embodiment of the present invention.

'Invoke player' command is a command for checking whether or not a player operates normally in order to begin a communication. FIG. 3A is a simplified view of the execution order of 'invoke player' command according to an embodiment of the present invention, and FIG. 3B shows an example of the structure of data which are sent and received in each step in FIG. 3A.

Figure 3B:
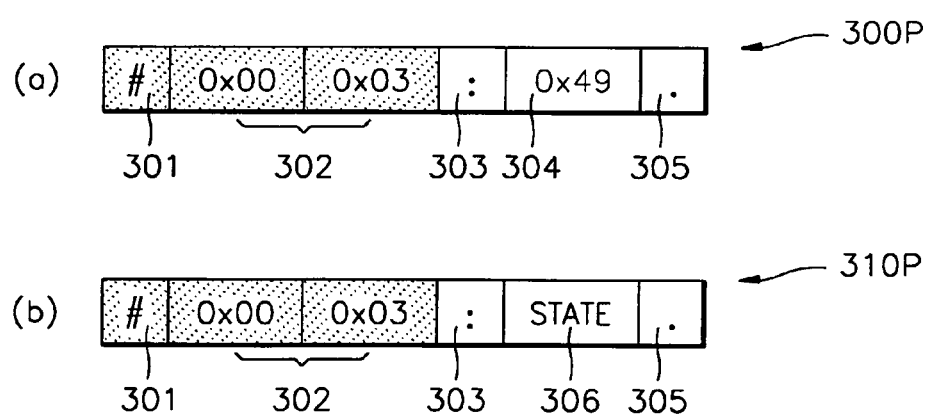
FIG. 3B shows an example of the structure of data which are sent and received in each step in FIG. 3A.

First, an application program sends 'invoke player' command in the form of (a) packet 300P shown in FIG. 3B through a docking station to a player in step 300. Since the destination of 'invoke player' command is the player, the docking station which received 'invoke player' command from the application program performs a mediating role for sending the command to the player. However, when the docking station is not included as in the communication system of FIG. 1A, 'invoke player' command is directly sent to a player without passing through a docking station. Other commands to be explained here will be described basically assuming that those commands are for the communication system of FIG. 1B, that is, the communication system including a docking system for performing mediating functions. But, interface part to a docking station is excluded in the communication system of FIG. 1A. That is, when the system does not include a docking station, commands are directly sent to a player, while when the system includes a docking station, commands are sent to a player through a docking station.

Compared to (a) packet 200P and (b) packet 210P of FIG. 2B, (a) packet 300P and (b) packet 310P of FIG. 3B further include 1-byte command separator 301 of character '#' (hereinafter, referred to as '#' separator, or "#" separator), in the front part of the packet, for indicating communications between an application program and a player and a 2-byte command length field 302. Here, the command length field 302 represents the length of a packet, excluding the command separator 301 and the command length field 302 itself, in units of a byte. That is, the value of the command length field 302 of (b) packet 310P in FIG. 3B is set to 0x03, the byte length sum of ':' separator 303, the command code field 304, and '.' separator 305.

Also, whether or not to use a command separator for indicating communications between an application program and a player, the kinds of characters to be used for the command separator 301, and byte length of the command separator 301 can be appropriately defined according to definitions of a communication protocol, and the byte length of the command length field 302 does not need to be restricted to 2 bytes, which we have seen already, and will be the same in other commands to be explained.

Each data in data structures used in the present invention will be expressed in "Big Endian" format. In the "Big Endian" format, most significant byte (MSB) of numerical data is recorded in the lowest address memory. For example, 0x12345678 is expressed as in Table 1.

TABLE 1

| Address 0: 0x12 | Address 1: 0x34 | Address 2: 0x56 | Address 3: 0x78 |
| --- | --- | --- | --- |

(a) packet which is sent in the step 300 includes '#' separator 301, a command length field 302, ':' separator 303, a command code field 304 having the value '0x49', and '.' separator 305.

Next, when the player receives 'invoke player' command, the player returns its state information in the form of (b) packet 310P shown in FIG. 3B to the application program in step 310. (b) packet 310P uses '#' separator 301, the command length field 302, ':' separator 303, and '.' separator 305, the same as in (a) packet 300P, and includes a 1-byte state information field 306. Here, the value of the state information field 306 is an encoded number. For example, number '0' indicates the normal operation state of the player, while other numbers indicate that the player is not in a normal operation state. When the player is not in a normal operation state, the player may be unable to send (b) packet 310P. Therefore, the application program can determine that the player is not in a normal operation state, when the value of the state information field 306 in (b) packet 310P is not '0', or there is no answer of (b) packet 310P. However, as the case may be, the docking station may detect that the player is not in a normal operation state and send (b) packet 310P.

Characters or numbers used for indicating certain commands or states in the command code field 304 or the state information field 306 in communications between the application program and the player can be defined with appropriate characters or numbers according to definitions of a communication protocol, as in the communications between an application program and a docking station, which we have seen already, and will be the same in other commands to be explained. Also, the byte length of each field can be defined appropriately according to definitions of a communication protocol.

The structure of (a) packet 300P shown in FIG. 3B is a basic packet structure used in the start stage or preparation stage of each control command. However, the value and length of the command code field 304 changes with respect to a command, and the value of the command length field 302 also changes with respect to the length of the corresponding command code field 304. Hereinafter, the four fields, including '#' separator, the command length field, ':' separator, and '.' separator, will be referred to as "basic fields." Also, it is assumed that the value of the command length field is set to the value obtained by adding 2 (1 byte for ':' separator and 1 byte for '.' separator) to the length of the corresponding command code.

3. Obtain Player Version

Figure 4A:
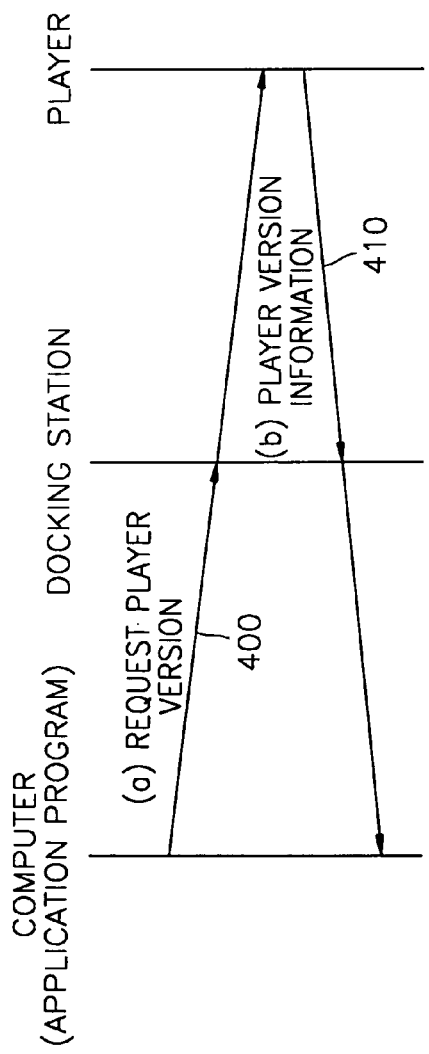
FIG. 4A is a simplified view of the execution order of 'obtain player version' command according to an embodiment of the present invention.

'Obtain player version' command is used for an application program on a computer to obtain a player version, etc. Since player's version information determines the kinds of control commands which the player supports, it is desirable that 'obtain player version' command, together with 'obtain docking station version' command, is executed before other commands to be explained here are executed. FIG. 4A is a simplified view of the execution order of 'obtain player version' command for a player according to an embodiment of the present invention, and FIG. 4B shows an example of the structure of data which are sent and received in each step in FIG. 4A.

Figure 4B:
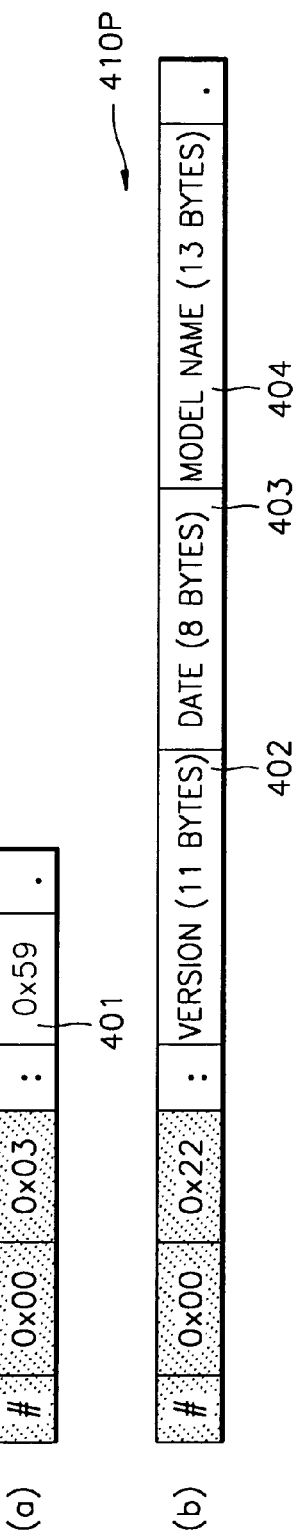
FIG. 4B shows an example of the structure of data which are sent and received in each step in FIG. 4A.

First, an application program on a computer sends 'obtain player version' command in the form of (a) packet 400P shown in FIG. 4B to a player in step 400. (a) packet 400P shown in FIG. 4B includes the basic field (here, the value of the command length field is 0x03), and the length of the command code field 401 is 1 byte and the value is set to 0x59.

Next, when the player receives 'obtain player version' command, the player returns its version information in the form of (b) packet 410P shown in FIG. 4B to the application program in step 410. (b) packet 410P shown in FIG. 4B includes the basic fields. The packet also includes 11-byte version 402 (for example, "1.1"), 8-byte date 403 (for example, "19990831"), and 13-byte model name 404 (for example, "YP-D40"), as player version information. Therefore, among the basic fields, the value of the command length field is 0x22. Also, the byte length for indicating version, data, and model name can be differently set according to definitions of a communication protocol.

4. Obtain Docking Station Version

Figure 5A:
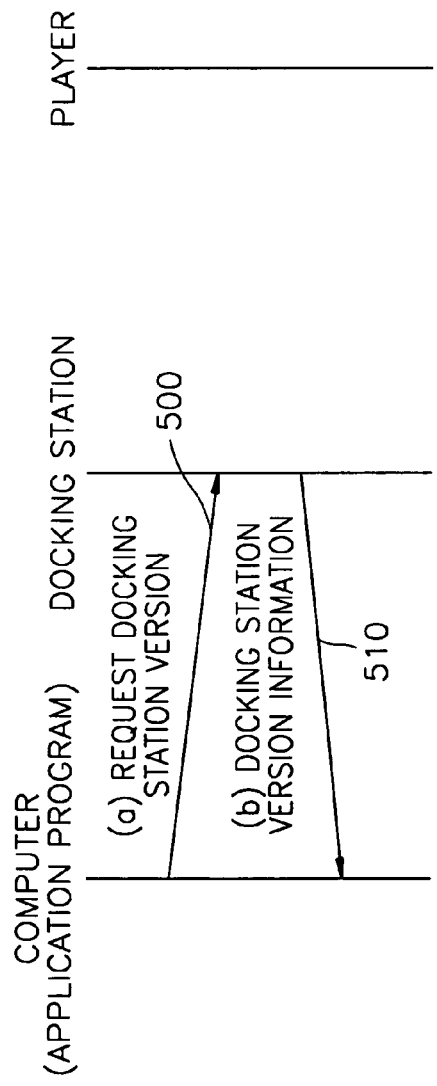
FIG. 5A is a simplified view of the execution order of 'obtain docking station version' command according to an embodiment of the present invention.

'Obtain docking station version' command is used for an application program on a computer to obtain information on docking station version, etc. FIG. 5A is a simplified view of the execution order of 'obtain docking station version' command according to an embodiment of the present invention, and FIG. 5B shows an example of the structure of data which are sent and received in each step in FIG. 5B.

Figure 5B:
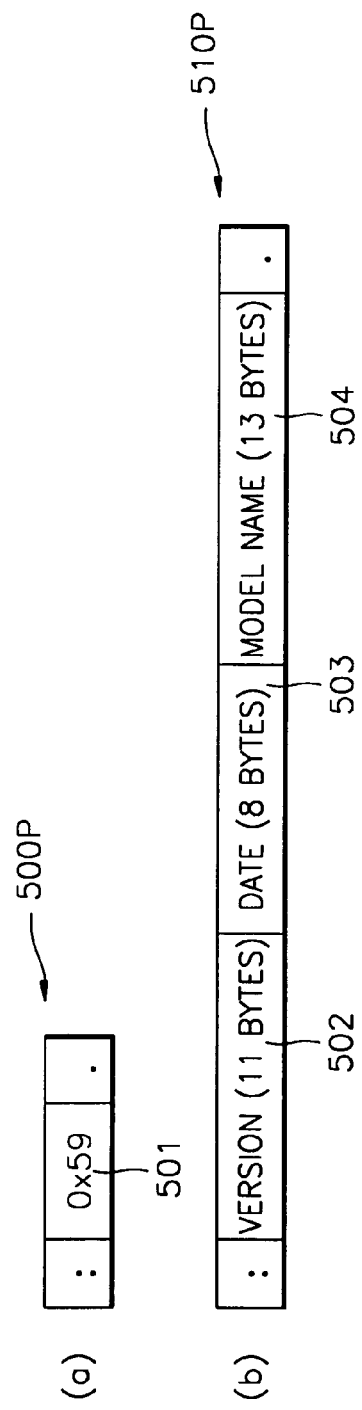
FIG. 5B shows an example of the structure of data which are sent and received in each step in FIG. 5B.

First, the application program on the computer sends 'obtain docking station version' command in the form of (a) packet 500P shown in FIG. 5B to the docking station in step 500. Since the destination of 'obtain docking station version' command is the docking station, (a) packet 500P shown in FIG. 5B does not include '#' separator and the command length field, but only includes ':' separator and '.' separator, among the basic fields. The length of command code field 501 is 1 byte, and the value is 0x59, which are the same as in 'obtain player version' command.

Next, when the docking station receives 'obtain docking station version' command, the docking station returns its version information in the form of (b) packet 510P shown in FIG. 5B to the application program, in step 510. (b) packet 510P shown in FIG. 5B lacks '#' separator and the command length field in the basic fields, because it is for communications between an application program and a docking station. Except for these differences, the packet has a similar structure to that of (b) packet 410P in FIG. 4B. Generally, docking station's version information is equal to that of the corresponding player's. However, they can be different when compatibility between models exists.

5. Start Signal

Start signal or start command is a sub-command to be used as an initial command for most commands to be explained here, and is used for indicating the start of a new control command. It is frequently used particularly when a parallel port, like ECP or EPP, is used. FIG. 6A is a simplified view of the execution order of 'start' command according to an embodiment of the present invention, and FIG. 6B shows an example of the structure of data which are sent and received in each step in FIG. 6B.

First, the application program on the computer sends 'start player' signal in the form of (a) packet 600P shown in FIG. 6B to the player in step 600. (a) packet 600P shown in FIG. 6B includes the basic fields (the value of the command length field is 0x04), and, unlike (a) packet 400P of FIG. 4B, the command code field is extended. That is, the command code field is appropriately extended to be used with respect to the necessity of the corresponding command. The command code fields of other commands to be explained here are also appropriately extended. Each command code field is divided into a code value field (1 to 3-byte length) and additional parameter fields.

(a) packet 600P in a start command includes a code value field 601 having a value '0x4c', and a next command length field 602, as an example of an additional parameter field. The next command length field 602 has the value of the command length field of the next command (a command sent by a computer to a player). The lengths of '#' separator and the command length field itself (that is, preamble) are not included in the value of the command length field, which we have seen already.

Next, when the player receives the start signal, the player returns the start signal ACK (acknowledgment), which includes the player's state information, in the form of (b) packet 610P shown in FIG. 6B, to the application program in step 610. (b) packet 610P shown in FIG. 6B has the basic fields (the value of the command length field is 0x04), and further includes a state information field 603 for indicating state values of Table 2, and a next command length field 602. The next command length field 602 is the same as in (a) packet 600P.

TABLE 2

| State value | Meaning |
|---|---|
| 0x00 | OK |
| 0x80 | Player is not connected. |
| 0x40 | Player is busy. |
| 0x20 | Changes in external memory card |
| 0x10 | Write protection tap attached |
| 0x08 | Overflow in internal flash memory |
| 0x04 | Overflow in external memory |
| 0x02 | No external memory |

Here, bits of respective state values, except an OK state, are OR-connected, and it is desirable that the docking station senses the state in which player is not connected (0x80) and informs the state to the application program.

6. Format

'Format' command is a command used for initializing the memory in the player. All memories must be formatted before it is used. This is similar to the case in which a disc is formatted before it is used in a computer.

Figure 7C:
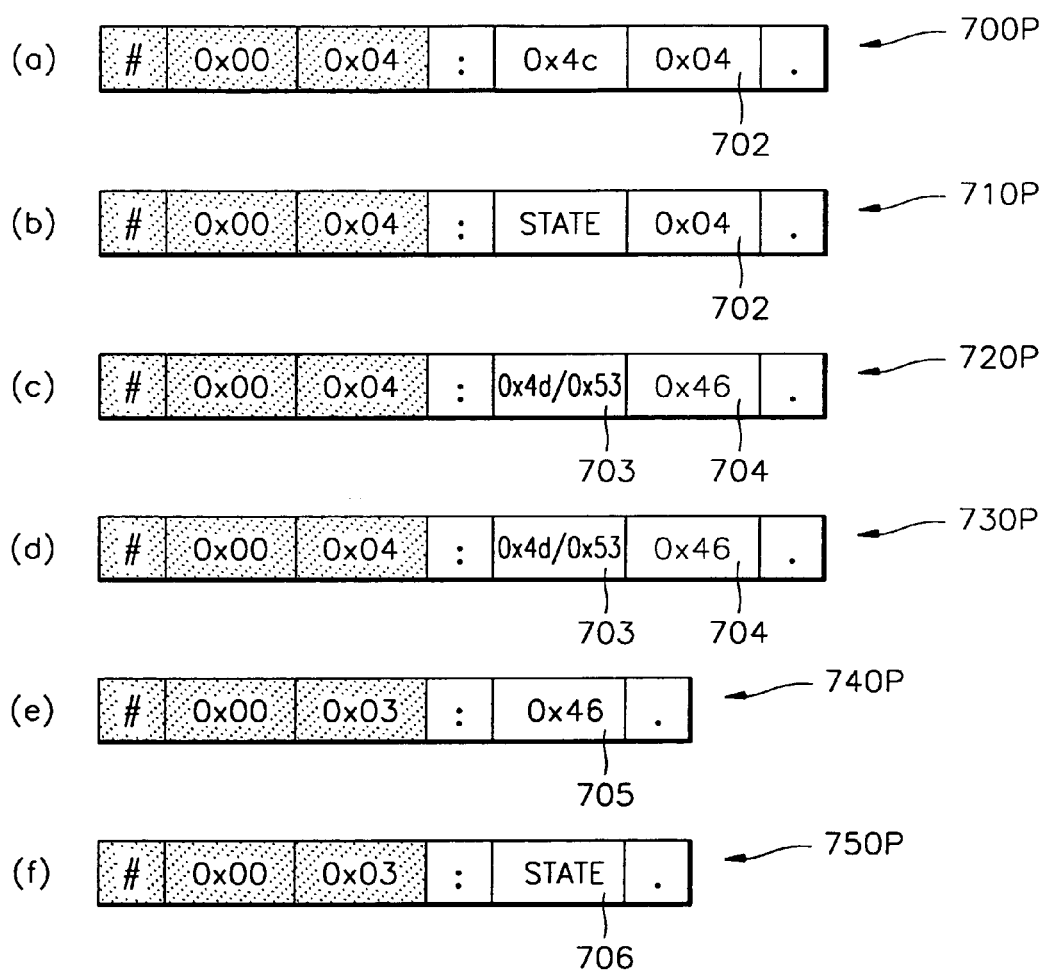
FIG. 7C shows an example of the structure of data which are sent and received in each step of FIGS. 7A and 7B.

FIGS. 7A and 7B are simplified views of the execution order of 'format' command according to an embodiment of the present invention, and FIG. 7C shows an example of the structure of data which are sent and received in each step of FIGS. 7A and 7B. Here, FIG. 7A shows parallel communications, while FIG. 7B shows serial communications. In serial communications, a start signal in step 700 and a start signal ACK in step 710 are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 700, a start signal ACK in step 710, and the structures of packets 700P and 710P used in the steps 700 and 710 are similar to those used in FIGS. 6A and 6B. Here, the value of a next command length field 702 is set to 0x04. This is the same as the value of the command length field of (c) packet 720P in step 720.

Next, the application program on the computer sends 'format' request command in the form of (c) packet 720P of FIG. 7C to the player in step 720. Here, since format is executed not by the 'format' request command, but by an execution command in step 740, 'format' request command is also referred to as a format preparation signal.

(c) packet 720P includes the basic fields (the value of the command length field is 0x04), and further includes a media field 703 for indicating the type of media or memories, and a code value field 704 having a value of '0x46'. Memories attached to the player according to an embodiment of the present invention include an internal memory (for example, flash memory) installed inside the player and an external memory (for example, SMART card) inserted externally to the player. Therefore, other commands to be explained here, which are related to a predetermined directory or file on a memory, generally include a media field for choosing the kind of memory.

The value of the media field 703 is set to 0x4d for internal memory formatting, and is set to 0x53 for external memory formatting.

When the player is ready for execution of formatting, the player returns (d) packet 730P, which has the same structure and field values as (c) packet 720P received in the step 720, to the computer in step 730. When it is unable to execute format, the player changes the value of the media field 703 or the code value field 704.

When the application program of the computer receives the same packet as (c) packet of the step 720, which it sent, the application program sends an execution command for executing 'request format' command in the form of (e) packet 740P of FIG. 7C, which was sent in the step 720, to the player in step 740. (e) packet 740P includes the basic fields (the value of the command length field is 0x03) and the code value field 705 having a value '0x46'.

Finally, when the player receives the execution command, the player executes formatting of the corresponding memory, and informs the result in the form of (f) packet 750P of FIG. 7C in step 750. (f) packet 750P has the basic fields (the value of the command length field is 0x03), and a field for indicating state information. The value of the state field has the same meaning as in the Table 2.

7. Refresh Root Directory

'Refresh root directory' command is a command for refreshing information in a root directory of an internal memory or an external memory installed in the player and then obtaining all the file information of the root directory. Particularly when a user changes an external memory card, the application program of the computer must refresh the root directory information on the newly inserted external memory card.

Figure 8A:
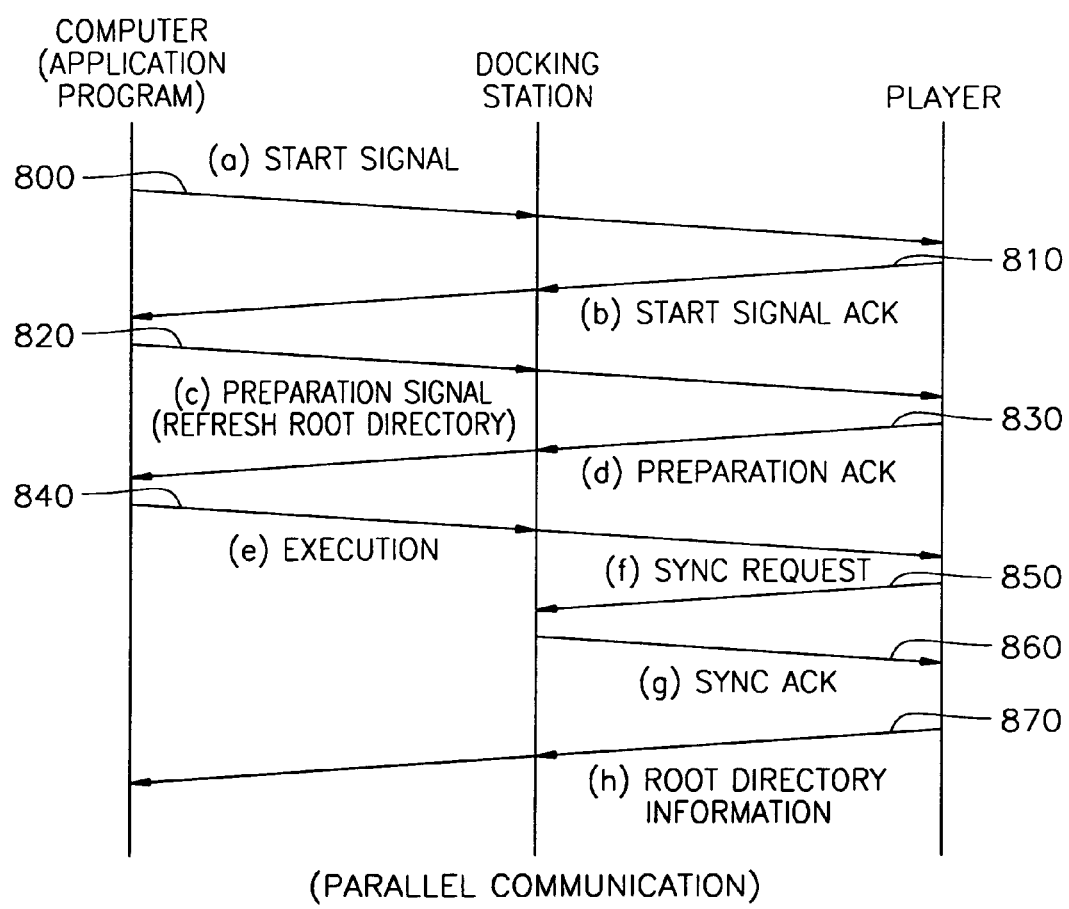
FIGS. 8A and 8B are simplified views of the execution order of 'refresh root directory' command according to an embodiment of the present invention.
Figure 8B:
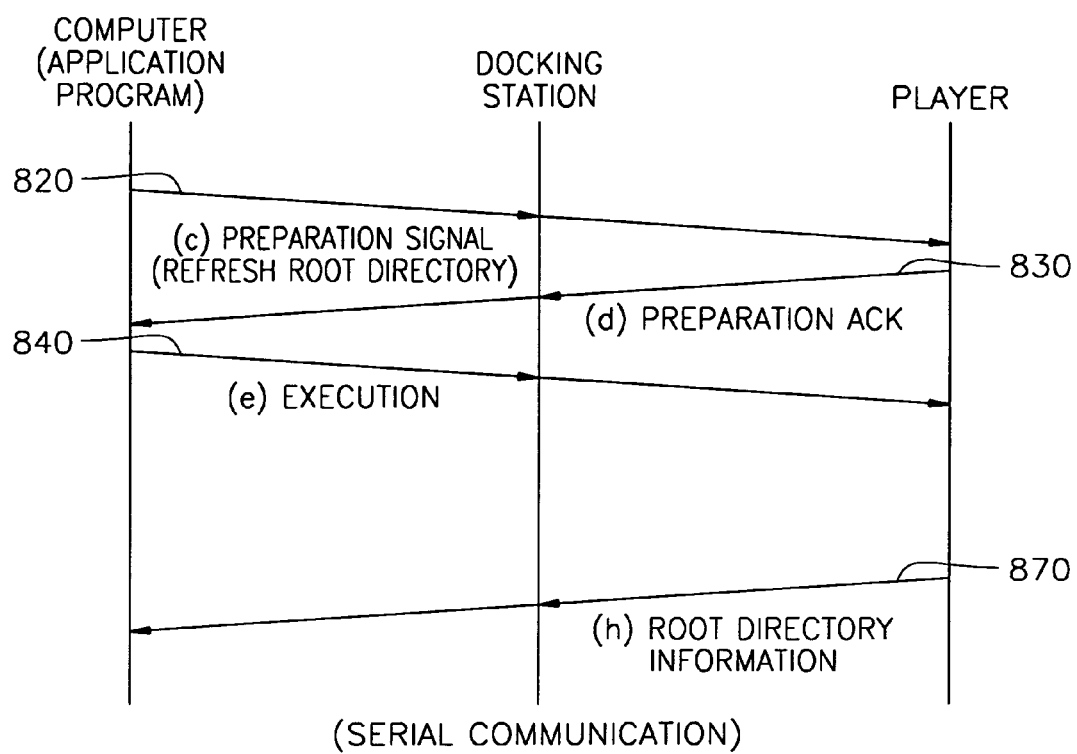
Figure 8C:
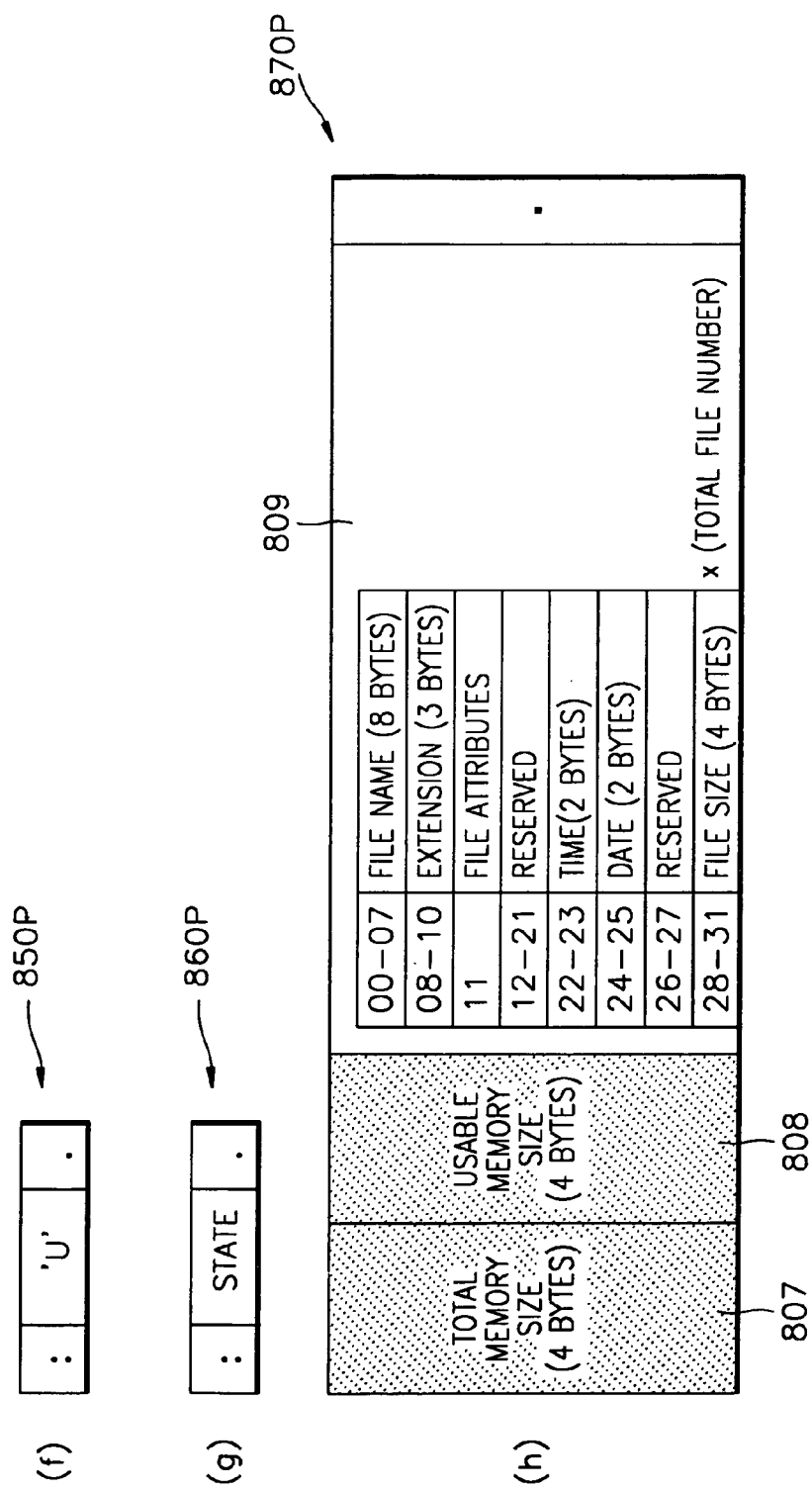
FIG. 8C shows an example of the structure of data which are sent and received in each step of FIGS. 8A and 8B.

FIGS. 8A and 8B are simplified views of the execution order of 'refresh root directory' command according to an embodiment of the present invention, and FIG. 8C shows an example of the structure of data which are sent and received in each step of FIGS. 8A and 8B. Here, FIG. 8A shows parallel communications, while FIG. 8B shows serial communications. In serial communications, a start signal in step 800 and a start signal ACK in step 810 are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 800, a start signal ACK in step 810, and the structures of packets 800P and 810P used in the steps 800 and 810 are similar to those used in FIGS. 6A and 6B. Here, the value of a next command length field 802 is set to 0x04. This is the same as the value of the command length field of (c) packet 820P in step 820.

Next, the application program of the computer sends 'refresh root directory' request command, or 'refresh root directory' preparation signal in the form of (c) packet 820P of FIG. 8C in step 820.

(c) packet 820P has the basic fields (the value of the command length field is 0x04), and further includes a media field 803 for indicating the type of media or memories, and a code value field 804 having a value of '0x47'. The value of the media field 803 is set to 0x4d for an internal memory, and is set to 0x53 for an external memory.

When the player is ready to refresh the root directory (that is, when it is ready to return all the file information of the root directory), the player sends preparation ACK in the form of (d) packet 830P of FIG. 8C to the computer in step 830. The basic fields (the value of the command length field is 0x06), the media field 803, and the code value field 804 in (d) packet 830P have the same meaning as (c) packet 820P. Also, (d) packet 830P further includes a byte-length-of-information field 805 having a 2-byte length for indicating information on the length of total data to be returned in step 870. Here, referring to the byte-length-of-information field 805 of (d) packet 830P, the number of total files on the root directory can be calculated by the following equation 1.

$$\text{Number of total files} = ((\text{the value of byte-length-of-information field}) - 8)/32 \quad (1)$$

When the application program of the computer receives (d) packet 830P, the application program sends an execution command for executing 'refresh root directory' request command sent in the step 820 in the form of (e) packet 840P of FIG. 8C to the player in step 840. (e) packet 840P includes the basic fields (the value of the command length field is 0x03), and a code value field 806 having a value '0x46'.

Next, synchronization between the player and the docking station is performed in steps 850 and 860. For this, the player sends a request for synchronization in the form of (f) packet 850P to the docking station in the step 850. (f) packet 850P includes ':' separator, a command code of character 'U', and '.' separator.

When the docking station is ready to mediate information communication (for example, finishing preparation of a buffer), the docking station sends ACK signal in the form of (g) packet 860P to the player in step 860. (g) packet 860P includes ':' separator, a state information field, and '.' separator. Here, among the state values in the state information field, number '0' indicates success, while other numbers indicate failure. (Hereafter, the fact that number '0' in the state value indicates success and other numbers indicate failure is referred to as success/failure state value). The steps 850 and 860 are not carried out when there is no docking station.

Finally, the player sends file information of each file on the root directory in the form of (h) packet 870P of FIG. 8C in step 870. Thanks to (d) packet 830P of the step 830, the application program of the computer has already known the byte length of information to be answered in the step 870. That is, data as much as the byte length indicated in the byte-length-of-information field 805 of (d) packet 830P in the step 830 is sent, and the end of transmission data is indicated by '.' separator.

(h) packet 870P includes a 4-byte total memory size field 807, a 4-byte usable memory size field 808, a file information field 809 for 32-byte lengths of file information, each for a file, and '.' separator.

File information on each file includes 8 bytes for file name (excluding extension), 3 bytes for file extension, 1 byte for file attributes, 2 bytes for time, 2 bytes for date, and 4 bytes for file size.

8. Refresh Sub-directory

'Refresh sub-directory' command is a command for refreshing a sub-directory on an internal memory or external memory installed in the player, and then obtaining all the file information of the sub-directory. 'Refresh sub-directory' command operates similar to the way 'refresh root directory' operates, but 'refresh sub-directory' command is used only when a memory stores files in a directory hierarchy structure. Particularly when a user changes an external memory card, if the external memory card includes a directory hierarchy structure, the application program of the computer must refresh sub-directory information on the newly inserted external memory card.

Figure 9A:
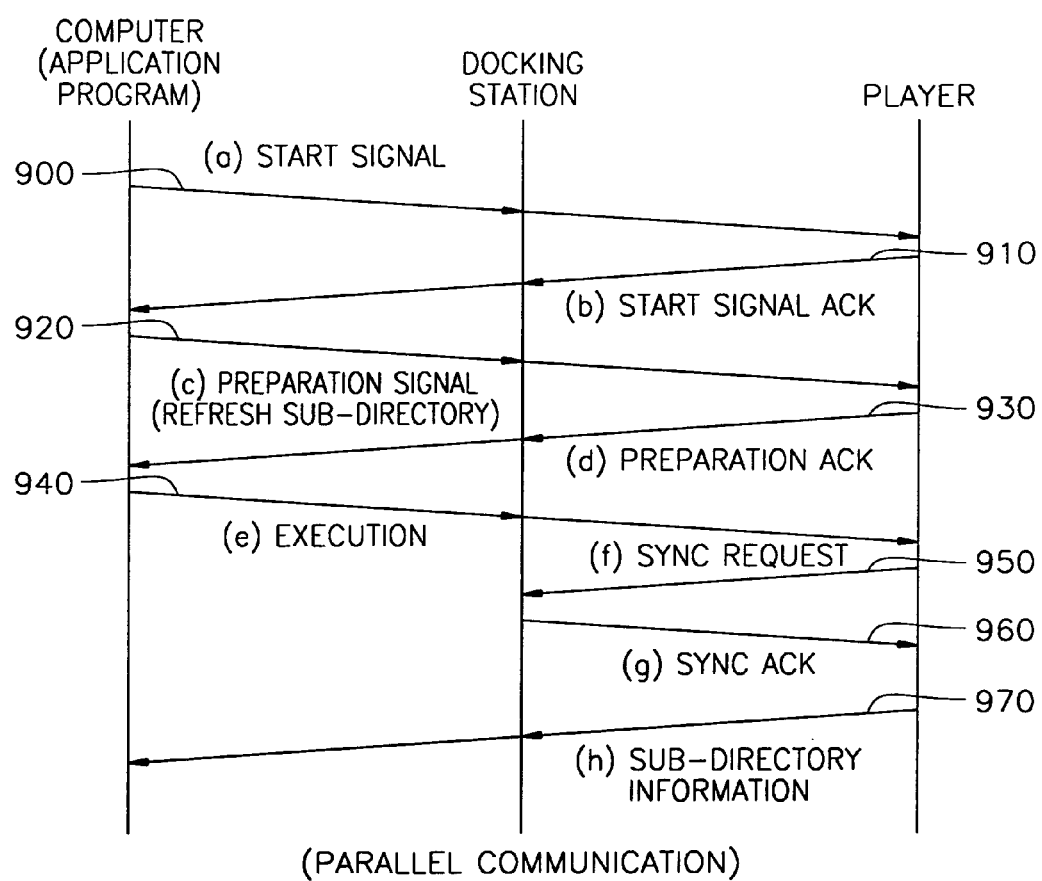
FIGS. 9A and 9B are simplified views of the execution order of 'refresh sub-directory' command according to an embodiment of the present invention.
Figure 9B:
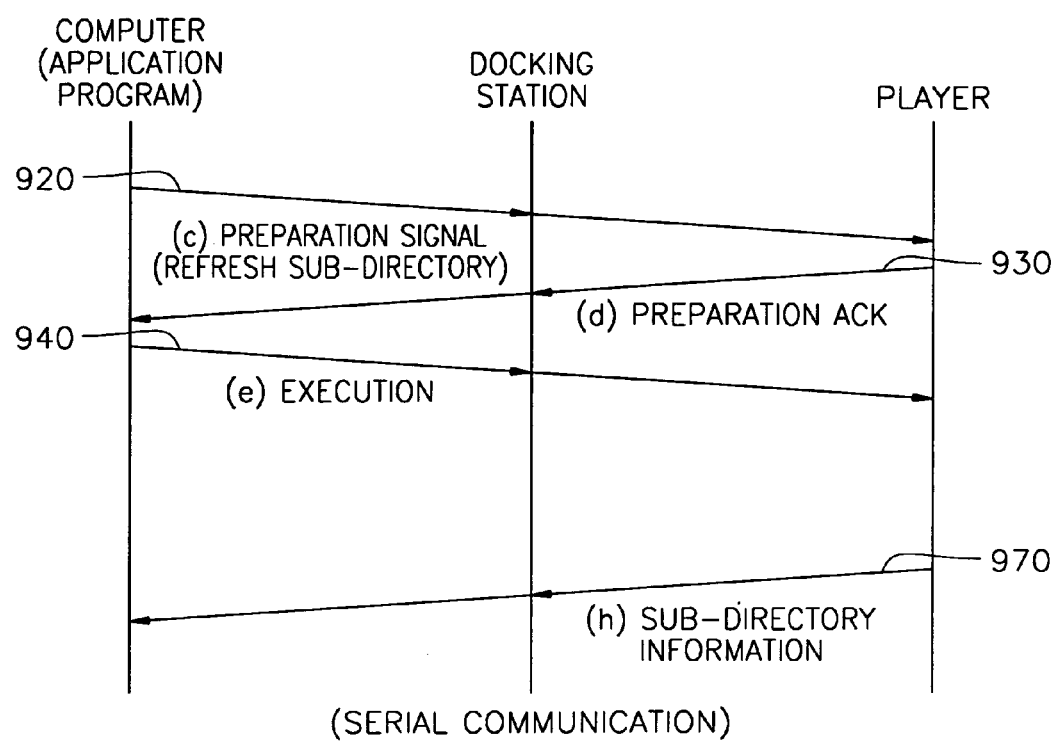
Figure 9C:
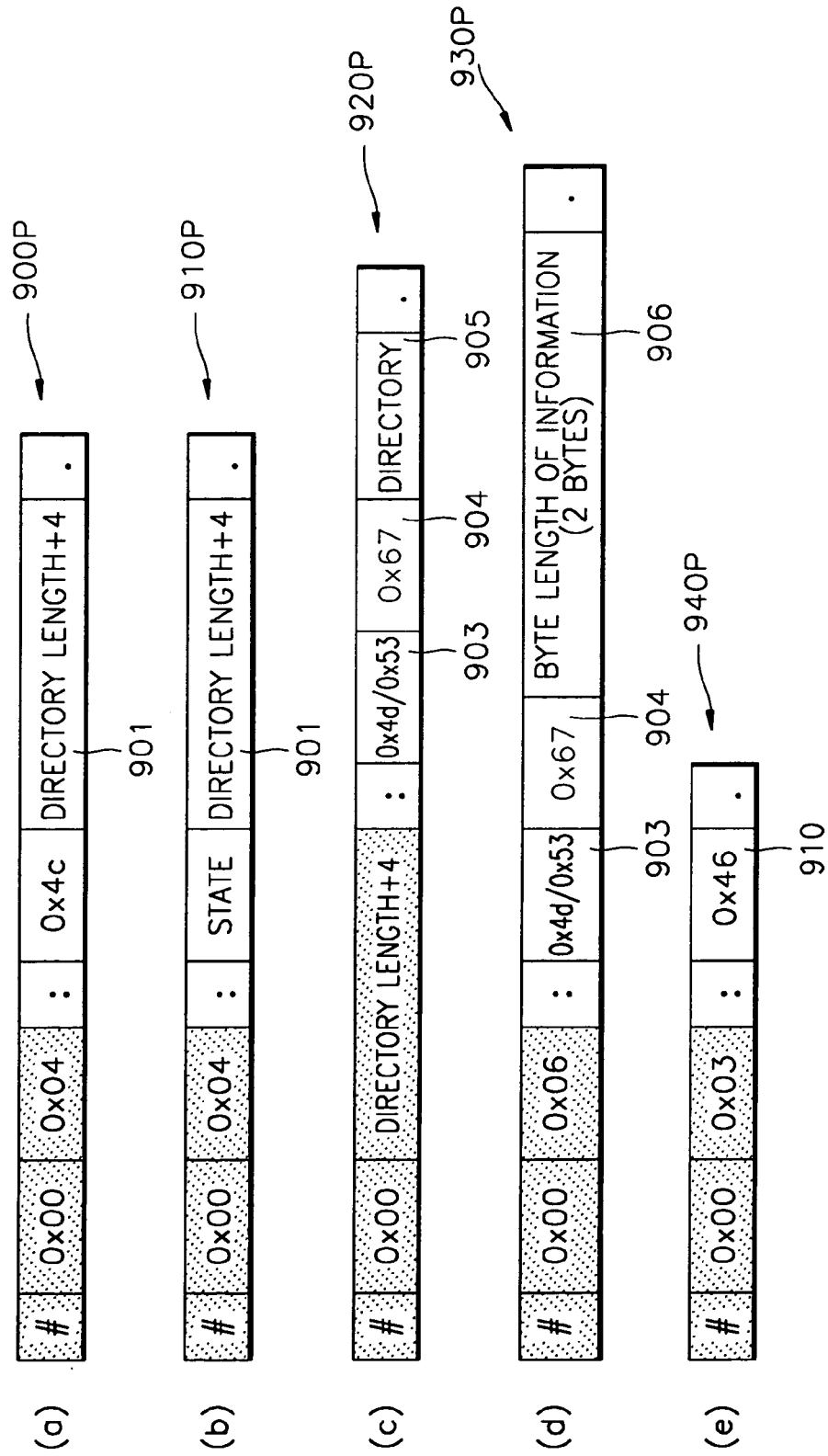
FIG. 9C shows an example of the structure of data which are sent and received in each step of FIGS. 9A and 9B.
Figure 9C:
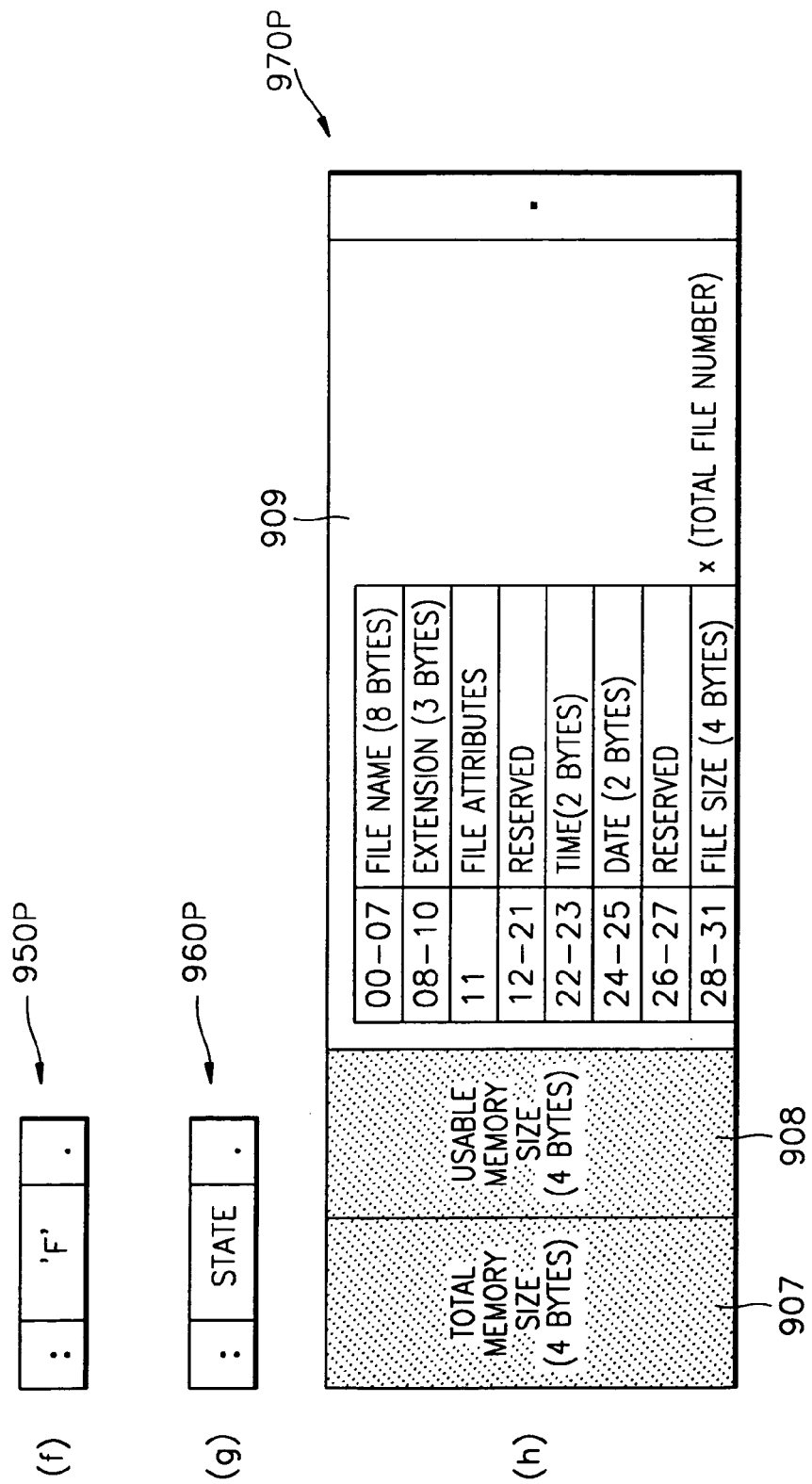

FIGS. 9A and 9B are simplified views of the execution order of 'refresh sub-directory' command according to an embodiment of the present invention, and FIG. 9C shows an example of the structure of data which are sent and received in each step of FIGS. 9A and 9B. Here, FIG. 9A shows parallel communications, while FIG. 9B shows serial communications. In serial communications, a start signal in step 900 and a start signal ACK in step 910 are not sent and received and synchronization between the docking station and the player in steps 950 and 960 is not carried out. Except for these differences, serial communications have the same steps as parallel communications. Hereafter, explanation will be made focusing on parallel communications. However, a start signal and a start signal ACK can be also used in serial communications when an application needs the signals.

First, a start signal in step 900, a start signal ACK in step 910, and the structures of packets 900P and 910P are similar to those used in FIGS. 6A and 6B. Here, the value of the next command length field 901 is set to a value obtained by adding 4 to the byte length of the corresponding sub-directory name, which is the same as the value of the command length field in (c) packet 920P in the step 920.

Next, the application program of the computer sends 'refresh sub-directory' request command or 'refresh sub-directory' preparation signal in the form of (c) packet 920P of FIG. 9C to the player in step 920.

(c) packet 920P includes the basic fields (the value of the command length field is a value obtained by adding 4 to the byte length of the corresponding sub-directory name), a media field 903 for indicating the type of media or memories, a code value field 904 having a value '0x67', and a directory name field 905. The value of the media field 903 is set to 0x4d for an internal memory, and is set to 0x53 for an external memory.

When the player is ready to refresh the corresponding sub-directory (that is, when the player is ready to return all the file information of the corresponding sub-directory), the player returns preparation ACK in the form of (d) packet 930P of FIG. 9C to the computer in step 930. The basic fields (the value of the command length field is 0x06), the media field 903, and the code value field 904 of (d) packet 930P have the same meaning as in (c) packet 920P. Also, (d) packet 930P includes a byte-length-of-information field 906 having a 2-byte length for indicating information on the length of total data to be returned in step 970. Here, referring to the byte-length-of-information field 906 of (d) packet 930P, the number of total files on the corresponding sub-directory can be calculated by the equation 1, the same as in the 'refresh root directory' command.

When the application program of the computer receives (d) packet 930P, the application program sends an execution command for executing 'refresh sub-directory' request command sent in the step 920 in the form of (e) packet 940P of FIG. 9C to the player in step 940. As in the FIG. 8C, (e) packet 940P includes the basic fields (the value of the command length field is 0x03), and the code value field 910 having a value '0x46'.

Next, when the system includes a docking system, synchronization between the player and the docking station is carried out in steps 950 and 960. For this, the player sends a synchronization request in the form of (f) packet 950P to the docking station in step 950. (f) packet 950P includes ':' separator, a command code of character 'F', and '.' separator.

When the docking station is ready to mediate information communications, the docking station returns synchronization ACK in the form of (g) packet 960P to the player in step 960. As in the FIG. 8C, (g) packet 960P includes ':' separator, a state information field, and '.' separator. Here, the state value in the state information field indicates the success/failure state value.

Finally, the player returns file information on each file of the corresponding sub-directory in the form of (h) packet 970P of FIG. 9C in step 970. The structure of (h) packet 970P and the meaning of each field are the same as in (h) packet 870P of FIG. 8C.

9. Download

'Download' command or 'file download' command is used to send or copy a file on a computer through a serial cable or a parallel cable to an internal memory or an external memory installed in the player. Since the execution of download results in a new file generated in the player, it is preferable that after download is executed, above-described 'refresh root directory' command or 'refresh sub-directory' command is executed.

Figure 10A:
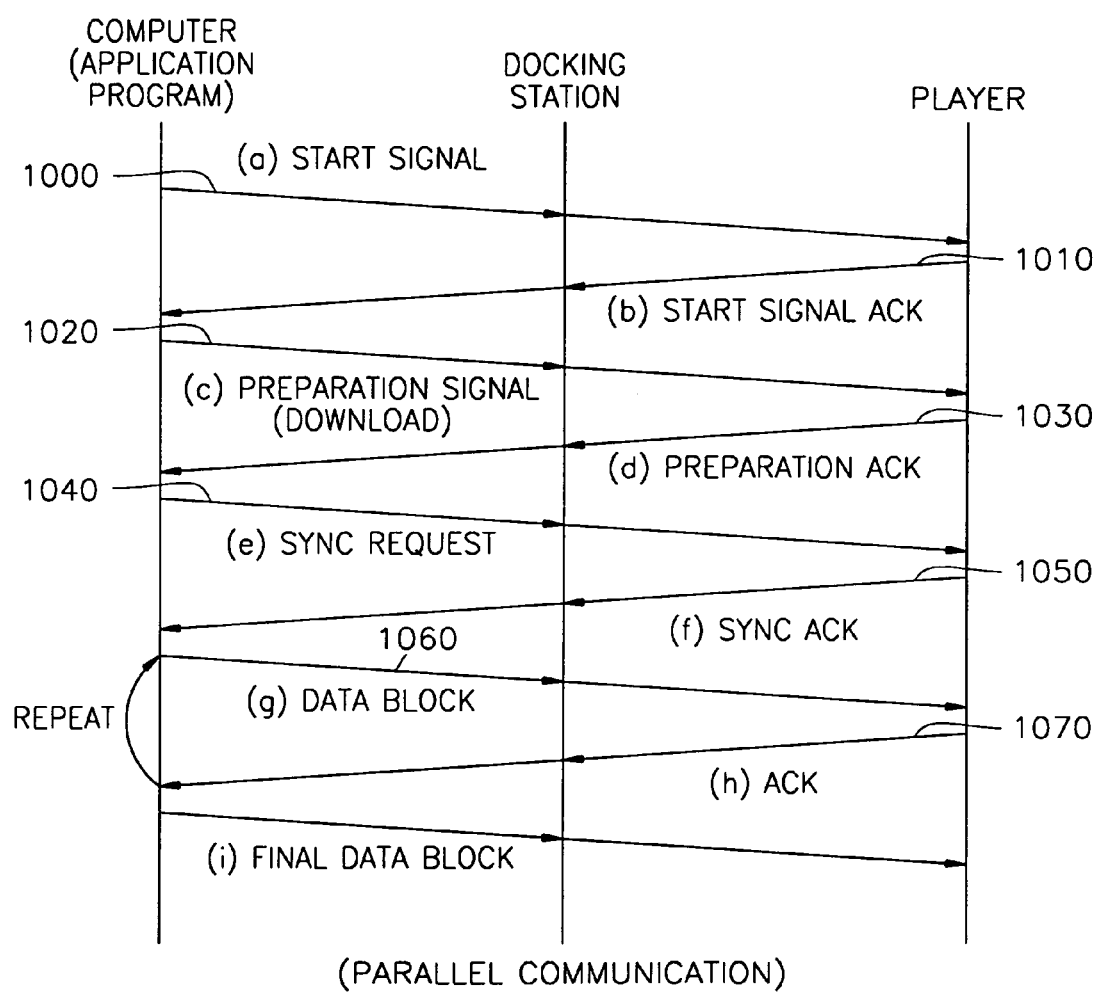
FIGS. 10A and 10B are simplified views of the execution order of 'file download' command according to an embodiment of the present invention.
Figure 10B:
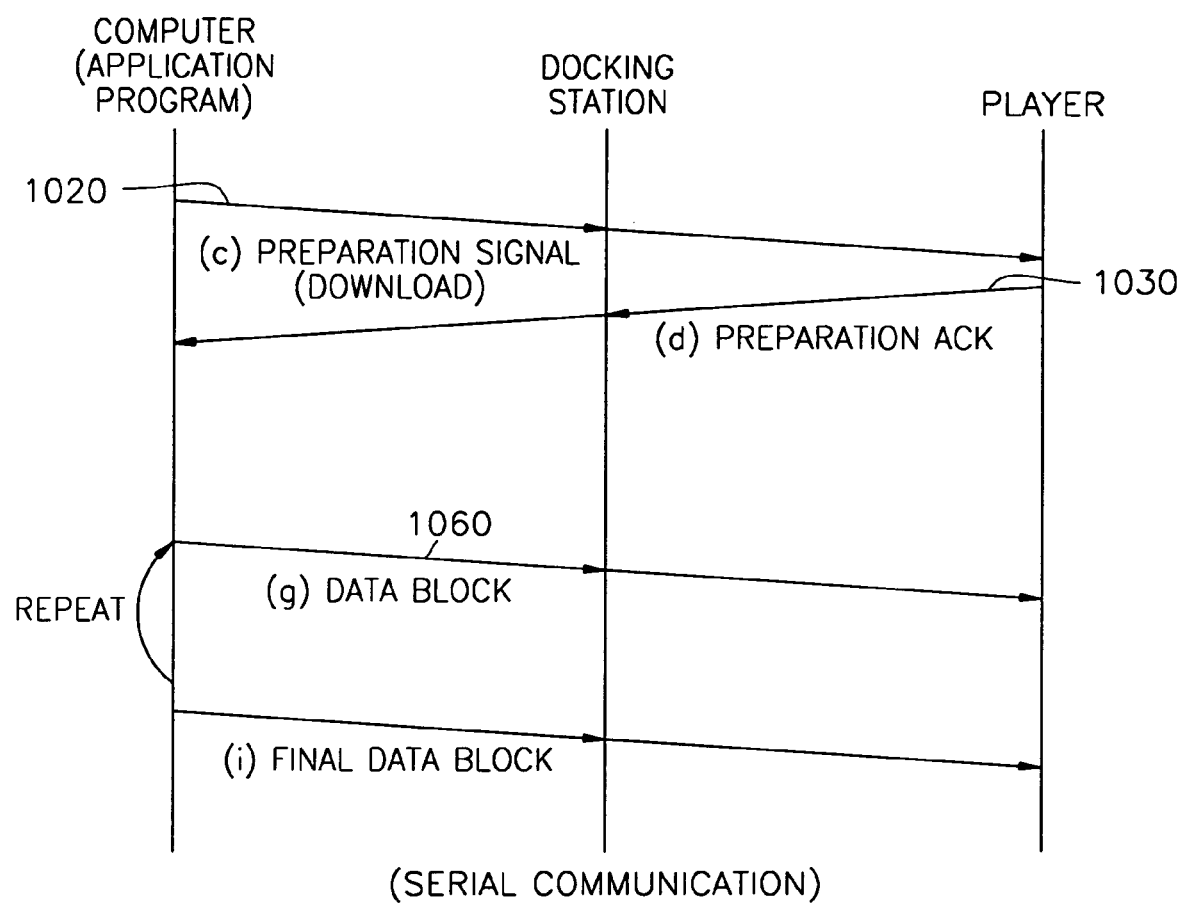

FIGS. 10A and 10B are simplified views of the execution order of 'file download' command according to an embodiment of the present invention, and FIG. 10C shows an example of the structure of data which are sent and received in each step of FIGS. 10A and 10B. Here, FIG. 10A shows parallel communications, while FIG. 10B shows serial communications. In serial communications, a start signal in step 1000 and a start signal ACK in step 1010 are not sent and received; synchronization between the computer and the player in steps 1040 and 1050 is not carried out; and receiving ACK in step 1070 is not returned. Except for these differences, serial communications have the same steps as parallel communications. Hereafter, explanation will be made focusing on parallel communications. However, a start signal and a start signal ACK can be also used in serial communications when an application needs the signals.

First, a start signal in step 1000 and a start signal ACK in step 1010, the structures of packets 1000P and 1010P used in the steps 1000 and 1010, are similar to those used in FIGS. 6A and 6B. Here, the value of the next command length field 1001 is set to a value obtained by adding 12 (0x0c) to the byte length of the corresponding file name, which is the same as the value of the command length field in (c) packet 1020P of step 1020.

Next, the application program of the computer sends 'download' request command or 'download' preparation signal in the form of (c) packet 1020P of FIG. 10C to the player in step 1020.

(c) packet 1020P includes the basic fields (the value of the command length field is obtained by adding 12 to the byte length of the corresponding file name), a media field 1003 for indicating the type of media or memories, a code value field 1004 having a value '0x57', and a file information field 1005. The value of the media field 1003 is set to 0x4d for an internal memory, and set to 0x53 for an external memory. The file information field 1005 includes a file name field, a date field having a 2-byte length for indicating the last modification date, a time field having a 2-byte length for indicating the last modification time, and a file size field having a 4-byte length.

Here, it is preferable that a file name is expressed in a fixed 8.3 format in order to raise the efficiency of implementation. In the fixed 8.3 format, a file name, excluding the extension, is expressed in an 8-byte fixed-length (excluding the character '\' for indicating a directory), and a file extension is expressed in a 3-byte fixed-length.

For example, a file name "\sample.mp3" is expressed as in the following Table 3.

TABLE 3

| \ | s | a | m | p | l | e |   | m | p | 3 |
|---|---|---|---|---|---|---|---|---|---|---|

That is, when a file name excluding the extension is longer than 8 bytes, characters after 8 bytes are not expressed, while when the file name excluding the extension is shorter than 8 bytes, empty characters (space character or character NULL) are used to fill the remaining space. Separator '.' is not expressed. When the extension is longer than 3 bytes, the characters after 3 bytes are not expressed, and when the extension is shorter than 3 bytes, empty characters are used to fill the remaining space. If a directory hierarchy structure is not used, the first character '\' can be ignored. A file name can includes a directory hierarchy structure (in this case, an extended file name is referred to), and in this case, each directory name is added to a place in front of the Table 3 in the form of a fixed 8.3 format.

When the player is ready to receive a corresponding file, the player returns preparation ACK in the form of (d) packet 1030P of FIG. 10C to the computer in step 1030. The basic fields (the value of the command length field is obtained by adding 14 to the byte length of the corresponding file name), a media field 1003, a code value field 1004, and a file information field 1005 of (d) packet 1030P has the same meaning as those in (c) packet 1020P. However, when there is no surplus space in the memory of the player for storing the downloaded file, the file size of the file information field 1005 is set to '0', while when the player already has the same file as the file to be downloaded, the first character of the file name of the file information field 1005 is set to '?'.

(d) packet 1030P includes a block size field 1006 having a 2-byte length for indicating byte size information in units of block of transmission data in step 1060. Here, the value of the block size field 1006 of (d) packet 1030P is set to a positive integer, and the byte size or length in units of block of transmission data in step 1060 is calculated as the following equation 2.

$$\text{Byte size (length) of transmission data} = 512 * 2^{block\ size} \quad (2)$$

When the application program of the computer receives (d) packet 1030P, synchronization for file download between the player and the computer is carried out in steps 1040 and 1050. For this, the application program of the computer sends a synchronization request in the form of (e) packet 1040P to the player in step 1040. (e) packet 1040P includes ':' separator, a command code '0x44', and '.' separator. Here, the reason why '#' separator is not used is that the docking station must be synchronized together for file download.

When the player is ready to synchronize with the player, the player sends a synchronization ACK in the form of (f) packet 1050P to the application program in step 1050. (f) packet 1050P includes ':' separator, a state information field indicating the success/failure state value, and '.' separator.

When the application program finishes synchronization with the player, that is, when the application program receives (f) packet 1050P, the application program calculates the byte size in units of block of transmission data according to the equation 2, referring to the value of the block size field 1006 of (d) packet 1030P in the step 1030, and sends the corresponding file in units of a block 1060P to the player in step 1060.

The player returns ACK in the form of (h) packet 1070P for each block on whether or not the block is normally received in step 1070.

The steps 1060 and 1070 are repeated until transmission of the corresponding file is completed. However, it is preferable that for the last block, only the remaining data block 1080P is sent without sending a data block as much as the byte size obtained by the equation 2, in step 1080. Also, for the last block, a separate receiving ACK does not need to be returned.

10. Extended Download

'Extended download' command performs the same functions as the above-described 'download' command, while 'extended download' command can be applied optimally to a file format compatible to a solid state floppy disc card (SSFDC). It is preferable that refresh command for the corresponding directory is executed after executing download, as we have seen already.

Figure 11A:
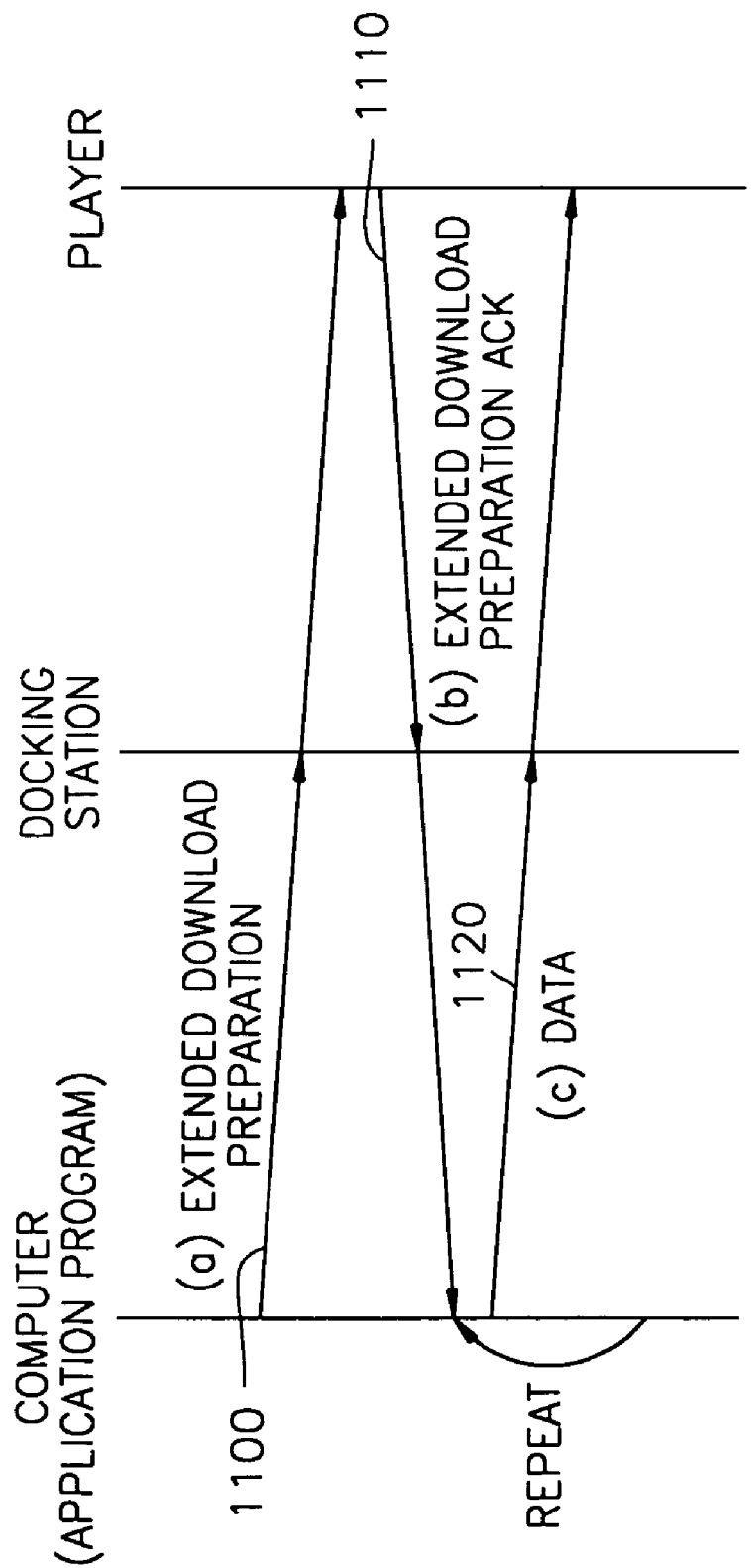
FIG. 11A is a simplified view of the execution order of 'extended download' command according to an embodiment of the present invention.
Figure 11B:
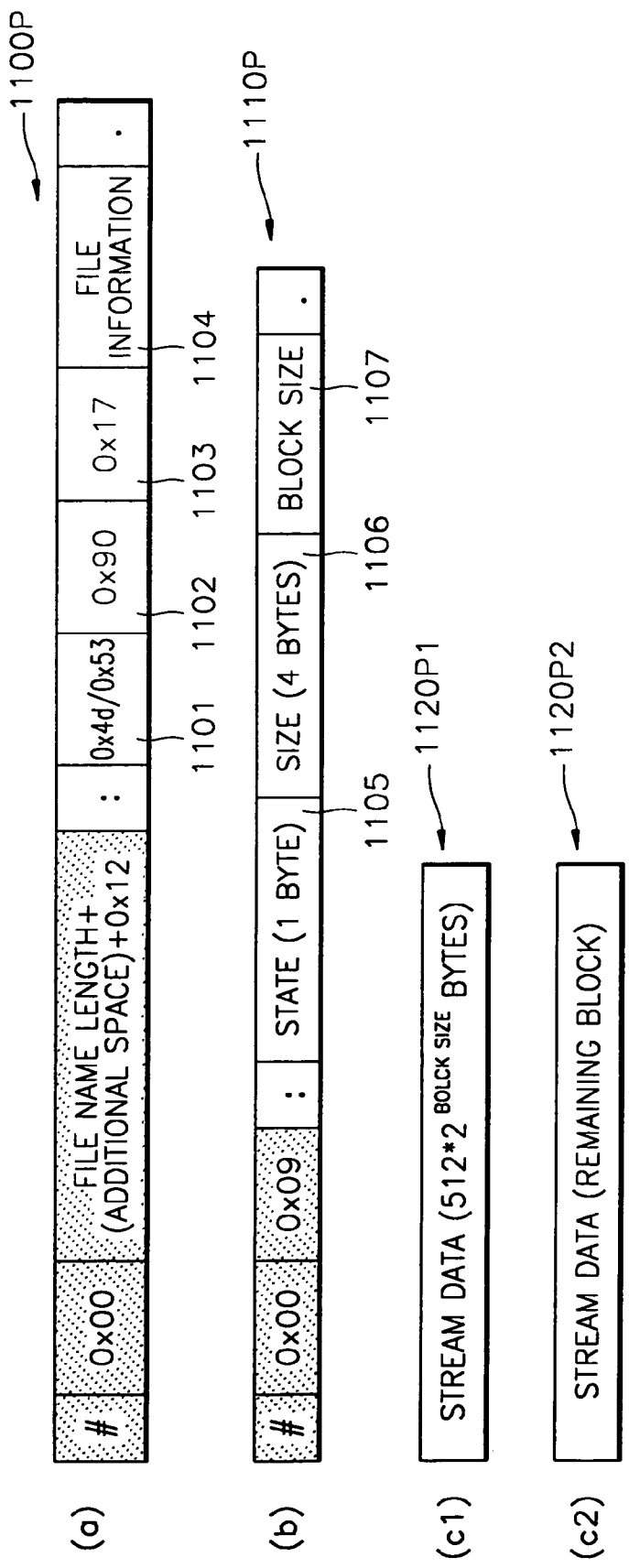
FIG. 11B shows an example of the structure of data which are sent and received in each step of FIG. 11A.

FIG. 11A is a simplified view of the execution order of 'extended download' command according to an embodiment of the present invention, and FIG. 11B shows an example of the structure of data which are sent and received in each step of FIG. 11A.

First, the application program of the computer sends 'extended download' request command or 'extended download' preparation signal in the form of (a) packet 1100P of FIG. 11B to the player in step 1100.

(a) packet 1100P includes the basic fields (the value of the command length field is obtained by adding 0x12 to the additional space for an extended file name and the byte length of the corresponding file name), a media field 1101 for indicating the type of media or memories, a 2 bytes long code value field 1102 having values '0x90' and '0x17', and a file information field 1104. The value of the media field 1101 is set to 0x4d for an internal memory, and set to 0x53 for an external memory. It is preferable that the file information field 1104 includes information shown in Table 4.

TABLE 4

| Type of file information | Byte length | Explanation |
| --- | --- | --- |
| Flag | 1 | 0x01: monitoring (whether or not to simultaneously reproduce) 0x02: generating a file 0x04: appending a file, when the file does not exist, generating the file 0x08: screening (whether or not to watermark for copy prevention) |
| File attributes | 1 | 0x01: read-only file 0x02: hidden file 0x04: system file 0x08: volume ID 0x0f: long file name (Reserved) 0x10: directory 0x20: Write0(Reserved) |
| Date | 2 | DOS file date |
| Time | 3 | DOS file time |
| File size | 4 | File size |
| Time-out (time limit) | 1 | Time Limit for response |
| File name length | 2 | File name length (0x00, 0x0b) |
| Additional space | 0 | Space for extended file name |
| File name | 12 (0x0c) | Fixed 8.3 format |

Among the flags, monitoring flag for indicating simultaneous reproduction shows whether or not to reproduce a file during downloading the file. Screening flag shows whether or not to include watermark information for copy prevention.

Among file attributes, the volume ID means the identifier of media or memories, and the long file name and Write0 are reserved codes for future use.

Time-out represents the time limit for response to the 'extended download' preparation signal by the player. If there is no response in the corresponding time, download of the corresponding file is stopped.

File name length is set to 0x000b (expressed in total 2 bytes) when the corresponding file name is not an extended file name. Additional space is a space to be used for an extended file name.

When the player is ready to receive the corresponding file, the player returns 'extended download' preparation ACK in the form of (b) packet 1110P of FIG. 11B, to the computer in step 1110. (b) packet 1110P has the basic fields (the value of the command length field is 0x09), a state field 1105 for indicating the state values of Table 5, a 4-byte file size field 1106, and a 2-byte block size field 1107. Here, the file size field 1106 is used for providing the application program of the computer with information for appending a file, when a file having the same name as the download file name already exists on the player, and otherwise, the file size field 1106 is set to "0". The value of the block size field 1107 is set to a positive integer. The byte size or length in units of a block of transmission data in step 1120 is obtained the same as the equation 2, which is similar to 'file download'.

TABLE 5

| State value | Meaning |
|---|---|
| 0 | Success |
| 1 | Different from the size of a file previously opened |
| 2 | Insufficient memory space for transmitting a file |
| 3 | A file having the identical name exists already |
| 4 | No file having the identical name exist (In case of appending a file) |

Next, when the 'extended download' preparation ACK received in the step 1110 indicates a state that a file can be received, the application program of the computer, referring to the value of the block size field 1007 of (b) packet 1110P in the step 1110, calculates the byte size in units of a block of transmission data according to the equation 2, and sends the corresponding file on a block-by-block basis 1120P1 to the player in step 1120. However, it is preferable that for the last block, only the remaining data block 1120P2 is sent without sending a data block as much as the byte size obtained by the equation 2, which we have already seen.

It is preferable that 'extended download' command can be executed even when a separate ACK about whether or not a file is normally received is not returned from the player.

11. Upload

'Upload' command or 'file upload' command is a command for sending or copying a file on the internal memory or external memory installed in the player to the computer through a serial cable or a parallel cable.

Figure 12A:
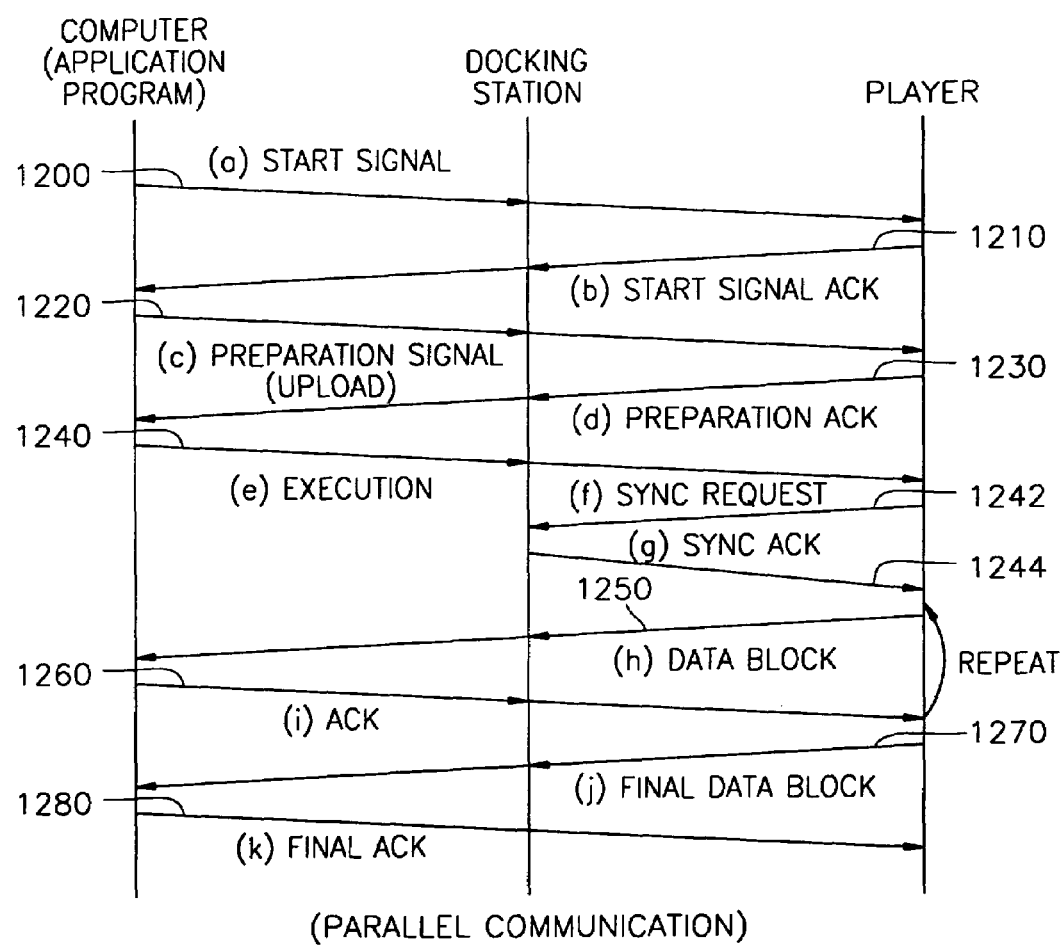
FIGS. 12A and 12B are simplified views of the execution order of 'file upload' command according to an embodiment of the present invention.
Figure 12B:
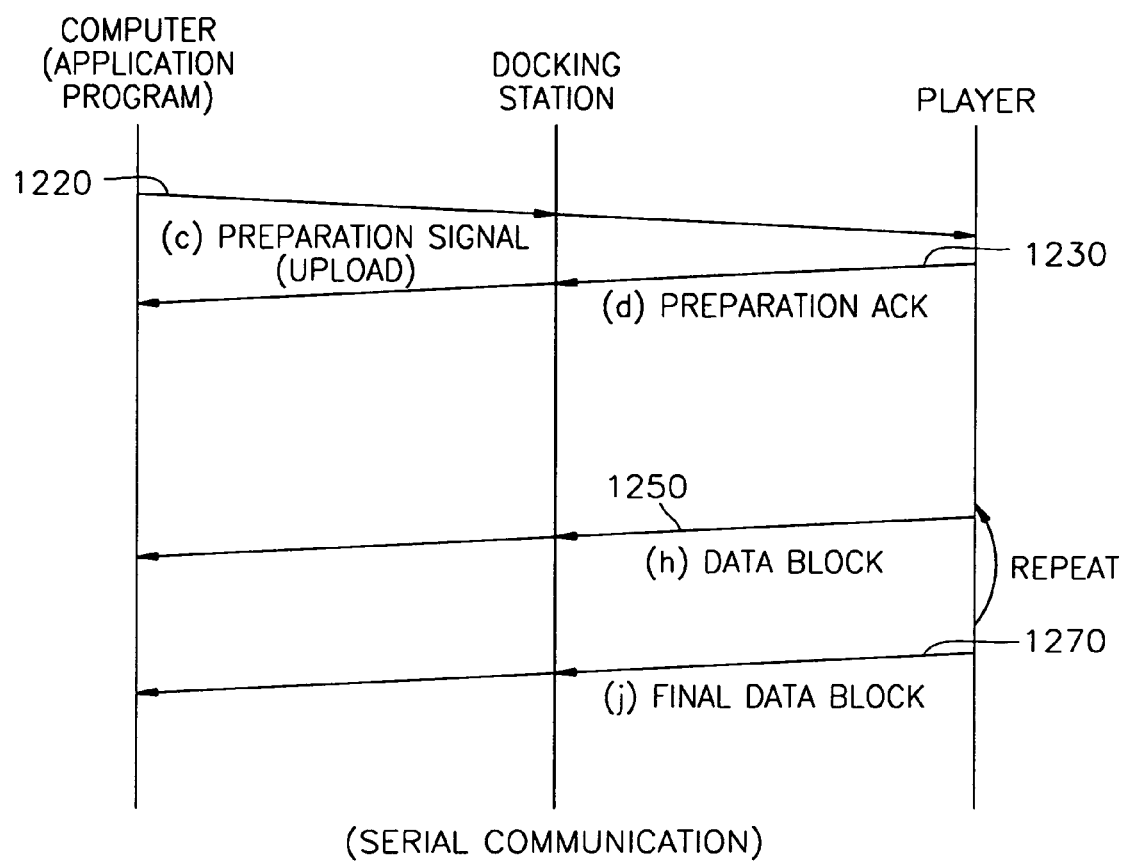
Figure 12C:
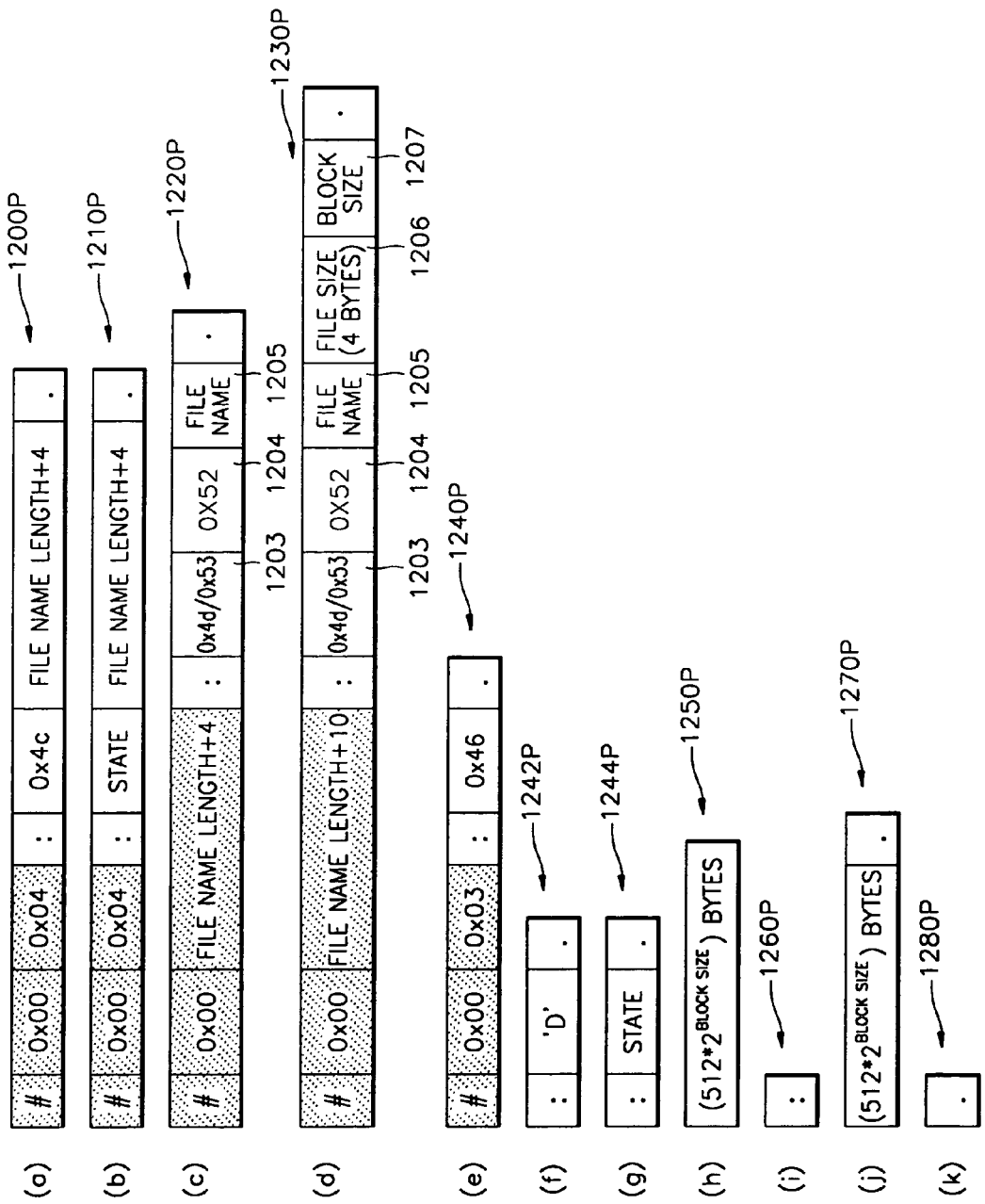
FIG. 12C shows the structure of data which are sent and received in each step of FIGS. 12A and 12B.

FIGS. 12A and 12B are simplified views of the execution order of 'file upload' command according to an embodiment of the present invention, and FIG. 12C shows the structure of data which are sent and received in each step of FIGS. 12A and 12B.

Here, FIG. 12A shows parallel communications, while FIG. 12B shows serial communications. Steps 1220, 1230, 1250 and 1270 in serial communications perform the same functions as the corresponding steps in parallel communications, and hereafter, explanation will be made focusing on parallel communications. However, a start signal and a start signal ACK can be also used in serial communications when an application needs the signals.

First, a start signal in step 1200 and a start signal ACK in step 1210, and the structures of packets 1200P and 1210P are the same as those used in FIGS. 6A and 6B. Here, the value of the next command length field is set to a value obtained by adding 4 to the byte length of the corresponding file name, which is the same as the value of the command length field in (c) packet 1220P in step 1220.

Next, the application program of the computer sends 'upload' request command or 'upload' preparation signal in the form of (c) packet 1220P of FIG. 12C to the player in step 1220.

(c) packet 1220P includes the basic fields (the value of the command length field is a value obtained by adding 4 to the byte length of the corresponding file name), a media field 1203 for indicating the type of media or memories, a code value field 1204 having a value '0x52', and a file name field 1205. Here, the file name of the file name field 1205 adopts the fixed 8.3 format and an extended file name can also be used.

When the player is ready to send the corresponding file, the player returns a preparation ACK in the form of (d) packet 1230P to the computer in step 1230. The basic fields (however, the value of the command length field is a value obtained by adding 10 to the byte length of the corresponding file name), the media field 1203, the code value field 1204, and the file name field 1205 of (d) packet 1230P have the same meaning as those in (c) packet 1220P. However, when an upload file does not exist, all characters in the file name field are set to '?'.

(d) packet 1230P includes the file size field 1206 of the upload file and the 2-byte block size field 1207 for showing byte size information in units of a block of transmission data in step 1250. Here, the value of the block size field 1207 in (d) packet 1230P is set to a positive integer, and the byte size or length in units of a block of transmission data in the step 1250 is obtained from the equation 2. Also, in the upload command according to the embodiment of the present invention, file size information of the upload file is provided for the player so that the system can efficiently respond when an external memory is changed.

When the application program of the computer receives (d) packet 1230P, the application program sends an execution command for executing 'upload' request command sent in the step 1220 in the form of (e) packet 1240P to the player in step 1240. (e) packet 1240P includes the basic fields (the value of the command length field is 0x03) and a code value field having a value '0x46'.

Next, when the player receives (e) packet 1240P, a synchronization with the docking station is carried out to upload a file in steps 1242 and 1244. For this, the player sends a synchronization request in the form of (f) packet 1242P to the docking station in step 1242. (f) packet 1242P includes ':' separator, a command code of character 'D', and '.' separator.

When the docking station is ready for synchronization, the docking station returns a synchronization ACK in the form of (g) packet 1244P to the player in step 1244. (g) packet 1244P includes ':' separator, a state information field having a success/failure state value, and '.' separator. When a docking station does not exist, the steps 1242 and 1244 are not carried out.

Next, referring to the value of the block size field 1207 of (d) packet 1030P in the step 1030P, the player calculates the byte size in units of a block of transmission data according to the equation 2, and then sends the corresponding file on a block-by-block basis to the computer in step 1250. The computer answers whether or not each block is normally received, by sending an ACK in the form of (i) packet 1260P in step 1260.

However, the last block is sent after '.' separator is added to a data block having the byte size according to the equation 2 so that it can be shown that the data block is the last data block, in step 1270. It is preferable that only the remaining data in the last data block is sent, but considering the overhead of the player, a data block having the byte size according to the equation 2 is sent. The computer answers whether or not the last block is normally received through (k) packet 1280P in step 1280.

12. Delete File

'Delete file' command is a command for deleting a file on an internal memory or an external memory installed in the player.

Figure 13A:
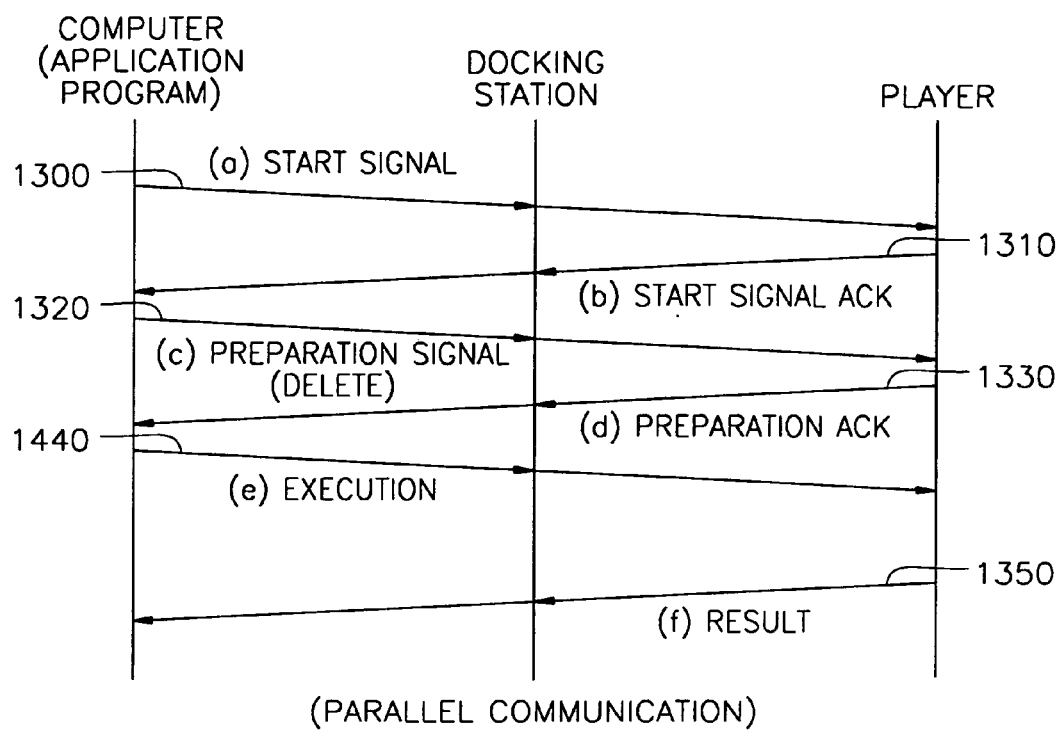
FIGS. 13A and 13B are simplified views of the execution order of 'delete file' command according to an embodiment of the present invention.
Figure 13B:
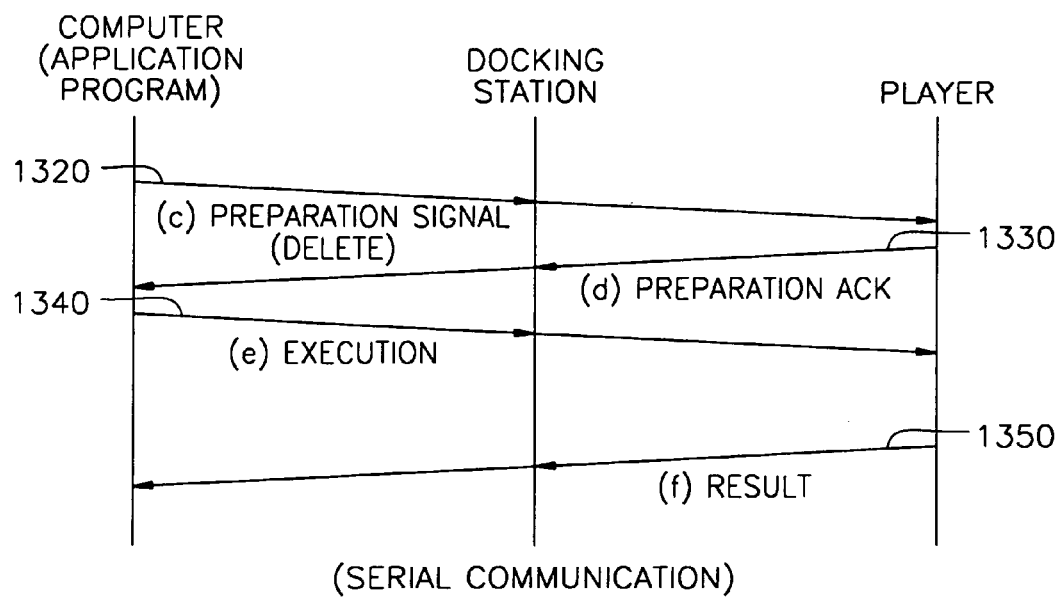
Figure 13C:
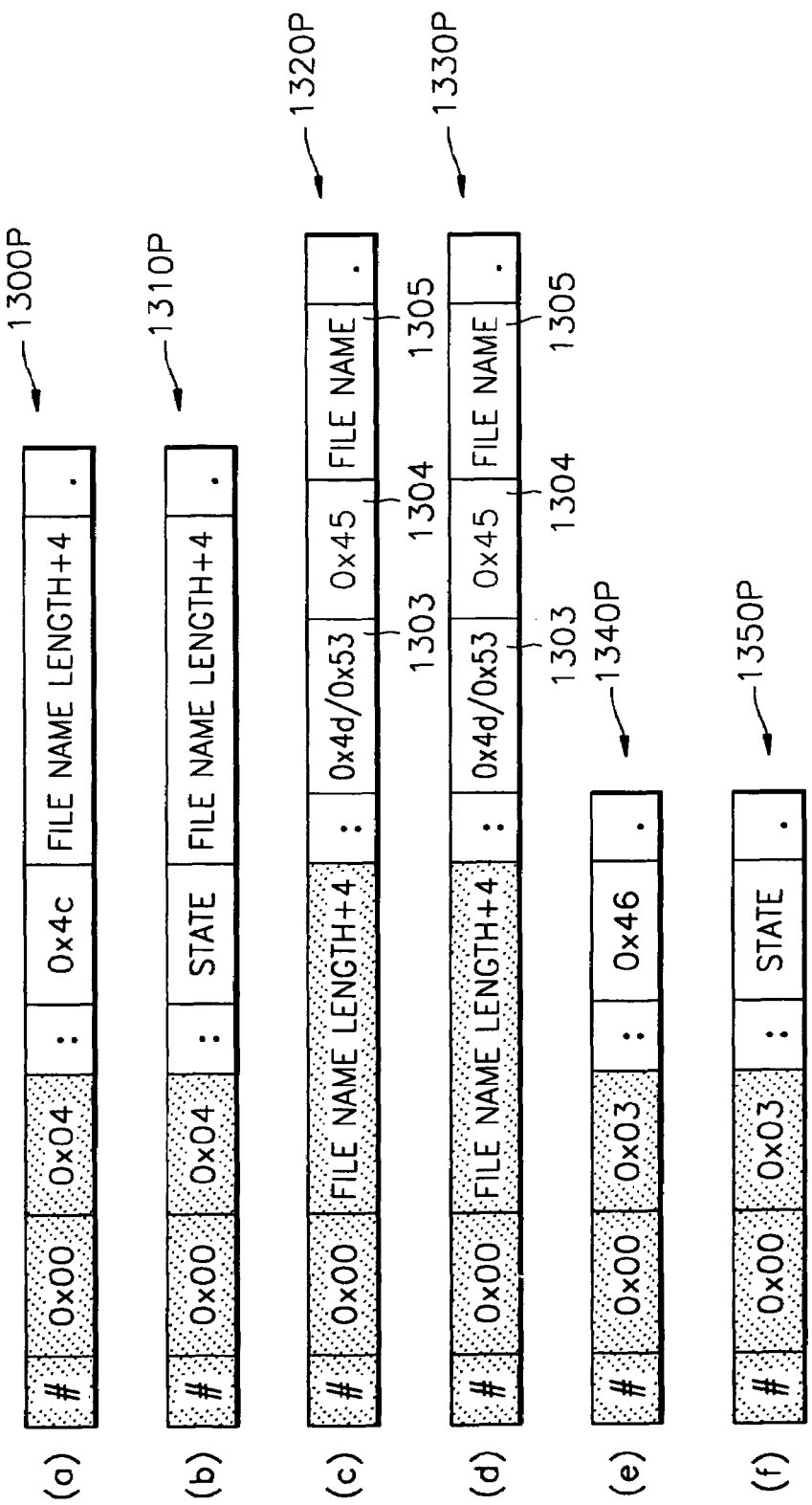
FIG. 13C shows the structure of data which are sent and received in each step of FIGS. 13A and 13B.

FIGS. 13A and 13B are simplified views of the execution order of 'delete file' command according to an embodiment of the present invention, and FIG. 13C shows the structure of data which are sent and received in each step of FIGS. 13A and 13B. Here, FIG. 13A shows shows parallel communications, while FIG. 13B shows serial communications.

In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 1300 and a start signal ACK in step 1310, and the structures of packets 1300P and 1310P are the same as those used in FIGS. 6A and 6B. Here, the value of the next command length field is set to a value obtained by adding 4 to the byte length of the corresponding file name, which is the same as the value of the command length field in (c) packet 1320P in step 1320.

Next, the application program of the computer sends 'delete file' request command or 'delete file' preparation signal in the form of (c) packet 1320P of FIG. 13C to the player in step 1320. (c) packet 1320P includes the basic fields (the value of the command length field is a value obtained by adding 4 to the byte length of the corresponding file name), a media field 1303 for indicating the type of media or memories, a code value field 1304 having a value '0x45', and a file name field 1305. The value of media field 1303 is set to 0x4d for an internal memory, and is set to 0x53 for an external memory. The file name of the file name field 1305 basically adopts the fixed 8.3 format and an extended file name can also be used.

When the player is ready to delete the corresponding file, the player returns (d) packet 1330P, which has the same structure and field values as those of (c) packet received in the step 1320, to the computer in step 1330. However, when the corresponding file does not exist, all characters in the file name field 1305 are changed into '?' and then returned.

When the application program of the computer receives the same packet as (c) packet of the step 1320 sent by the application program, the application program sends an execution command, for executing 'delete file' request command sent in the step 1320, in the form of (e) packet 1340P of FIG. 13C to the player in step 1340. (e) packet 1340P includes the basic fields (the value of the command length field is 0x03) and a code value field having a value '0x46'.

Finally, when the player receives the execution command, the player deletes the corresponding file and returns the result in the form of (f) packet 1350P of FIG. 13C in step 1350. (f) packet 1350P includes the basic fields (the value of the command length field is 0x03), and a field for indicating state information. The state value of the state field has the same meaning as in the Table 2.

13. Change File Name

'Change file name' command is a command for renaming a file in an internal memory or an external memory installed in the player.

Figure 14A:
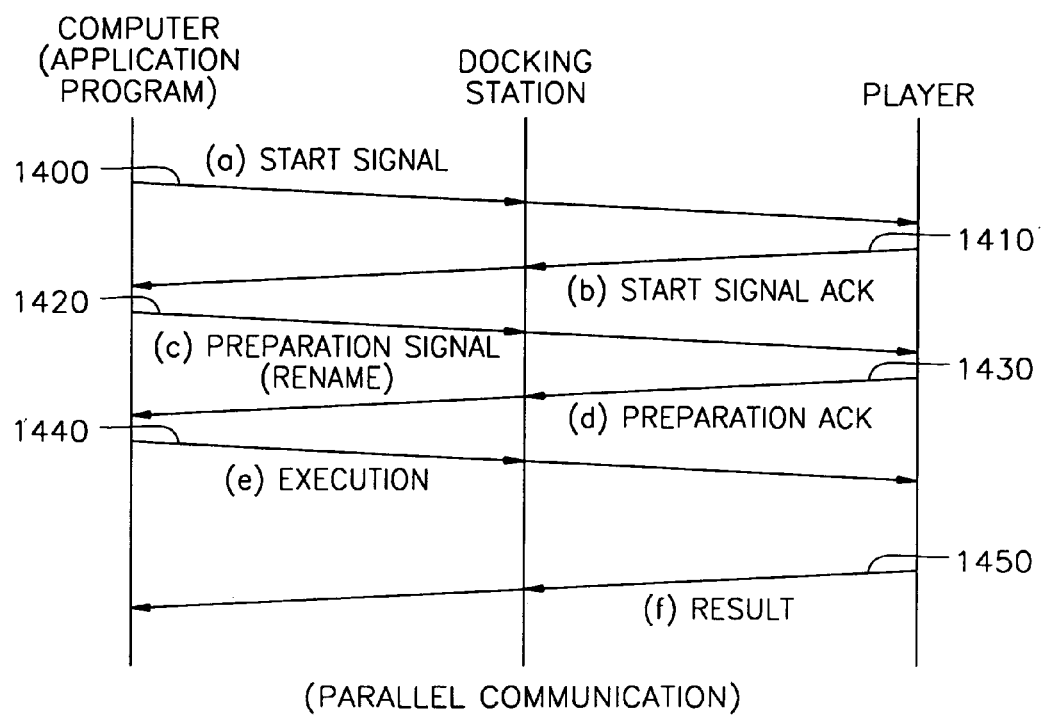
FIGS. 14A and 14B are simplified views of the execution order of 'change file name' command according to an embodiment of the present invention.
Figure 14B:
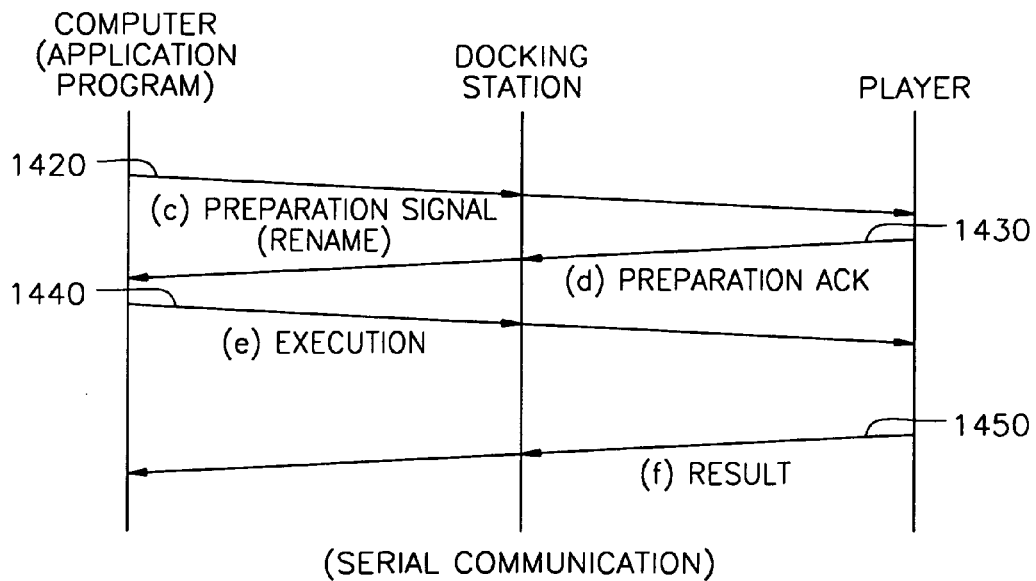

FIGS. 14A and 14B are simplified views of the execution order of 'change file name' command according to an embodiment of the present invention, and FIG. 14C shows the structure of data which are sent and received in each step of FIGS. 14A and 14B. Here, FIG. 14A shows parallel communications, while FIG. 14B shows serial communications. In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 1400 and a start signal ACK in step 1410, the structures of packets 1400P and 1410P used in the steps 1400 and 1410, are similar to those used in FIGS. 6A and 6B. Here, the value of the next command length field is set to a value obtained by adding 5 to the byte length of the original fine name before renaming and the byte length of the object file name after renaming, which is the same as the value of the command length field in (c) packet 1420P of step 1420.

Next, the application program of the computer sends 'change file name' request command or 'change file name' preparation signal in the form of (c) packet 1420P of FIG. 14C to the player in step 1420. (c) packet 1420P includes the basic fields (the value of the command length field is obtained by adding 5 to the byte length of the original file name and the byte length of the object file name), a media field 1403 for indicating the type of media or memories, a code value field 1404 having a value '0x4e', and a file information field 1405. The value of the media field 1403 is set to 0x4d for an internal memory, and set to 0x53 for an external memory. The file information field 1405 includes the length of the original field, the file name of the original file, and the file name of the object file. Here, the length of the original file indicates the byte length of the file name of the original file.

Each file name basically adopts the fixed 8.3 format, and an extended file name can also be used. However, it is preferable that the extension of the file name is restricted not to change, because the file extension is used not only for indicating the type of digital contents stored in the corresponding file, but also for being a reference in security setting.

When the player is ready for executing to change the file name of the file, the player returns (d) packet 1430P having the same structure and same field values as (c) packet 1420P received in the step 1420 to the computer in step 1430. However, if the file to be renamed does not exist, the player returns the packet after changing all characters in the original file name in the file information field 1405 into '?'.

When the application program of the computer receives the same packet as (c) packet, which it sent in the step 1420, the application program sends an execution command, for executing 'change file name' request command sent in the step 1420, in the form of (e) packet 1440P to the player in step 1440. (e) packet 1440P includes the basic fields (the value of the command length field is 0x03) and a code value field having a value '0x46'.

Finally, when the player receives the execution command, the player changes the name of the file into the name of the object file, and then returns the result in the form of (f) packet 1450P of FIG. 14C in step 1450. (f) packet 1450P includes the basic fields (the value of the command length field is 0x03), and a field for indicating state information. The value of the state field has the same meaning in the Table 2.

14. Change File Location

'Change file location' command is a command for replacing the reproducing order of a file on an internal memory or an external memory installed in the player.

In general, the reproducing order of the player is carried out in such a way that files in an internal memory are reproduced before those in an external memory and each file in those memories is reproduced in order of location in a file information table for managing information on all the files on each memory (for example, a file allocation table, FAT). Therefore, 'change file location' command is to change location of the corresponding file in the file information table.

Figure 15A:
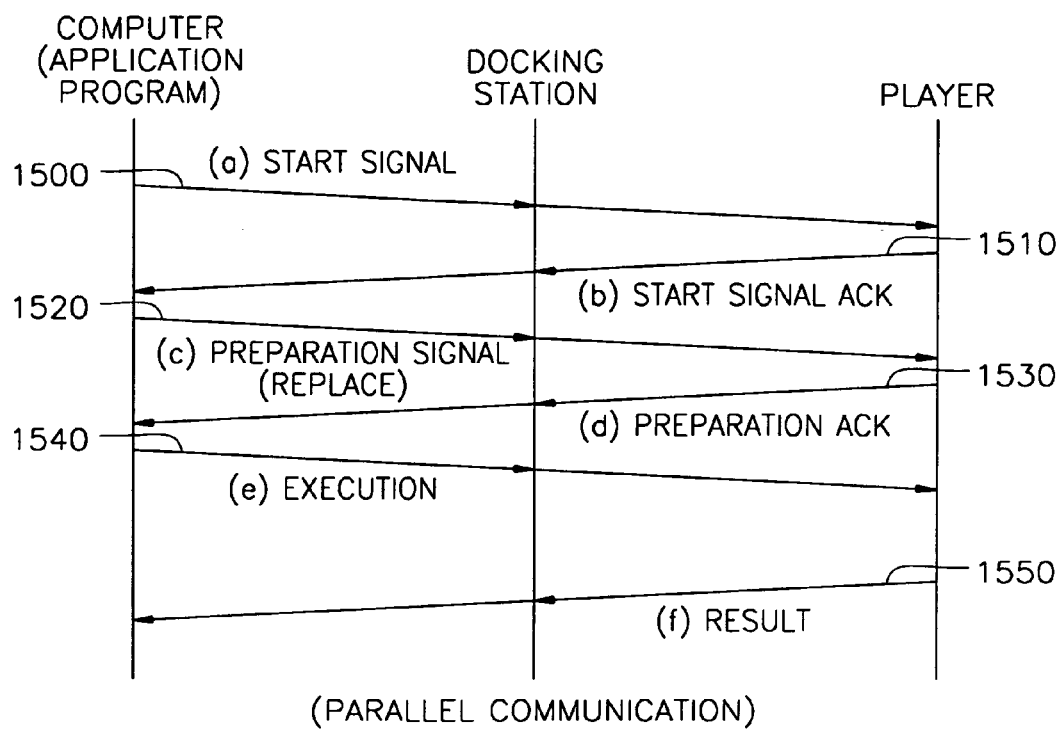
FIGS. 15A and 15B are simplified views of the execution order of 'change file location (replace)' command according to an embodiment of the present invention.
Figure 15B:
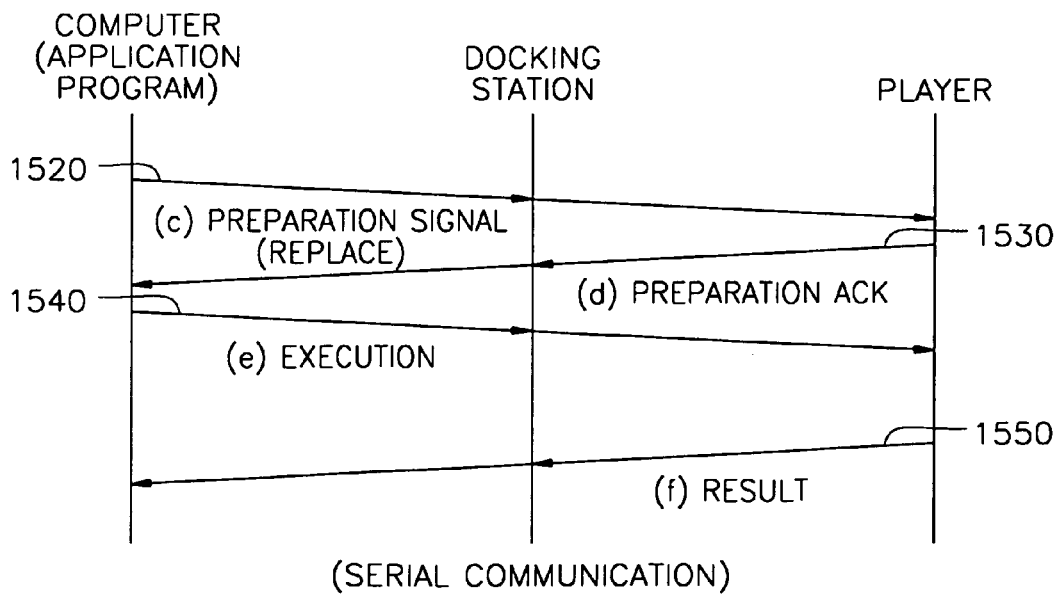
Figure 15C:
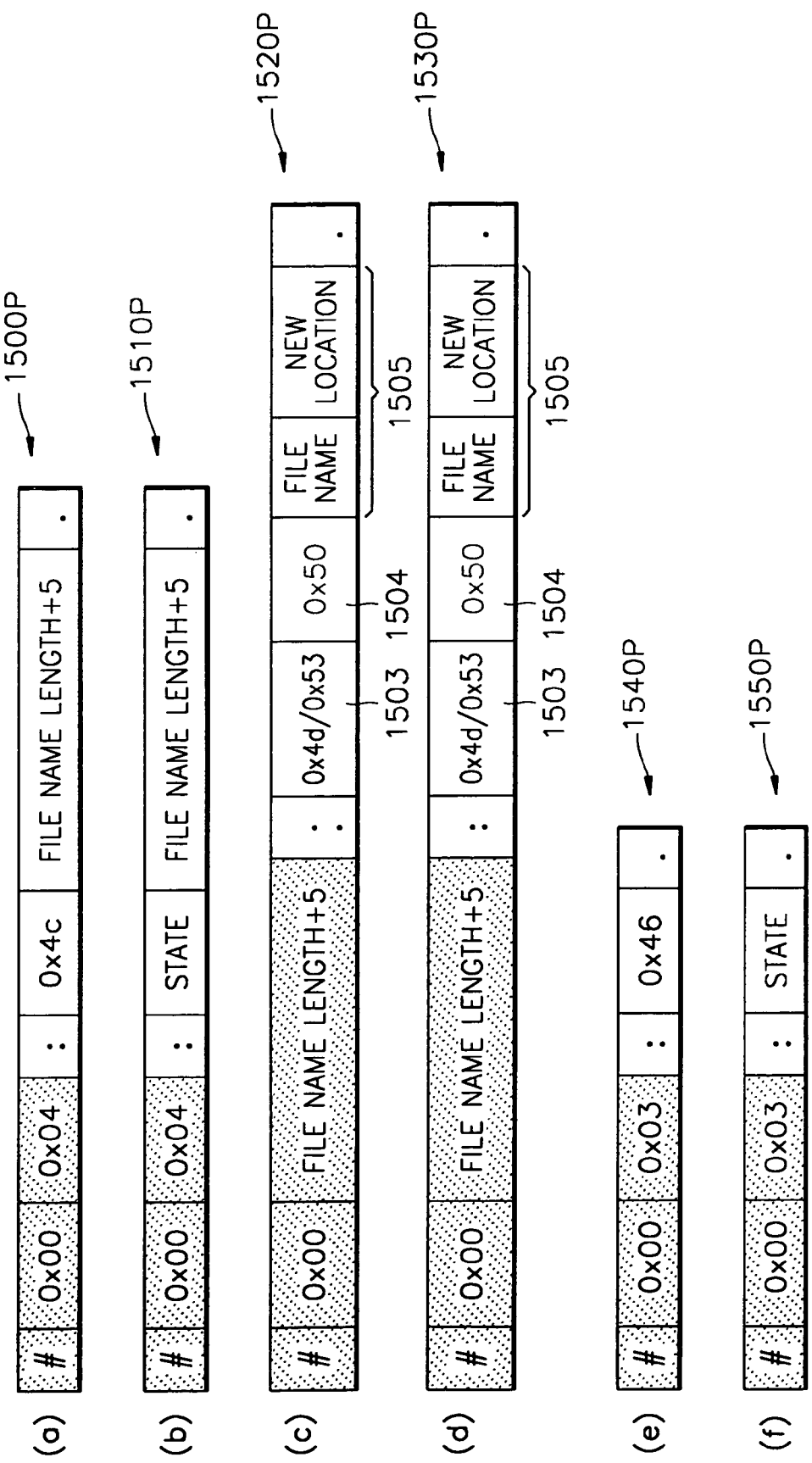
FIG. 15C shows the structure of data which are sent and received in each step of FIGS. 15A and 15B.

FIGS. 15A and 15B are simplified views of the execution order of 'change file location (replace)' command according to an embodiment of the present invention, and FIG. 15C shows the structure of data which are sent and received in each step of FIGS. 15A and 15B. Here, FIG. 15A shows parallel communications, while FIG. 15B shows serial communications. In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 1500 and a start signal ACK in step 1510, the structures of packets 1500P and 1510P used in the steps 1500 and 1510 are similar to those used in FIGS. 6A and 6B. Here, the value of the next command length field is set to a value obtained by adding 5 to the byte length of the file name, which is the same as the value of the command length field in (c) packet 1520P of step 1520.

Next, the application program of the computer sends 'change file location' request command or 'change file location' preparation signal in the form of (c) packet 1520P of FIG. 15C to the player in step 1520. (c) packet 1520P includes the basic fields (the value of the command length field is obtained by adding 5 to the byte length of the file name), a media field 1503 for indicating the type of media or memories, a code value field 1504 having a value '0x50', and a file information field 1505. The value of the media field 1503 is set to 0x4d for an internal memory, and set to 0x53 for an external memory. The file information field 1505 includes the file name and the new location after changing location. Here, the new location indicates the location of the corresponding file in the file information table. File names basically adopt the fixed 8.3 format, and extended file names can also be used.

When the player is ready for executing to change the location of the file, the player returns (d) packet 1530P having the same structure and same field values as (c) packet 1520P received in the step 1520, to the computer in step 1530. However, if the file does not exist, the player returns the packet after changing all characters in the file name in the file information field 1505 into '?'.

When the application program of the computer receives the same packet as (c) packet, which it sent in the step 1520, the application program sends an execution command, for executing 'change file location' request command sent in the step 1520, in the form of (e) packet 1540P to the player in step 1540. (e) packet 1540P includes the basic fields (the value of the command length field is 0x03) and a code value field having a value '0x46'.

Finally, when the player receives the execution command, the player changes the location of the file in the file information table, and then returns the result in the form of (f) packet 1550P in step 1550. (f) packet 1550P includes the basic fields (the value of the command length field is 0x03), and a field for indicating state information. The state value of the state field has the same meaning in the Table 2.

15. Register Key

'Register key' command is a command for registering a key, which is unique to the player required in reproducing a security file in the player, to the player. The registered key is stored in the internal memory of the player.

Figure 16A:
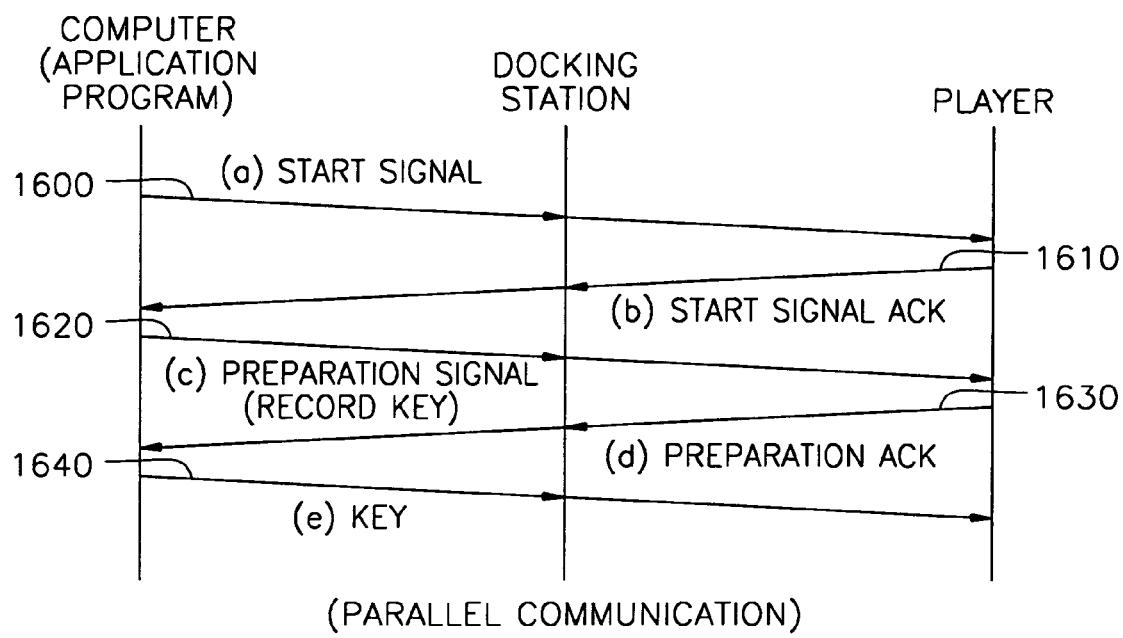
FIGS. 16A and 16B are simplified views of the execution order of 'register key' command according to an embodiment of the present invention.
Figure 16B:
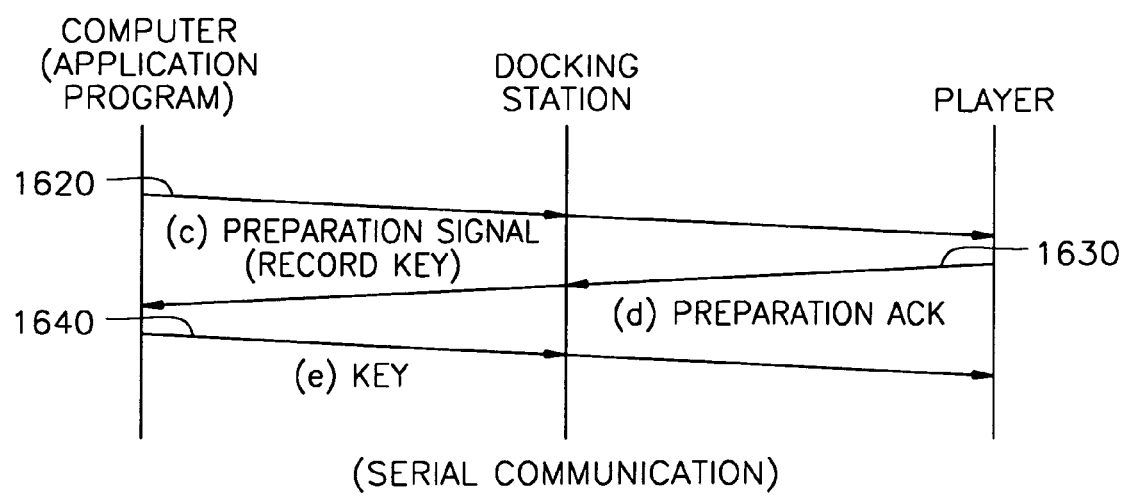
Figure 16C:
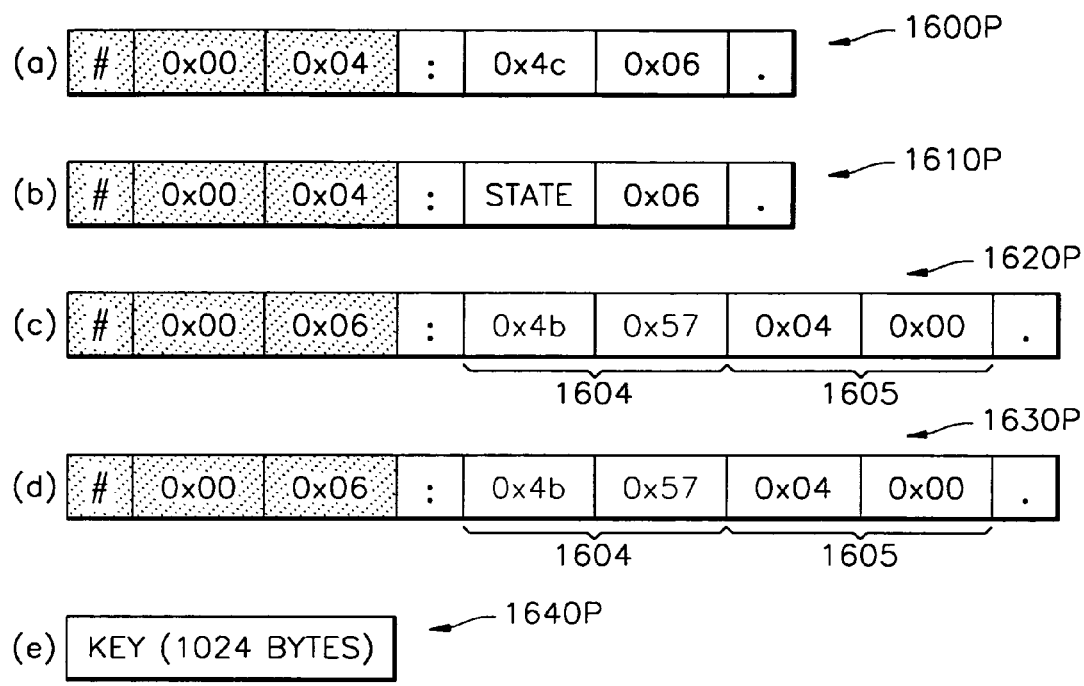
FIG. 16C shows the structure of data which are sent and received in each step of FIGS. 16A and 16B.

FIGS. 16A and 16B are simplified views of the execution order of 'register key' command according to an embodiment of the present invention, and FIG. 16C shows the structure of data which are sent and received in each step of FIGS. 16A and 16B. Here, FIG. 16A shows parallel communications, while FIG. 16B shows serial communications. In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 1600 and a start signal ACK in step 1610, the structures of packets 1600P and 1610P used in the steps 1600 and 1610 are similar to those used in FIGS. 6A and 6B. Here, the value of the next command length field is set to 0x06, which is the same as the value of the command length field in (c) packet 1620P of step 1620.

Next, the application program of the computer sends 'register key' request command or 'register key' preparation signal in the form of (c) packet 1620P of FIG. 16C to the player in step 1620. (c) packet 1620P includes the basic fields (the value of the command length field is 0x06), a 2-byte code value field 1604 having a value '0x4b57', and a 2-byte key size field 1605. The key size field 1605 indicates the byte length of a key to be sent in step 1640, and is set to 0x0400 (that is, 1024).

When the player is ready to register a key, the player returns (d) packet 1630P having the same structure and same field values as (c) packet 1620P received in the step 1620, to the computer in step 1630.

When the application program of the computer receives the same packet as (c) packet, which it sent in the step 1620, the application program sends a key 1640P, having the byte length of the value in the key size field 1605 in (c) packet 1620, to the player in step 1640.

16. Read Key

'Read key' command is a command for reading a key which is unique to the player required for reproducing a security file. Here, the key is stored in the internal memory of the player, which we have seen already.

Figure 17A:
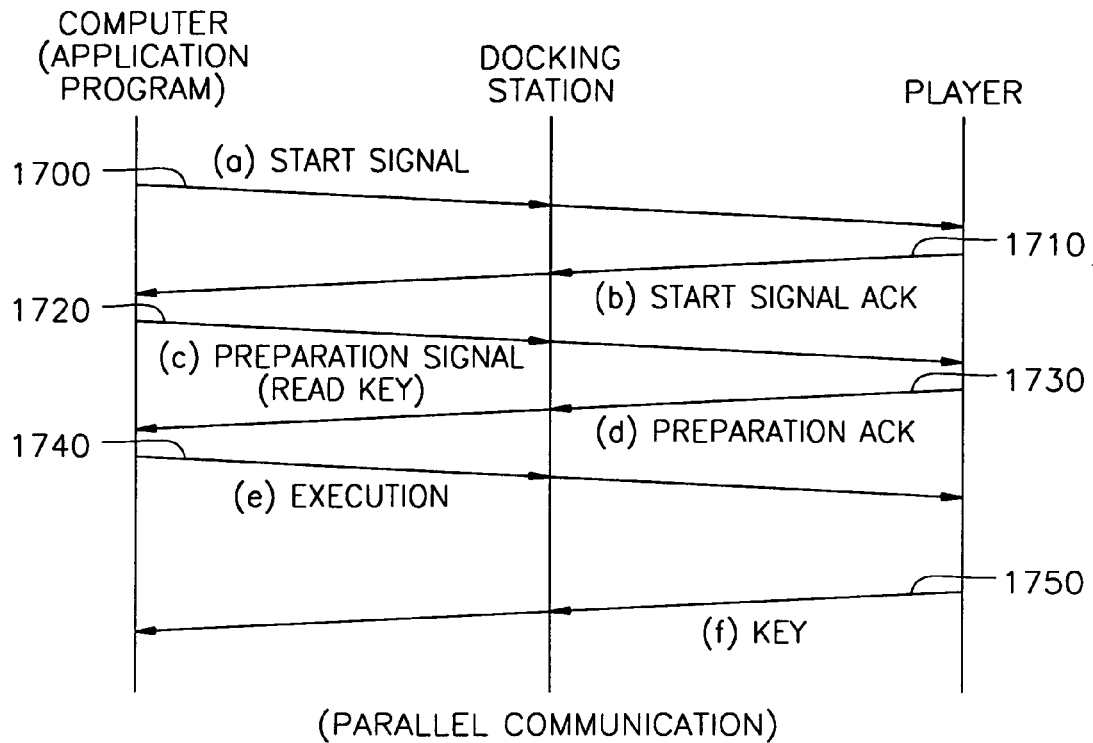
FIGS. 17A and 17B are simplified views of the execution order of 'read key' command according to an embodiment of the present invention.
Figure 17B:
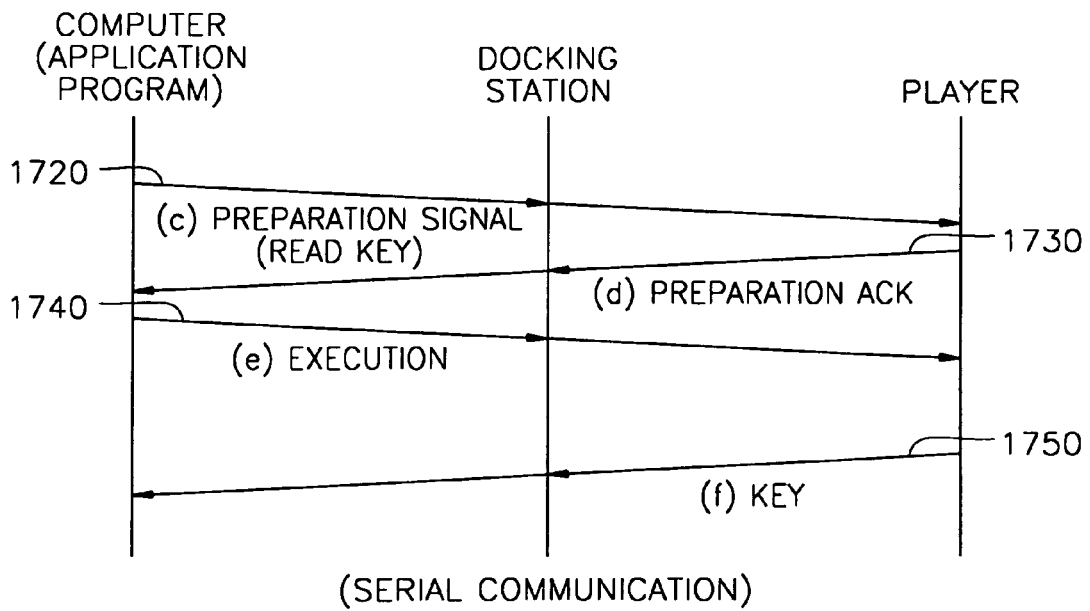
Figure 17C:
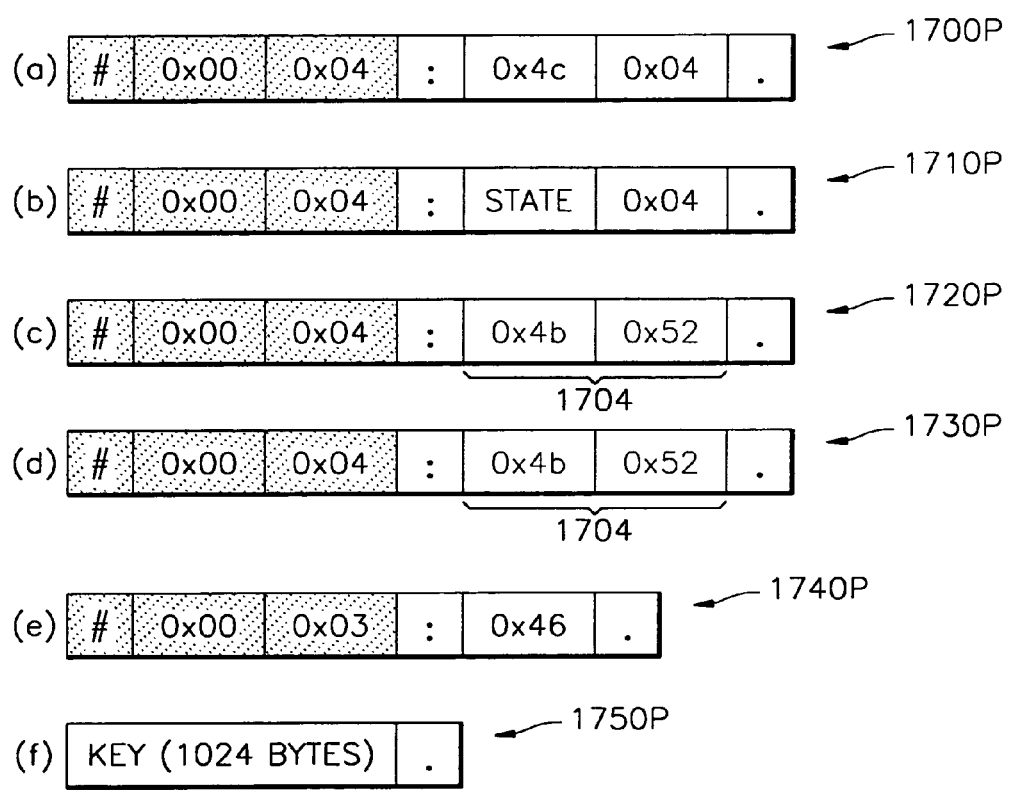
FIG. 17C shows the structure of data which are sent and received in each step of FIGS. 17A and 17B.

FIGS. 17A and 17B are simplified views of the execution order of 'read key' command according to an embodiment of the present invention, and FIG. 17C shows the structure of data which are sent and received in each step of FIGS. 17A and 17B. Here, FIG. 17A shows parallel communications, while FIG. 17B shows serial communications. In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 1700 and a start signal ACK in step 1710, the structures of packets 1700P and 1710P used in the steps 1700 and 1710 are similar to those used in FIGS. 6A and 6B. Here, the value of the next command length field is set to 0x04, which is the same as the value of the command length field in (c) packet 1720P in step 1720.

Next, the application program of the computer sends 'read key' request command or 'read key' preparation signal in the form of (c) packet 1720P of FIG. 17C to the player in step 1720. (c) packet 1720P includes the basic fields (the value of the command length field is 0x04), and a 2-byte code value field 1604 having a value '0x4b52'.

When the player is ready to send a key, the player returns (d) packet 1730P having the same structure and same field values as (c) packet 1720P received in the step 1720, to the computer in step 1730.

When the application program of the computer receives the same packet as (c) packet, which it sent in the step 1720, the application program sends an execution command, for executing 'read key' request command sent in the step 1720, in the form of (e) packet 1740P to the player in step 1740. (e) packet 1740P includes the basic fields (the value of the command length field is 0x03) and a code value field having a value '0x46'.

Finally, when the player receives the execution command, the player sends (f) packet 1750P, including a 1024-byte key and '.' separator, to the computer in step 1750.

17. Read Physical Block Data

'Read physical block data' command is a command for reading block data in a certain physical address in an internal memory or an external memory installed in the player. This command is defined for low level input/output (I/O) operation to support a card information system (CIS).

Figure 18A:
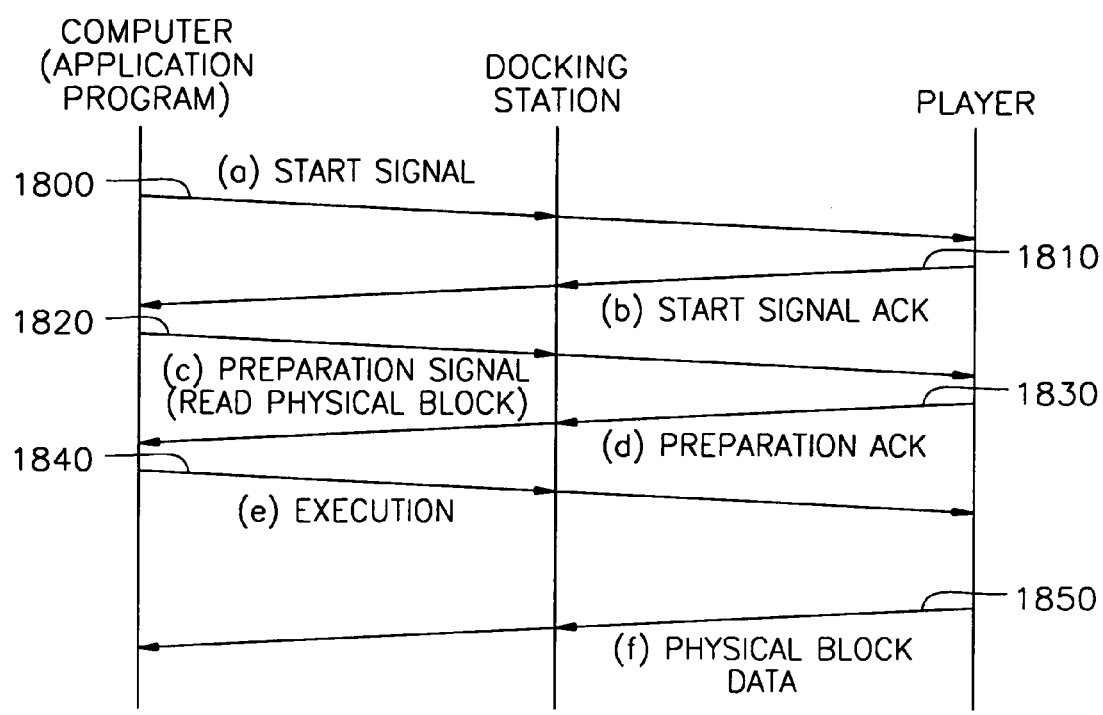
FIG. 18A is a simplified view of the execution order of 'read physical block data' command according to an embodiment of the present invention.
Figure 18B:
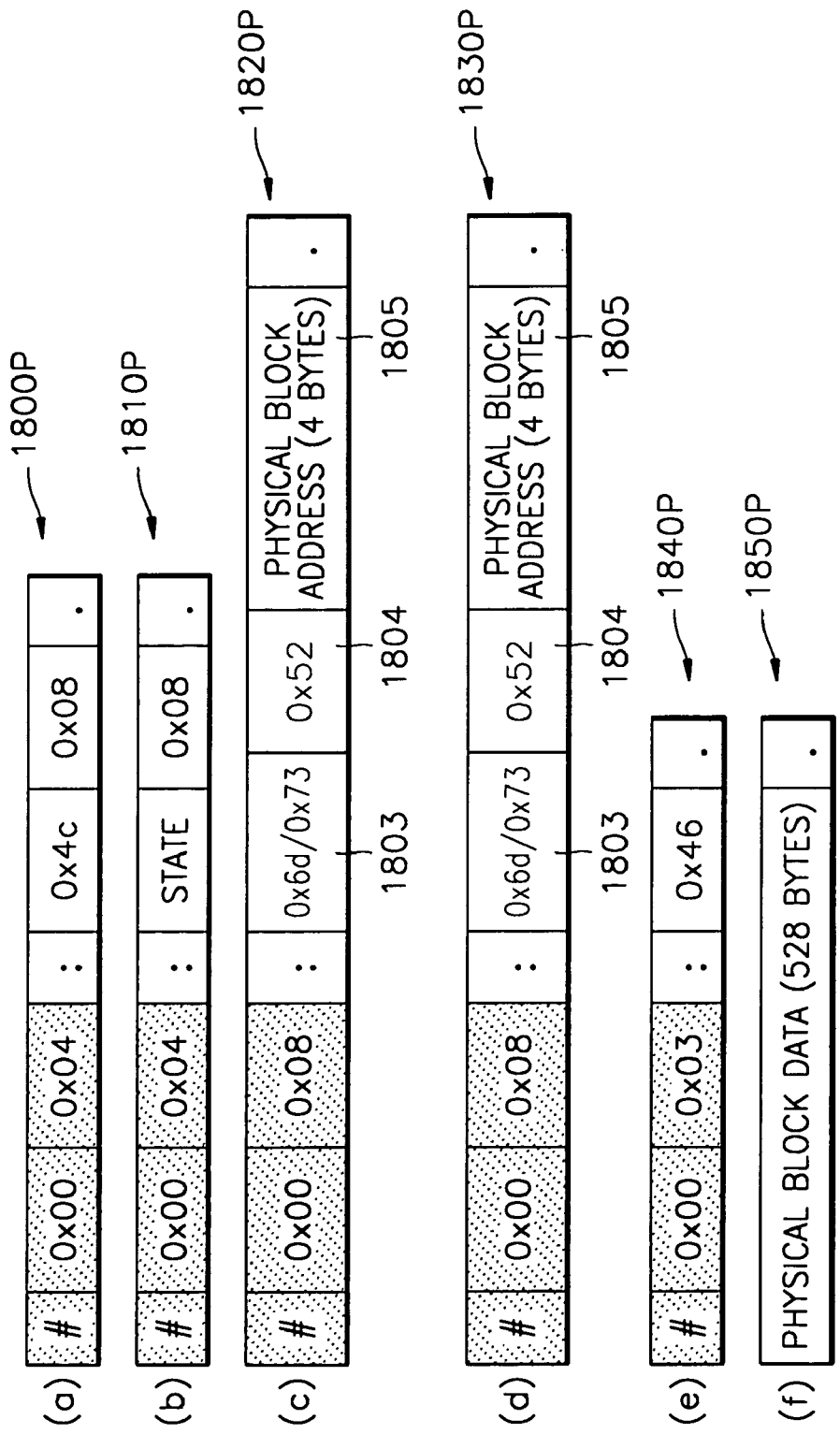
FIG. 18B shows the structure of data which are sent and received in each step of FIG. 18A.

FIG. 18A is a simplified view of the execution order of 'read physical block data' command according to an embodiment of the present invention, and FIG. 18B shows the structure of data which are sent and received in each step of FIG. 18A.

First, a start signal in step 1800 and a start signal ACK in step 1810, the structures of packets 1800P and 1810P used in the steps 1800 and 1810 are similar to those used in FIGS. 6A and 6B. Here, the value of the next command length field is set to 0x08, which is the same as the value of the command length field in (c) packet 1820P of step 1820.

Next, the application program of the computer sends 'read physical block data' request command or 'read physical block data' preparation signal in the form of (c) packet 1820P of FIG. 18C to the player in step 1820. (c) packet 1820P includes the basic fields (the value of the command length field is 0x08), a media field 1803 for indicating the type of media or memories, a code value field 1804 having a value '0x52', and a 4-byte physical block address field 1805. The value of the media field 1803 is set to 0x6d for an internal memory, and set to 0x73 for an external memory.

When the player is ready to send the corresponding physical block data, the player returns (d) packet 1830P having the same structure and same fields values as (c) packet 1820P received in the step 1820, to the computer in step 1830.

When the application program of the computer receives the same packet as (c) packet, which it sent in the step 1820, the application program sends an execution command, for executing 'read physical block data' request command sent in the step 1820, in the form of (e) packet 1840P to the player in step 1840. (e) packet 1840P includes the basic fields (the value of the command length field is 0x03) and a code value field having a value '0x46'.

Finally, when the player receives the execution command, the player sends (f) packet 1850P, including 528-byte physical block data and '.' separator indicating the end of transmission data, to the computer in step 1850.

18. Write Physical Block Data

'Write physical block data' command is a command for writing block data in a certain physical address in an internal memory or an external memory installed in the player. Like 'read physical block data' command, this command is defined for a low level I/O operation to support a CIS.

Figure 19A:
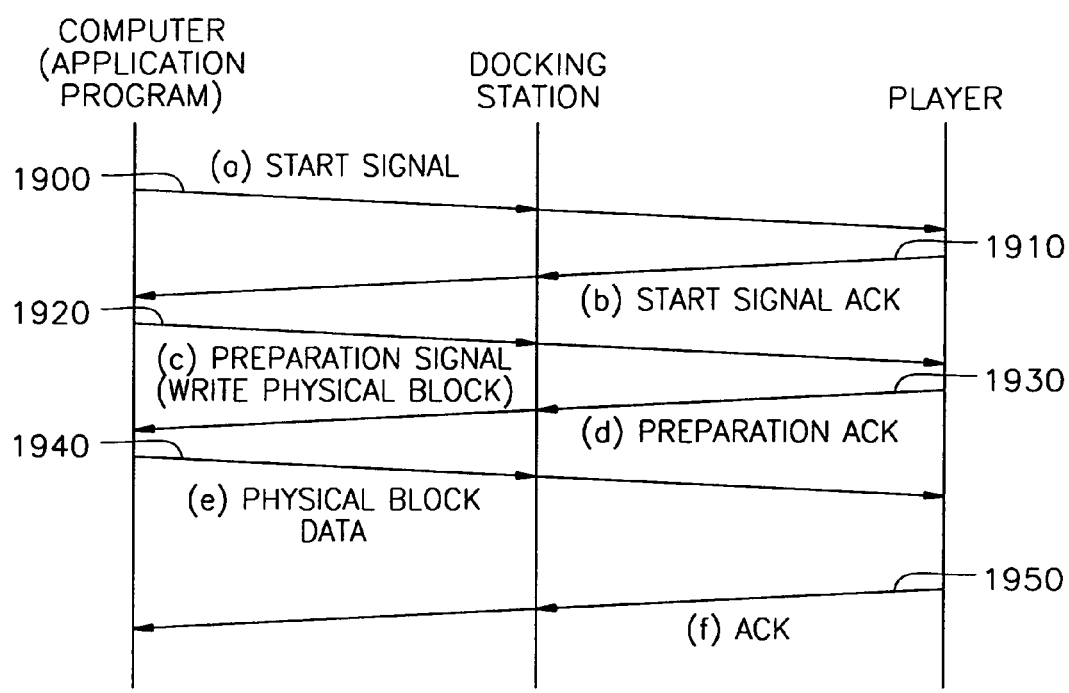
FIG. 19A is a simplified view of the execution order of 'write physical block data' command according to an embodiment of the present invention.

FIG. 19A is a simplified view of the execution order of 'write physical block data' command according to an embodiment of the present invention, and FIG. 19B shows the structure of data which are sent and received in each step of FIG. 19A.

First, a start signal in step 1900 and a start signal ACK in step 1910, the structures of packets 1900P and 1910P used in the steps 1900 and 1910 are similar to those used in FIGS. 6A and 6B. Here, the value of the next command length field is set to 0x08, which is the same as the value of the command length field in (c) packet 1920P of step 1920.

Next, the application program of the computer sends 'write physical block data' request command or 'write physical block data' preparation signal in the form of (c) packet 1920P of FIG. 19C to the player in step 1920. (c) packet 1920P includes the basic fields (the value of the command length field is 0x08), a media field 1903 for indicating the type of media or memories, a code value field 1904 having a value '0x57', and a 4-byte physical block address field 1905. The value of the media field 1903 is set to 0x6d for an internal memory, and set to 0x73 for an external memory.

When the player is ready to receive the corresponding physical block data, the player returns (d) packet 1930P having the same structure and same fields values as (c) packet 1920P received in the step 1920, to the computer in step 1930.

When the application program of the computer receives the same packet as (c) packet, which it sent in the step 1920, the application program sends (e) packet 1940P, including 528-byte physical block data and '.' separator, to the player in step 1940.

Finally, the player answers to the application program of the computer on whether or not (e) packet is normally received, by sending receiving ACK in the form of (f) packet 1950P in step 1950. (f) packet 1950P includes the basic fields (the value of the command length field is 0x03) and a field for indicating state information. The state value of the state field has the same meaning as in the Table 2.

19. Recording

'Recording' command is a command for requesting an encoder to record a voice. The encoder can be installed inside the player or exist as a separate encoding device (for example, attached to the docking station).

Figure 20A:
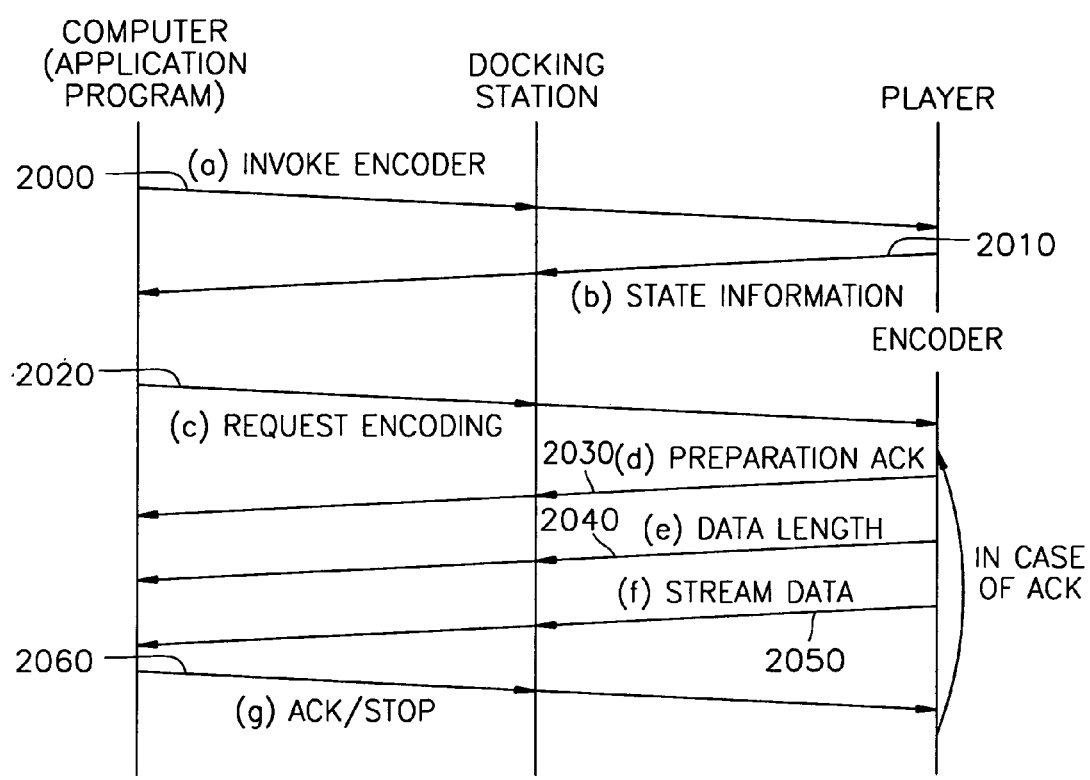
FIG. 20A is a simplified view of the execution order of 'recording' command according to an embodiment of the present invention.
Figure 20B:
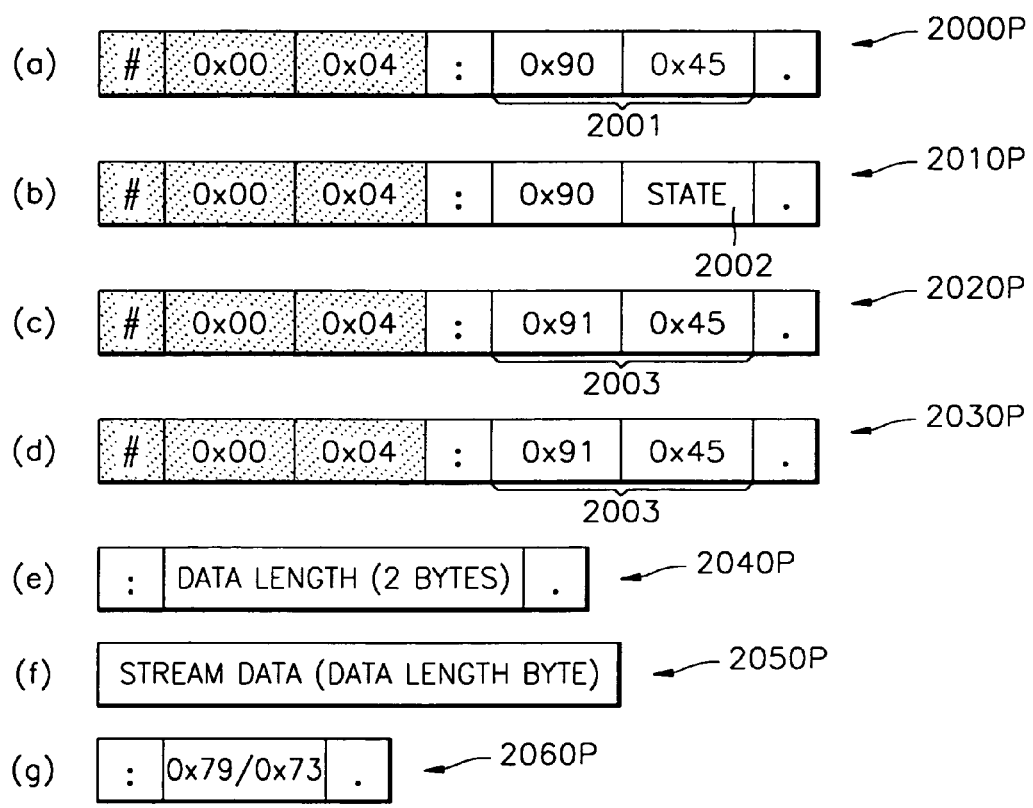
FIG. 20B shows the structure of data which are sent and received in each step of FIG. 20A.

FIG. 20A is a simplified view of the execution order of 'recording' command according to an embodiment of the present invention, and FIG. 20B shows the structure of data which are sent and received in each step of FIG. 20A.

First, in order to start encoding, the application program of the computer sends 'invoke encoder' command in the form of (a) packet 2000P of FIG. 20B to the player in step 2000. (a) packet 2000P includes the basic fields (the value of the command length field is 0x04) and a 2-byte code value field 2001 having a value '0x9045'.

When the player receives (a) packet 2000P, the player changes its communication port into a communication channel to the encoder (since then, the encoder controls the communication port), and returns state information in the form of (b) packet 2010P of FIG. 20B in step 2010. (b) packet 2010P is made by marking the success/failure state value on the second byte 2002 in the code value field 2001 in (a) packet 2000P.

When the computer receives a success state through (b) packet 2010P, after 1 second delay for stable communications with the encoder, the computer sends an encoding request command or an encoding preparation signal in the form of (c) packet 2020P through the communication port of the player to the encoder in step 2020. (c) packet 2020P includes the basic fields (the value of the command length field is 0x04) and a 2-byte code value field 2003 having a value '0x9145'.

When the encoder is ready for encoding, the encoder returns preparation ACK in the form of (d) packet 2030P of FIG. 20B to the computer in step 2030. The structure of (d) packet 2030P is the same as that of (c) packet 2020P.

Next, the encoder performs encoding and sends the data length of encoding data and encoding data to the computer in steps 2040 and 2050. The length of encoding data is sent in the form of (e) packet 2040P in step 2040. (e) packet 2040P includes ':' separator, a 2-byte data length field, and '.' separator. Here, the value of the data length field is the byte length of encoding data to be sent in step 2050. Also, the encoder sends encoding data, as much as the byte length of the value of the data length field in (e) packet 2040P, in the form of (f) packet 2050P in step 2050. However, when the value of the data length field in (e) packet 2040P is '0', it means the end of encoding and therefore, (f) packet 2050P is not sent.

After receiving the encoding data, the computer returns ACK in the form of (g) packet 2060P, to the encoder in step 2060. (g) packet 2060P includes ':' separator, an ACK/STOP field, and '.' separator. The ACK/STOP field is set to 0x79 when it means continuously performing encoding, and set to 0x73 when it means stopping encoding.

20. Make Directory

'Make directory' command is a command for making a directory in an internal memory or an external memory installed in the player, and for supporting a directory hierarchy structure.

Figure 21A:
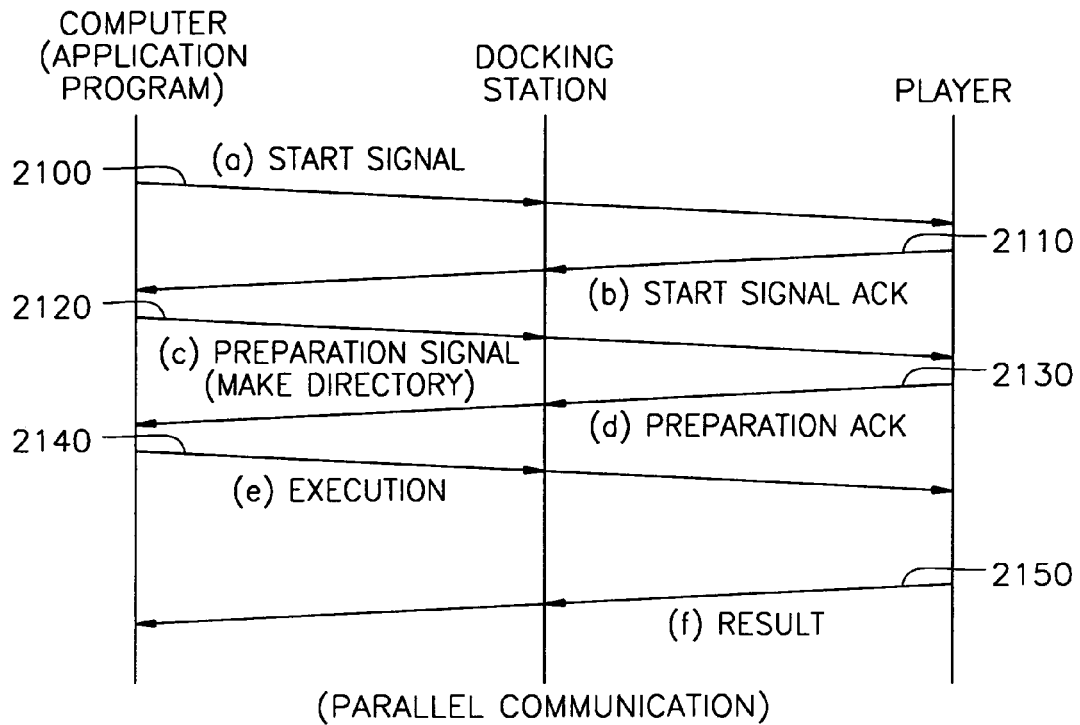
FIGS. 21A and 21B are simplified views of the execution order of 'make directory' command according to an embodiment of the present invention.
Figure 21B:
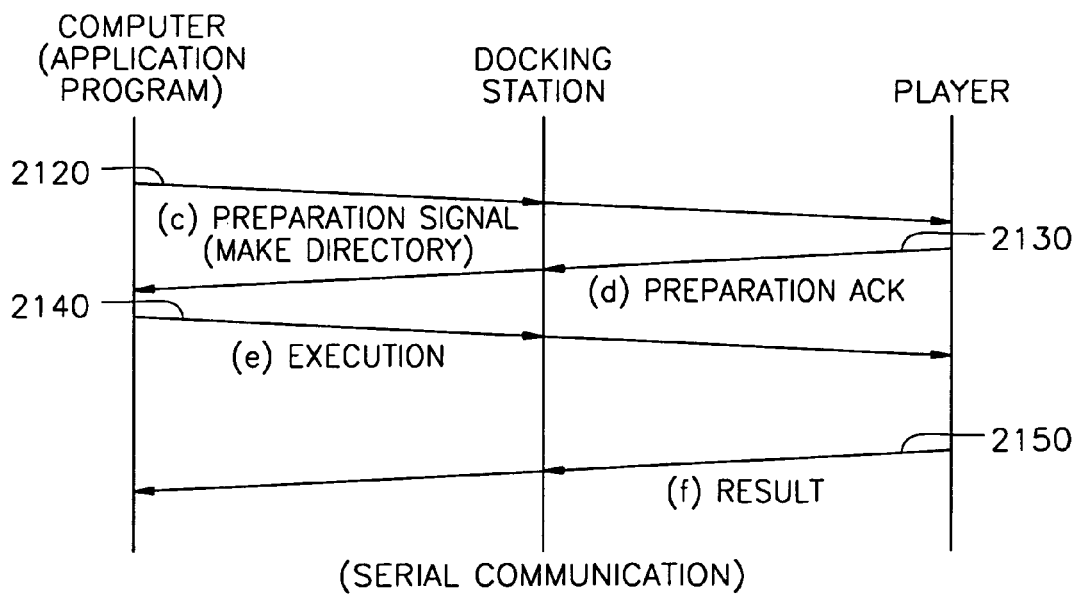
Figure 21C:
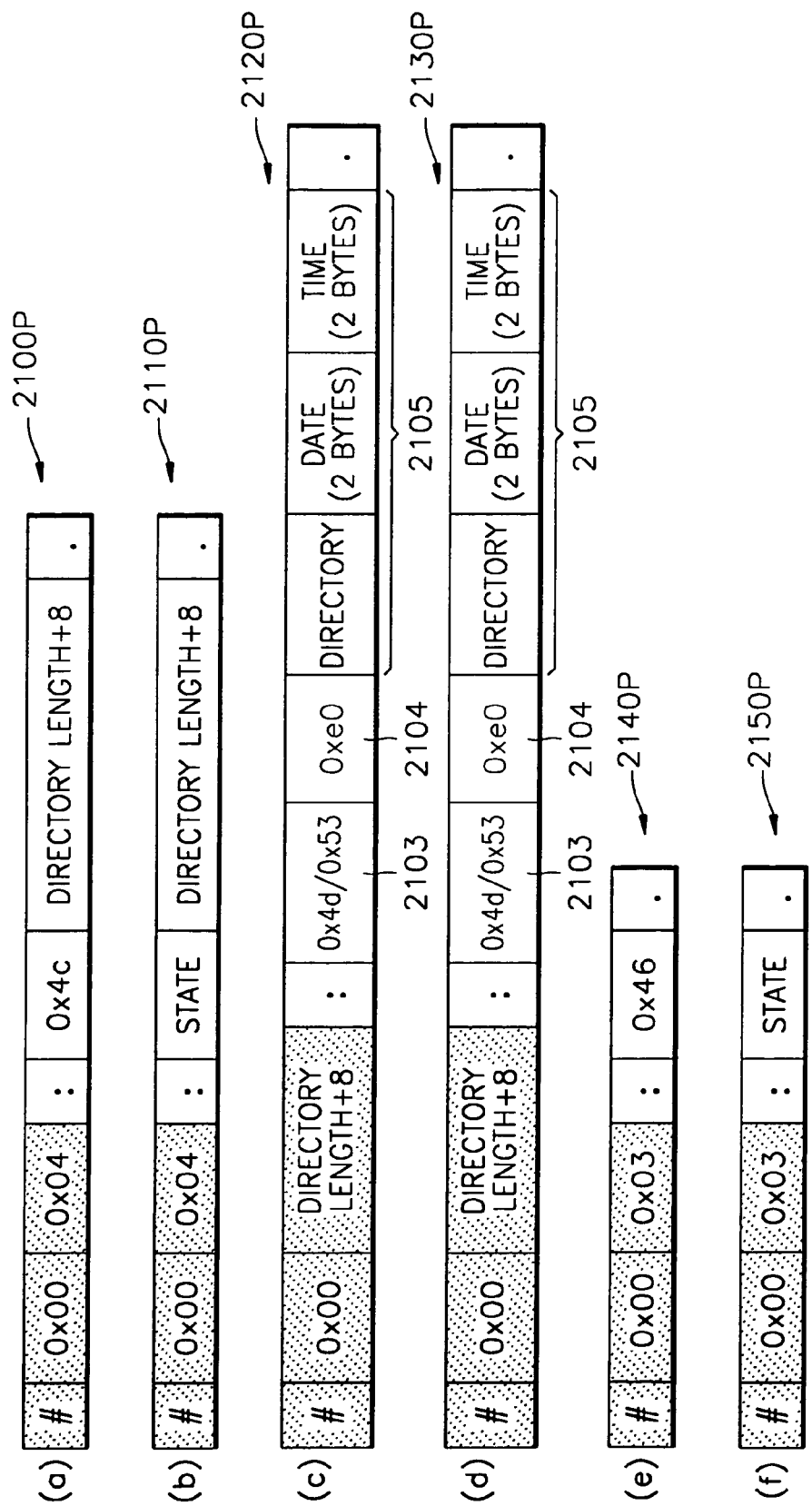
FIG. 21C shows the structure of data which are sent and received in each step of FIGS. 21A and 21B.

FIGS. 21A and 21B are simplified views of the execution order of 'make directory' command according to an embodiment of the present invention, and FIG. 21C shows the structure of data which are sent and received in each step of FIGS. 21A and 21B. Here, FIG. 21A shows parallel communications, while FIG. 21B shows serial communications. In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 2100 and a start signal ACK in step 2110, the structures of packets 2100P and 2110P used in the steps 2100 and 2110 are similar to those used in FIGS. 6A and 6B. Here, the value of the next command length field is set to a value obtained by adding 8 to the byte length of the corresponding directory name, which is the same as the value of the command length field in (c) packet 2120P in step 2120.

Next, the application program of the computers sends 'make directory' request command or 'make directory' preparation signal in the form of (c) packet 2120P of FIG. 21C to the player in step 2120. (c) packet 2120P includes the basic fields (the value of the command length field is a value obtained by adding 8 to the byte length of the corresponding directory name), a media field 2103 for indicating the type of media or memories, a code value field 2104 having a value '0xe0', and a directory information field 2105. The value of the media field 2103 is set to 0x4d for an internal memory, and set to 0x53 for an external memory. The directory information field 2105 includes the directory name, a 2-byte date, and a 2-byte time.

When the player is ready to make the corresponding directory, the player returns (d) packet 2130P having the same structure and same field values as (c) packet 2120P received in the step 2120, to the computer in step 2130.

However, when the directory cannot be made, the player returns the packet, after changing the directory name in the directory information field 2105 into characters of '?'.

When the application program of the computer receives the same packet as (c) packet, which it sent in the step 2120, the application program sends an execution command, for executing 'make directory' request command sent in the step 2120, in the form of (e) packet 2140P of FIG. 21C to the player in step 2140. (e) packet 2140P includes the basic fields (the value of the command length field is 0x03) and a code value field having a value '0x46'.

Finally, when the player receives the execution command, the player makes the corresponding directory, and returns the result in the form of (f) packet 2150P of FIG. 21C in step 2150. (f) packet 2150P includes the basic fields (the value of the command length field is 0x03), and a field for indicating state information. The state value of the state field has the same meaning as in the Table 2.

21. Delete Directory

'Delete directory' command is a command for deleting a certain directory in an internal memory or an external memory installed in the player, and for supporting a directory hierarchy structure.

Figure 22A:
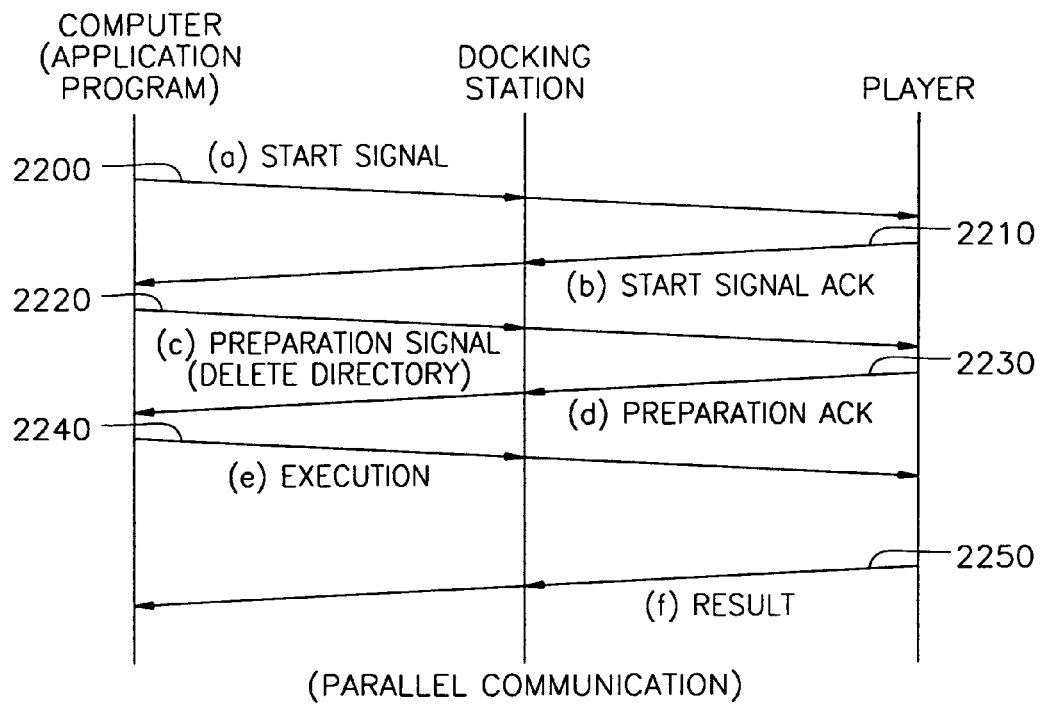
FIGS. 22A and 22B are simplified views of the execution order of 'delete directory' command according to an embodiment of the present invention.
Figure 22B:
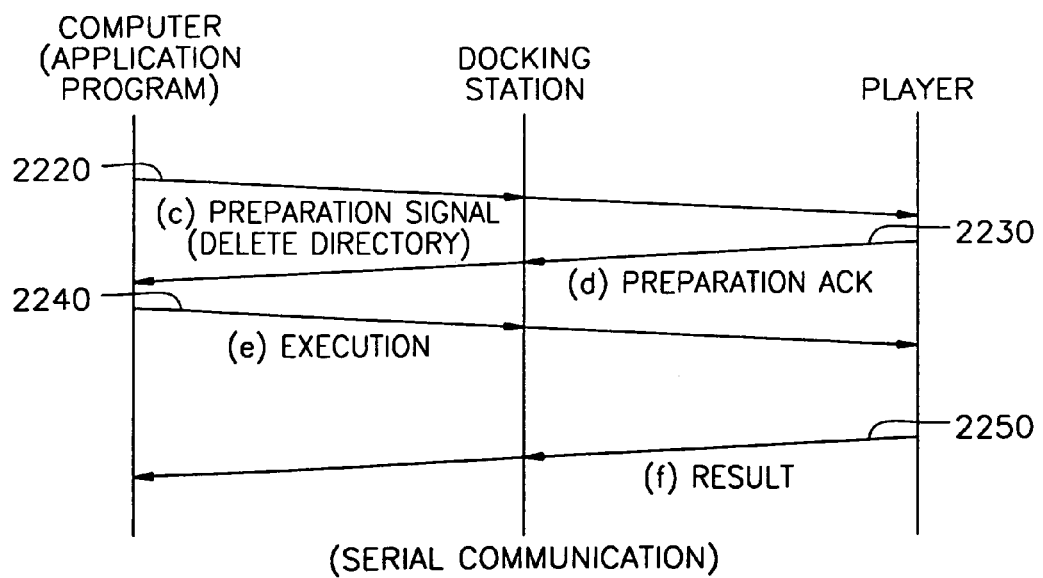

FIGS. 22A and 22B are simplified views of the execution order of 'delete directory' command according to an embodiment of the present invention, and FIG. 22C shows the structure of data which are sent and received in each step of FIGS. 22A and 22B. Here, FIG. 22A shows parallel communications, while FIG. 22B shows serial communications. In serial communications, a start signal and a start signal ACK are not sent and received. Except for these differences, serial communications have the same steps as parallel communications. Hereafter, explanation will be made focusing on parallel communications. However, a start signal and a start signal ACK can be also used in serial communications when an application needs the signals.

First, a start signal in step 2200 and a start signal ACK in step 2210, the structures of packets 2200P and 2210P used in the steps 2200 and 2210 are similar to those used in FIGS. 6A and 6B. Here, the value of the next command length field is set to a value obtained by adding 4 to the byte length of the corresponding directory name, which is the same as the value of the command length field in (c) packet 2220P in step 2220.

Next, the application program of the computers sends 'delete directory' request command or 'delete directory' preparation signal in the form of (c) packet 2220P of FIG. 22C to the player in step 2220. (c) packet 2220P includes the basic fields (the value of the command length field is a value obtained by adding 4 to the byte length of the corresponding directory name), a media field 2203 for indicating the type of media or memories, a code value field 2204 having a value '0xe1', and a directory name field 2205. The value of the media field 2203 is set to 0x4d for an internal memory, and set to 0x53 for an external memory.

When the player is ready to delete the corresponding directory, the player returns (d) packet 2230P having the same structure and same field values as (c) packet 2220P received in the step 2220, to the computer in step 2230.

When the application program of the computer receives the same packet as (c) packet, which it sent in the step 2220, the application program sends an execution command, for executing 'delete directory' request command sent in the step 2220, in the form of (e) packet 2240P of FIG. 22C to the player in step 2240. (e) packet 2240P includes the basic fields (the value of the command length field is 0x03) and a code value field having a value '0x46'.

Finally, when the player receives the execution command, the player deletes the corresponding directory, and returns the result in the form of (f) packet 2250P of FIG. 22C in step 2250. (f) packet 2250P includes the basic fields (the value of the command length field is 0x03), and a field for indicating state information. The state value of the state field has the same meaning as in the Table 2.

22. Obtain Player Information

'Obtain player information' command or 'obtain player state information' is a command for obtaining the state information and other diverse information of the player, including player's version, date, model name, key, etc.

Figure 23A:
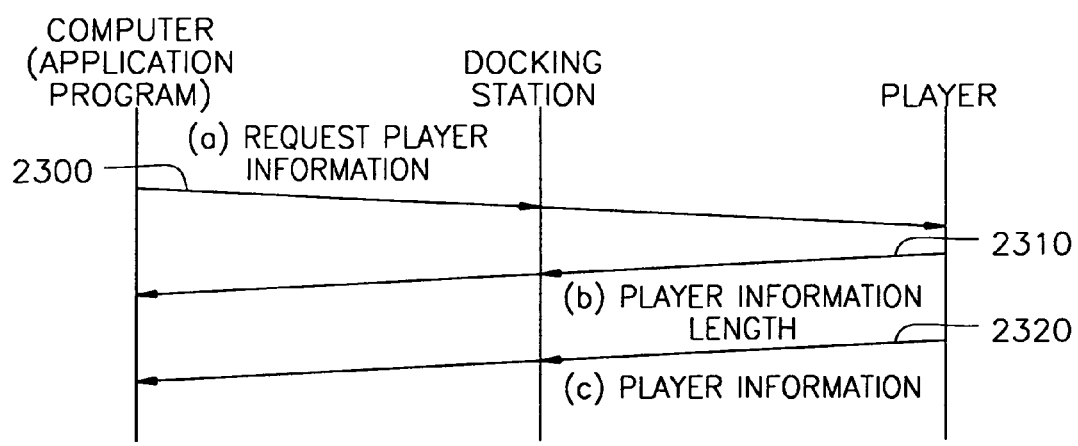
FIG. 23A is a simplified view of the execution order of 'obtain player information' command according to an embodiment of the present invention.
Figure 23B:
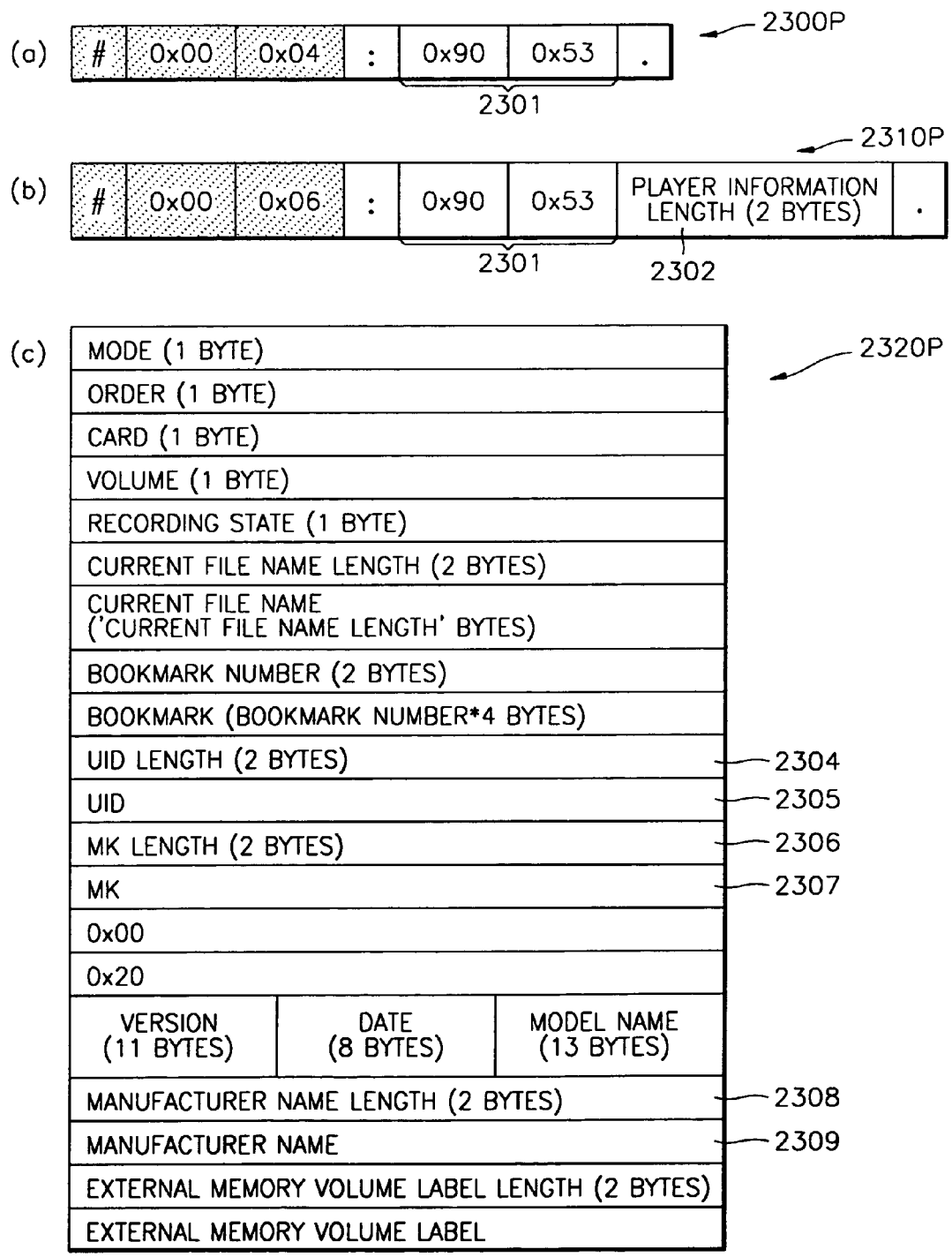
FIG. 23B shows the structure of data which are sent and received in each step of FIG. 23A.

FIG. 23A is a simplified view of the execution order of 'obtain player information' command according to an embodiment of the present invention, and FIG. 23B shows the structure of data which are sent and received in each step of FIG. 23A.

First, the application program of the computer sends a player information request command in the form of (a) packet 2300P of FIG. 23B to the player in step 2300. (a) packet 2300P includes the basic fields (the value of the command length field is 0x04), and a 2-byte code value field 2301 having a value '0x9053'.

When the player receives (a) packet 2300P of FIG. 23B from the computer, the player returns the byte length of the player information to be sent in step 2320, in the form of (b) packet 2310P of FIG. 23C in step 2310. (b) packet 2310P includes the basic fields (the value of the command length field is 0x06), a 2-byte code value field 2301 having a value '0x9053', and a 2-byte player information length field 2302. Here, the value of the player information length field 2302 is the total byte length of the player information to be sent in step 2320.

Next, the player sends the player information in the form of (c) packet 2320P to the computer in step 2320. (c) packet 2320P is just an example of player information and certain fields can be removed or new fields can be added when they are required.

Here, 'mode' represents a mode of the player, for example, an mp3 mode, an FM mode, and 'order' represents the reproducing order of the player, for example, normal, section repetition, entire repetition, arbitrary reproduction, etc. 'Card' indicates whether or not an external memory card exists, 'volume' represents the output volume or the sound loudness of the player, and 'recording state' indicates whether or not recording is currently in progress. 'Current file name length' represents the byte length of the current file name, and 'current file name' represents the file name of the currently reproducing file.

'Bookmark number' is the number of bookmarks set in a bookmark field. Since one bookmark is made of a 1-byte file number and a 3-byte time information (total 4 bytes), the total byte length of the bookmark field is a value obtained by multiplying the number of bookmarks by 4.

A user ID/unique ID (UID) length field 2304 indicates the byte length of a UID field 2305, and the UID field 2305 represents the unique identifier or key of a portable personal device. A manufacturer key (MK) length field 2306 indicates the byte length of an MK field 2307, and the MK field 2307 indicates the unique identifier or key of a manufacturer of the portable personal device.

'Version', 'date', and 'model name' are the same as described already. A manufacturer length field 2308 indicates the byte length of a manufacturer name field 2309, and the manufacturer name field 2309 represents the manufacturer name of the portable personal device. 'External memory volume label length' indicates the byte length of an external memory volume label field, and the 'external memory volume label' is the volume label of the external memory card.

Therefore, the byte length of the player information according to the embodiment is a value obtained by adding 51 to the byte lengths of the current file name, total bookmarks, the UID, the MK, the manufacturer name, and the external memory volume label.

23. Obtain Player Meta Data

'Obtain player meta data' command is a command for supporting the security function of digital contents, and it is used for obtaining information required for reproducing digital contents in which a security function is set, or for performing file download or file upload (hereinafter, referred to as meta data). The command is to support portable personal devices complying with a secure digital music initiative (SDMI) portable personal device specification.

Figure 24A:
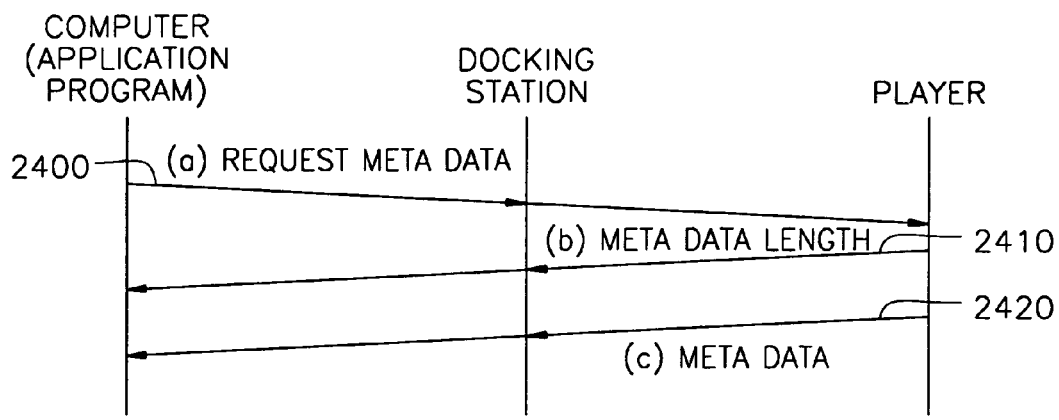
FIG. 24A is a simplified view of the execution order of 'obtain player meta data' command according to an embodiment of the present invention.
Figure 24B:
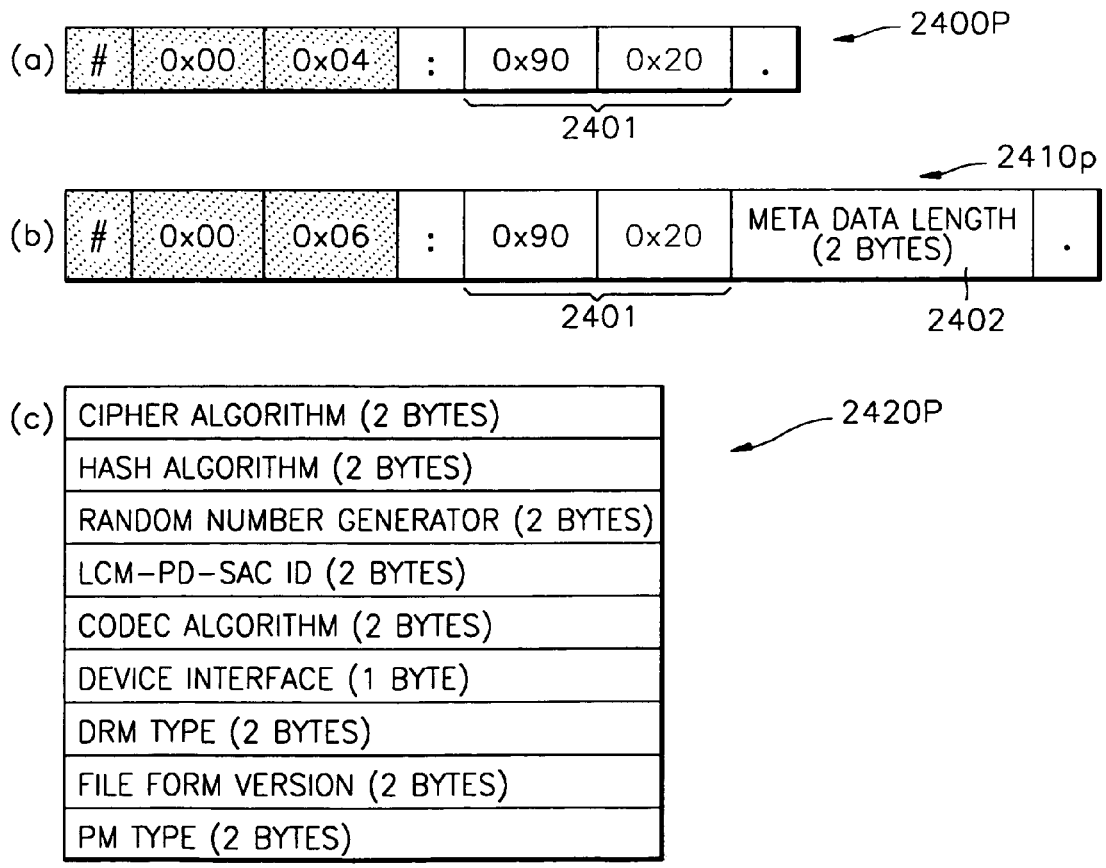
FIG. 24B shows the structure of data which are sent and received in each step of FIG. 24A.

FIG. 24A is a simplified view of the execution order of 'obtain player meta data' command according to an embodiment of the present invention, and FIG. 24B shows the structure of data which are sent and received in each step of FIG. 24A.

First, the application program of the computer sends a player meta data request command in the form of (a) packet 2400P of FIG. 24B to the player in step 2400. (a) packet 2400P includes the basic fields (the value of the command length field is 0x04), and a 2-byte code value field 2401 having a value '0x9020'.

When the player receives (a) packet 2400P of FIG. 24B, the player returns the byte length of player meta data, which is to be sent in step 2420, in the form of (b) packet 2410P of FIG. 24C in step 2410. (b) packet 2410P includes the basic fields (the value of the command length field is 0x06), a 2-byte code value field 2401 having a value '0x9020', and a 2-byte player meta data length field 2402. Here, the value of the player meta data length field 2402 is the total byte length of the player meta data to be sent in step 2420. The length of the meta data in the present embodiment is a total of 17 bytes, but it can be changed according to the necessity of applications.

Next, the player sends the player meta data in the form of (c) packet 2420P to the computer in step 2420. (c) packet 2420P is just an example of the player meta data, and required information can be changed according to the necessity of applications.

(c) packet 2420P is an example of meta data, and shows the type of a cipher algorithm, the version of a hash algorithm, the version of a random number generator, a licensed compliant module-secure authenticated channel (LCM-PD-SAC) identifier (ID), the type of codec algorithm, the type of a device interface (for example, whether it is ECP or USB), the type of digital rights management (DRM), the version of a file format, and the type of a portable memory.

24. Set Current File

'Set current file' command is used for setting or changing the location of the current file to be reproduced in the player.

Figure 25A:
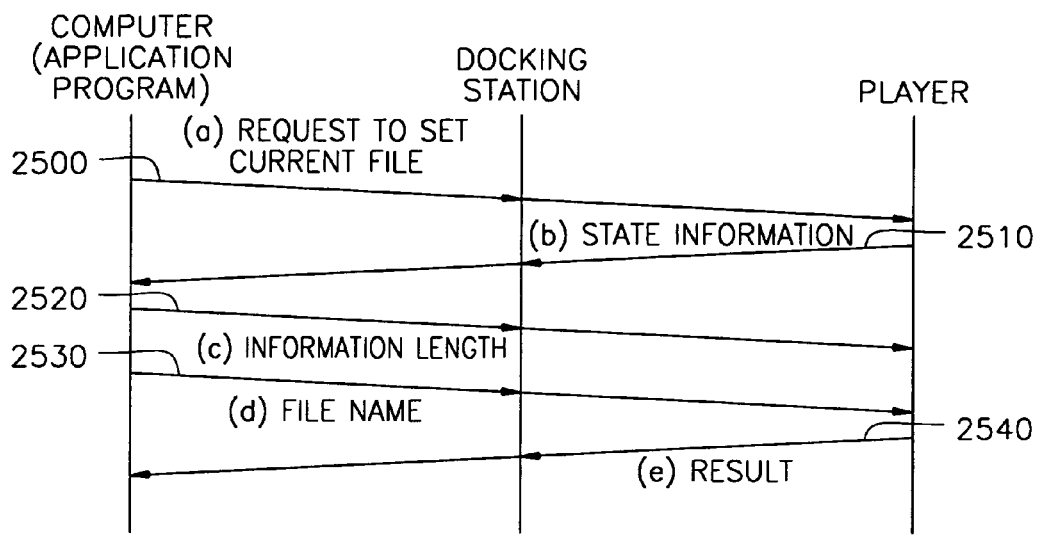
FIG. 25A is a simplified view of the execution order of 'set current file' command according to an embodiment of the present invention.
Figure 25B:
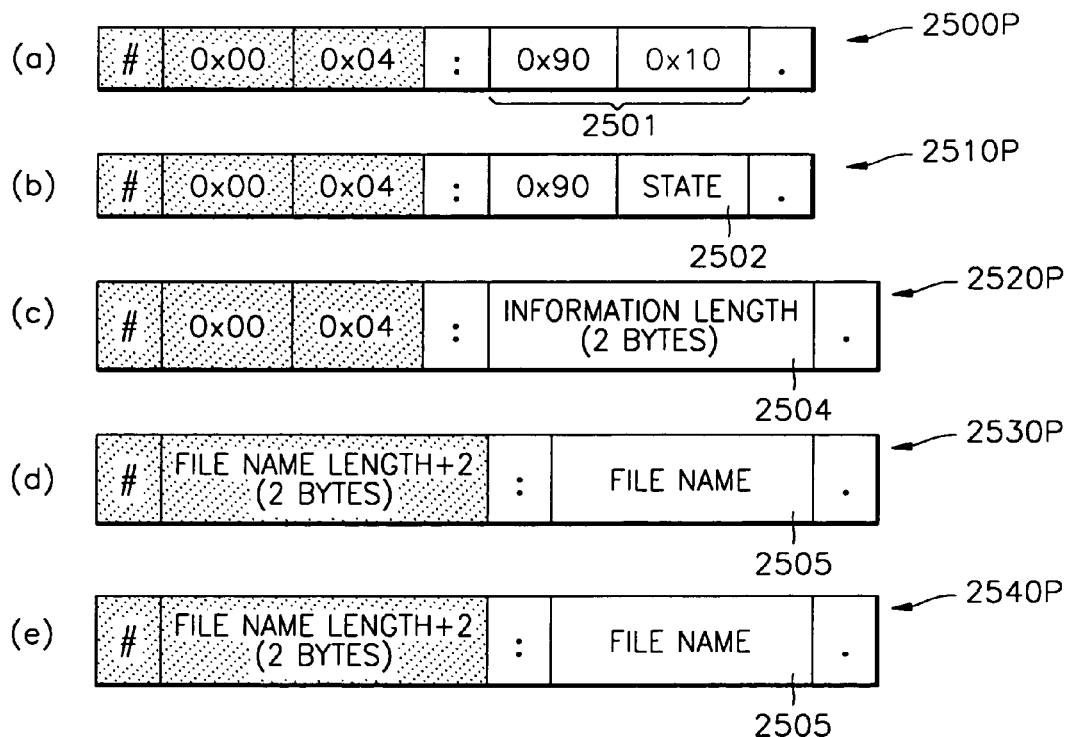
FIG. 25B shows the structure of data which are sent and received in each step of FIG. 25A.

FIG. 25A is a simplified view of the execution order of 'set current file' command according to an embodiment of the present invention, and FIG. 25B shows the structure of data which are sent and received in each step of FIG. 25A.

First, the application program of the computer sends 'set current file' request command in the form of (a) packet 2500P of FIG. 25B to the player in step 2500. (a) packet 2500P includes the basic fields (the value of the command length field is 4), and a 2-byte code value field 2501 having a value '0x9010'.

When the player is ready for setting the location of the current file, the player returns state information in the form of (b) packet 2510P of FIG. 25B in step 2510. (b) packet 2510P is a packet made by marking the success/failure state value to the second byte 2502 in the code value field 2501.

When the computer receives a success state through (b) packet 2510P, the computer sends the byte length of the information, which is to be sent in step 2530, that is, the file name, in the form of (c) packet 2520P to the player in step 2520. (c) packet 2520P includes the basic fields (the value of the command length field is 4) and a 2-byte information length field 2504. The value of the information length field 2504 is the byte length of the file name to be sent in step 2530.

Next, the computer sends the current file information in the form of (d) packet 2530P to the player in step 2530. (d) packet 2530P includes the basic fields (the value of the command length field is obtained by adding 2 to the byte length of the file name), and the file name field 2505 of the current file.

Finally, after setting the file name in the file name field 2505 in (d) packet 2530 to the current file, the player returns the result in the form of (e) packet 2540P, which has the same structure and same field values as (d) packet received in the step 2530, in step 2540. However, when setting the current file fails due to an improper file name of the file name field 2505 in (d) packet 2530, (e) packet 2540 is returned after setting the first character of the file name of the file name field 2505 of the packet to '?'.

25. Set Bookmark

'Set bookmark' command is used for setting or registering a bookmark for designating a reproducing time in the player.

Figure 26A:
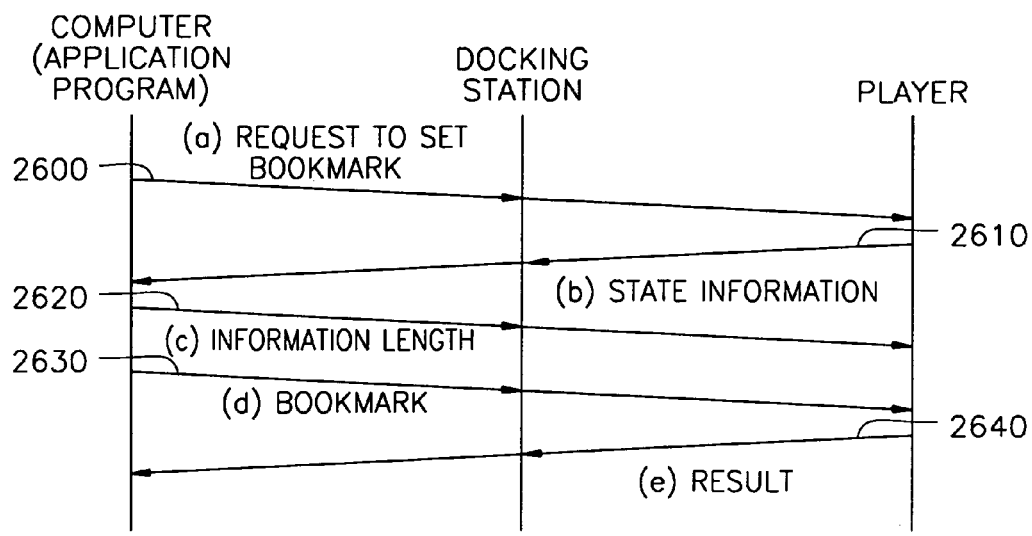
FIG. 26A is a simplified view of the execution order of 'set bookmark' command according to an embodiment of the present invention.
Figure 26B:
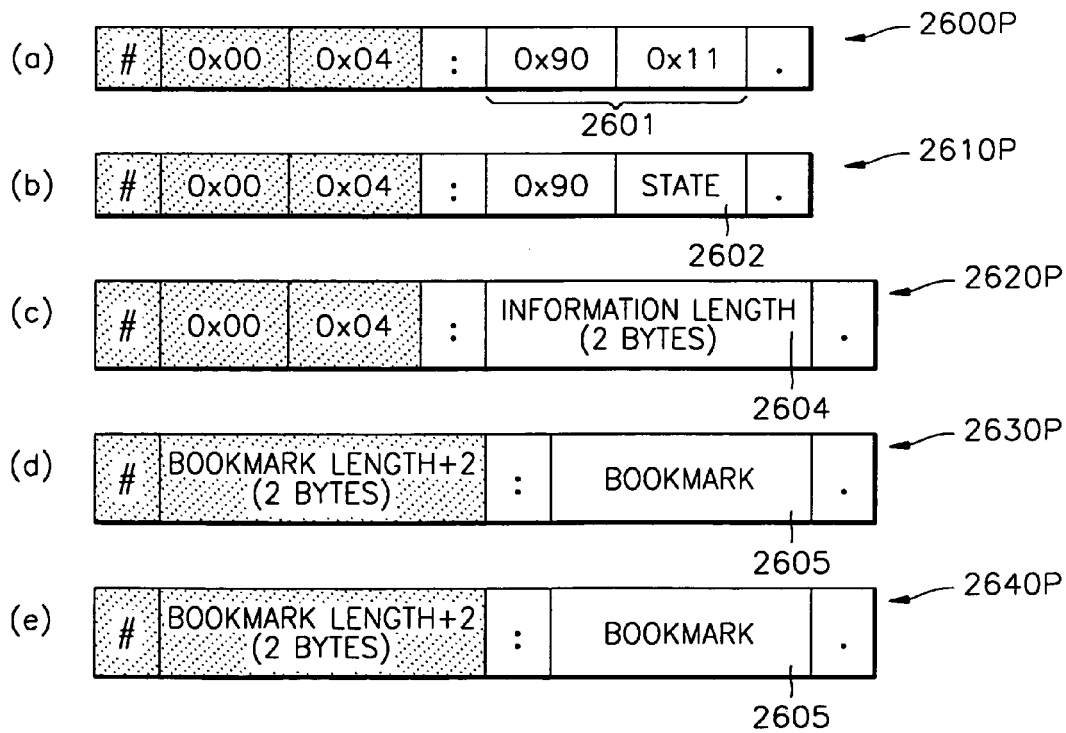
FIG. 26B shows the structure of data which are sent and received in each step of FIG. 26A.

FIG. 26A is a simplified view of the execution order of 'set bookmark' command according an embodiment of the present invention, and FIG. 26B shows the structure of data which are sent and received in each step of FIG. 26A.

First, the application program of the computer sends 'set bookmark' request command in the form of (a) packet 2600P of FIG. 26B to the player in step 2600. (a) packet 2600P includes the basic fields (the value of the command length field is 4) and a 2-byte code value field 2601 having a value '0x9012'.

When the player is ready for setting a bookmark, the player returns state information in the form of (b) packet 2610P of FIG. 26B in step 2610. (b) packet 2610P is a packet made by marking the success/failure state value to the second byte 2602 in the code value field of (a) packet 2600P.

When the computer receives a success state through (b) packet 2610P, the computer sends the byte length of the information to be sent in step 2630, that is, bookmark, in the form of (c) packet 2620P to the player in step 2620. (c) packet 2620P includes the basic fields (the value of the command length field is 4) and a 2-byte information length field 2604. The value of the information length field 2604 is the byte length of bookmark to be sent in step 2630.

Next, the computer sends bookmark information in the form of (d) packet 2630P to the player in step 2630. (d) packet 2630P includes the basic fields (the value of the command length field is a value obtained by adding 2 to the byte length of bookmark) and a bookmark field 2605. The bookmark is made of a 1-byte file number and a 3-byte time information, which we have seen already.

Finally, after registering the bookmark of the bookmark field 2605 in (d) packet 2630P, the player returns the result in the form of (e) packet 2640P, having the same structure and same field values as those of (d) packet received in the step 2630, in step 2640.

26. Set Mode

Figure 27A:
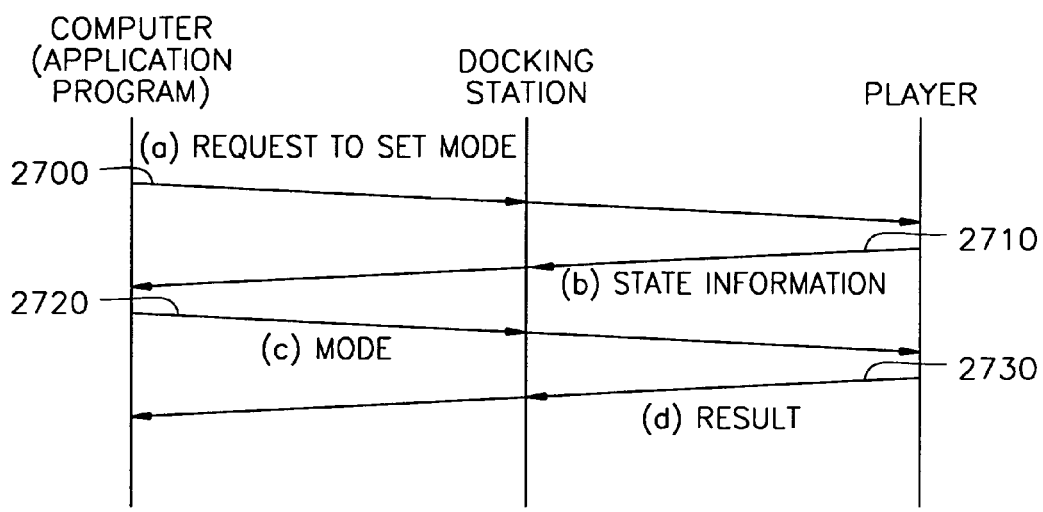
FIG. 27A is a simplified view of the execution order of 'set mode' command according to an embodiment of the present invention.

'Set mode' command is used for setting or changing the mode of the player. FIG. 27A is a simplified view of the execution order of 'set mode' command according to an embodiment of the present invention, and FIG. 27B shows the structure of data which are sent and received in each step of FIG. 27A.

Figure 27B:
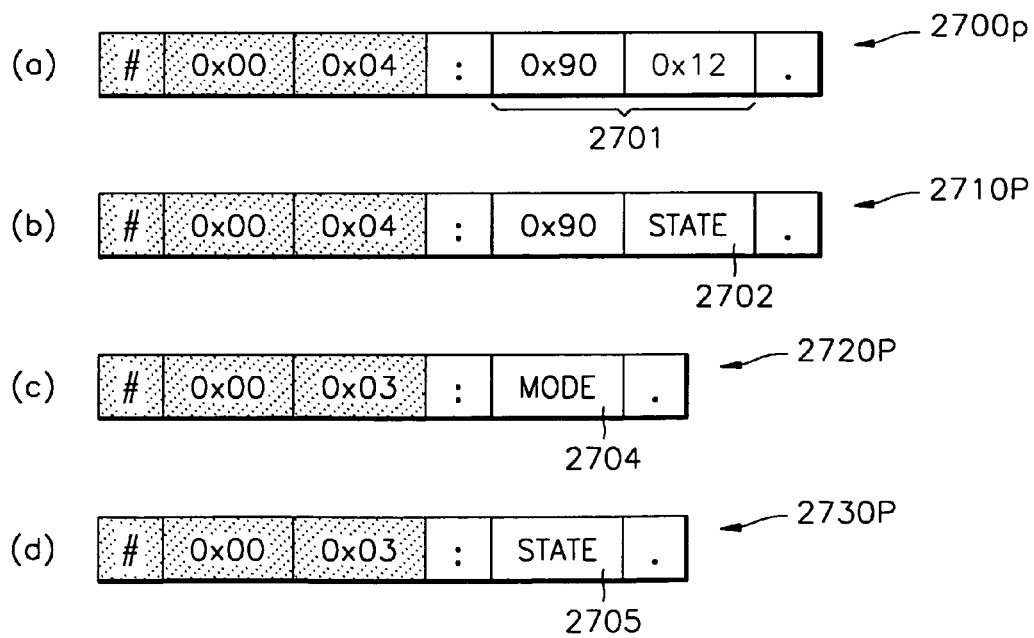
FIG. 27B shows the structure of data which are sent and received in each step of FIG. 27A.

First, the application program of the computer sends 'set mode' request command in the form of (a) packet 2700P of FIG. 27B to the player in step 2700. (a) packet 2700P includes the basic fields (the value of the command length field is 4) and a 2-byte code value field 2701 having a value '0x9012'.

When the player is ready to set a mode, the player returns state information in the form of (b) packet 2710P of FIG. 27B in step 2710. (b) packet 2710P is a packet made by marking a success/failure state value to the second byte 2702 of the code value field 2701 in (a) packet 2700P.

When the computer receives a success state through (b) packet 2710P, the computer sends mode information in the form of (c) packet 2720P to the player in step 2720. (c) packet 2720P includes the basic fields (the value of the command length field is 3) and a mode field 2704. The mode field 2704 indicates an mp3 mode, a voice mode, an FM mode, etc.

Finally, after setting the corresponding mode, the player returns the result in the form of (d) packet 2730P in step 2730. (d) packet 2730P includes the basic fields (the value of the command length field is 0x03) and a state field 2705 for indicating the success/failure value.

27. Set Play Order

'Set play order' command, or 'change play order' command is used for setting or changing a reproducing method or a reproducing order.

Figure 28A:
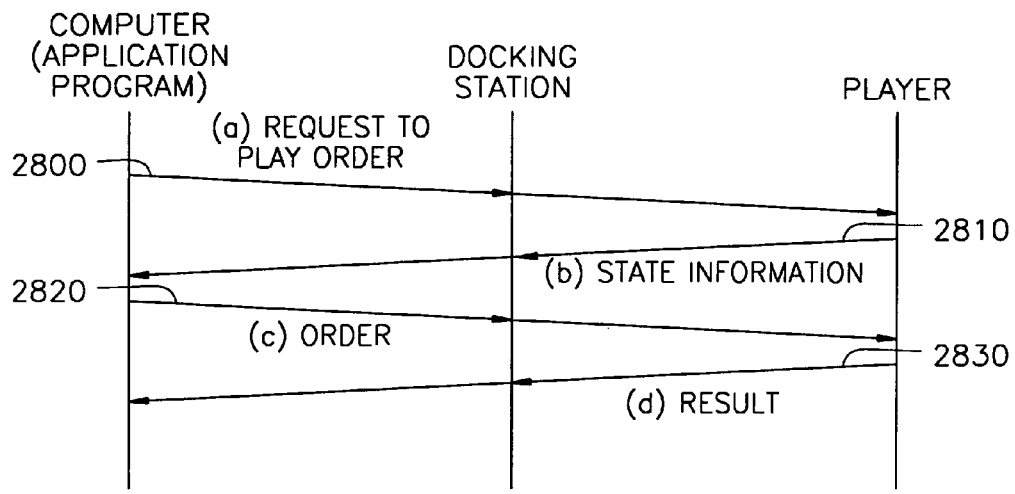
FIG. 28A is a simplified view of the execution order of 'set play order' command according to an embodiment of the present invention.
Figure 28B:
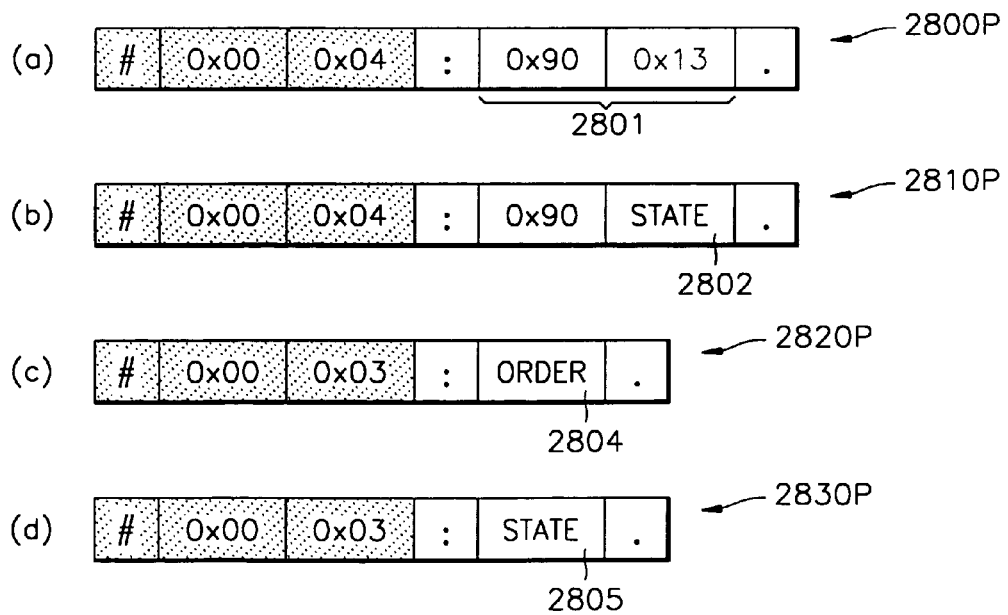
FIG. 28B shows the structure of data which are sent and received in each step of FIG. 28A.

FIG. 28A is a simplified view of the execution order of 'set play order' command according to an embodiment of the present invention, and FIG. 28B shows the structure of data which are sent and received in each step of FIG. 28A.

First, the application program of the computer sends 'set play order' request command in the form of (a) packet 2800P of FIG. 28B to the player in step 2800. (a) packet 2800P includes the basic fields (the value of the command length field is 4) and a 2-byte code value field 2801 having a value '0x9013'.

When the player is ready to set a play order, the player returns state information in the form of (b) packet 2810P of FIG. 28B in step 2810. (b) packet 2810P is a packet made by marking the success/failure state value in the second byte 2802 of the code value field 2801 in (a) packet 2800P.

When the computer receives a success state through (b) packet 2810P, the computer sends play order information in the form of (c) packet 2820P to the player in step 2820. (c) packet 2820P includes the basic fields (the value of the command length field is 3) and a play order field 2804. The play order field 2804 indicates normal reproduction, section repetition reproduction, entire repetition reproduction, arbitrary reproduction, etc.

Finally, after setting the corresponding play order method, the player returns the result in the form of (d) packet 2830P in step 2830. (d) packet 2830P includes the basic fields (the value of the command length field is 0x03) and a state field 2805 for indicating the success/failure state value.

28. Set UID

'Set UID' command is used for setting UID, one of the security keys of the player in which a security function is set, and use of the command is limited to once when a portable personal device is manufactured. Therefore, after a portable personal device is first manufactured, a UID cannot be set again.

Figure 29A:
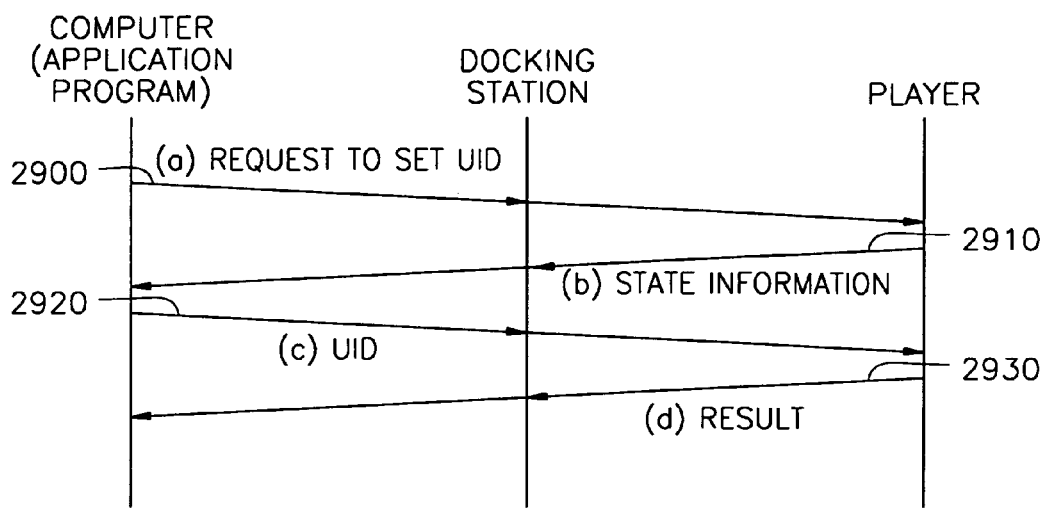
FIG. 29A is a simplified view of the execution order of 'set user ID/unique ID (UID)' command according to an embodiment of the present invention.
Figure 29B:
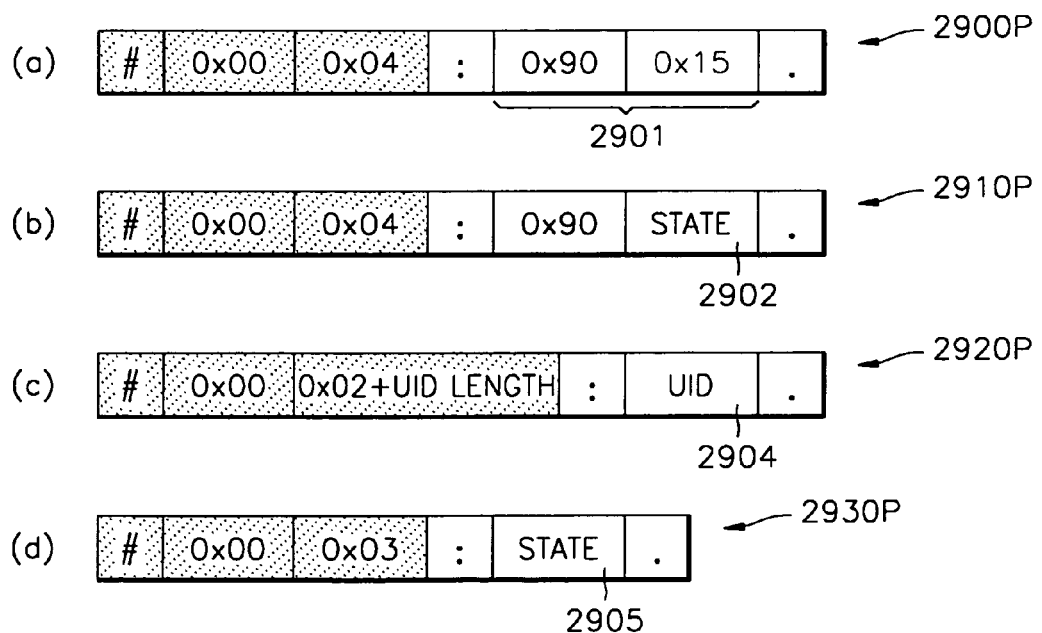
FIG. 29B shows the structure of data which are sent and received in each step of FIG. 29A.

FIG. 29A is a simplified view of the execution order of 'set user ID/unique ID (UID)' command according to an embodiment of the present invention, and FIG. 29B shows the structure of data which are sent and received in each step of FIG. 29A.

First, the application program of the computer sends 'set UID' request command in the form of (a) packet 2900P of FIG. 29B to the player in step 2900. (a) packet 2900P includes the basic fields (the value of the command length field is 4) and a 2-byte code value field 2901 having a value '0x9015'.

When the player is ready to set a UID, the player returns state information in the form of (b) packet 2910P of FIG. 29B in step 2910. (b) packet 2910P is a packet made by marking the success/failure state value in the second byte of the code value field 2901 in (a) packet 2900P.

When the computer receives a success state through (b) packet 2910P, the computer sends the UID of the portable personal device in the form of (c) packet 2920P to the player in step 2920. (c) packet 2920P includes the basic fields (the value of the command length field is a value obtained by adding 2 to the byte length of the UID) and a UID field 2904. Currently, the byte length of the UID is 128 bytes, which can change in the future according the SDMI specification.

Finally, after setting the UID, the player returns the result in the form of (d) packet 2930P in step 2930. (d) packet 2930P includes the basic fields (the value of the command length field is 0x03) and a state field 2905 indicating the success/failure state value.

29. Set Volume Label

'Set volume label' command is used for setting a volume label in a file information table of an external memory card installed in the player.

Figure 30A:
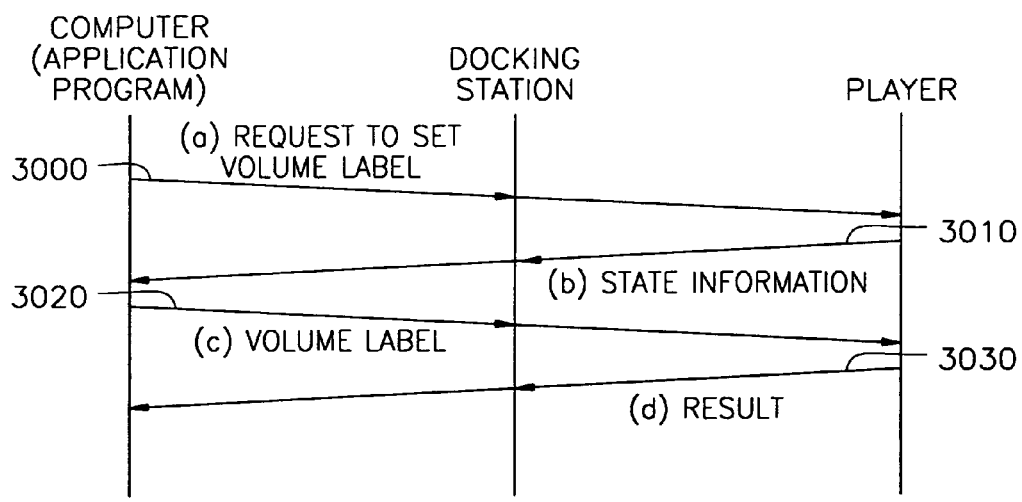
FIG. 30A is a simplified view of the execution order of 'set volume label' command according to an embodiment of the present invention.
Figure 30B:
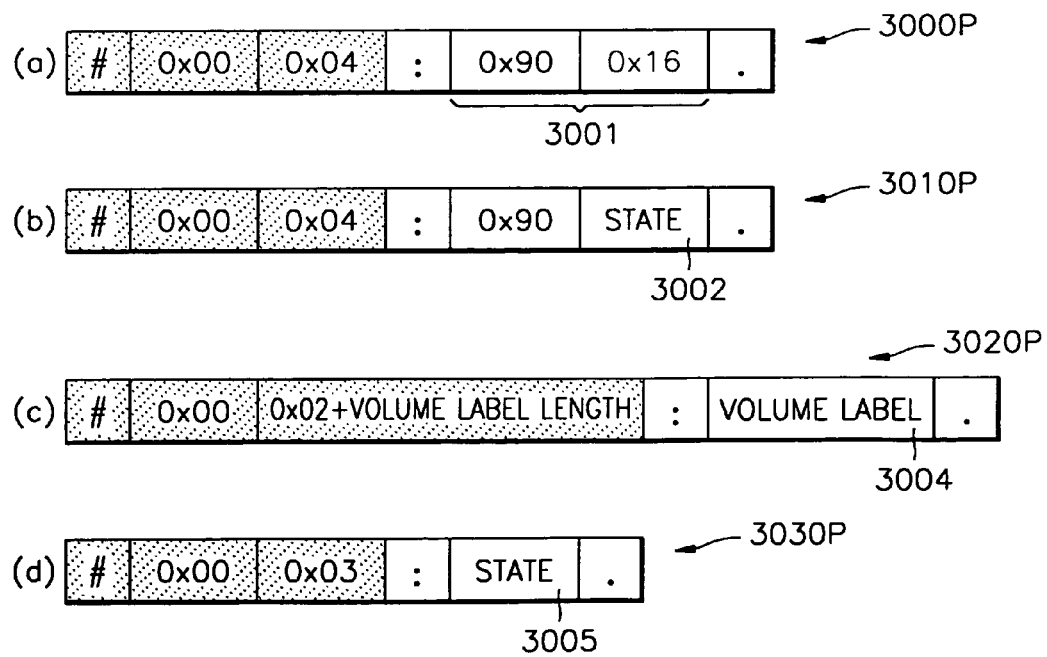
FIG. 30B shows the structure of data which are sent and received in each step of FIG. 30A.

FIG. 30A is a simplified view of the execution order of 'set volume label' command according to an embodiment of the present invention, and FIG. 30B shows the structure of data which are sent and received in each step of FIG. 30A.

First, the application program of the computer sends 'set volume label' request command in the form of (a) packet 3000P of FIG. 30B to the player in step 3000. (a) packet 3000P includes the basic fields (the value of the command length field is 4) and a 2-byte code value field 3001 having a value '0x9016'.

When the player is ready to set a volume label in a file information table on the external memory, the player returns state information in the form of (b) packet 3010P of FIG. 30P in step 3010. (b) packet 3010P is a packet made by marking the success/failure state value in the second byte 3002 of the code value field 3001 in (a) packet 3000P.

When the computer receives a success state through (b) packet 3010P, the computer sends the volume label in the form of (c) packet 3020P to the player in step 3020. (c) packet 3020P includes the basic fields (the value of the command length field is a value obtained by adding 2 to the byte length of the volume label) and a volume label field 3004.

Finally, after setting the volume label in the file information table on the external memory card, the player returns the result in the form of (d) packet 3030P in step 3030. (d) packet 3030P includes the basic fields (the value of the command length field is 0x03) and a state field 3005 for indicating the success/failure state value.

30. Set Manufacturer Key (MK)

'Set MK' command is used for setting an MK, one of the security keys in the player in which a security function is set according to the SDMI specification.

Figure 31A:
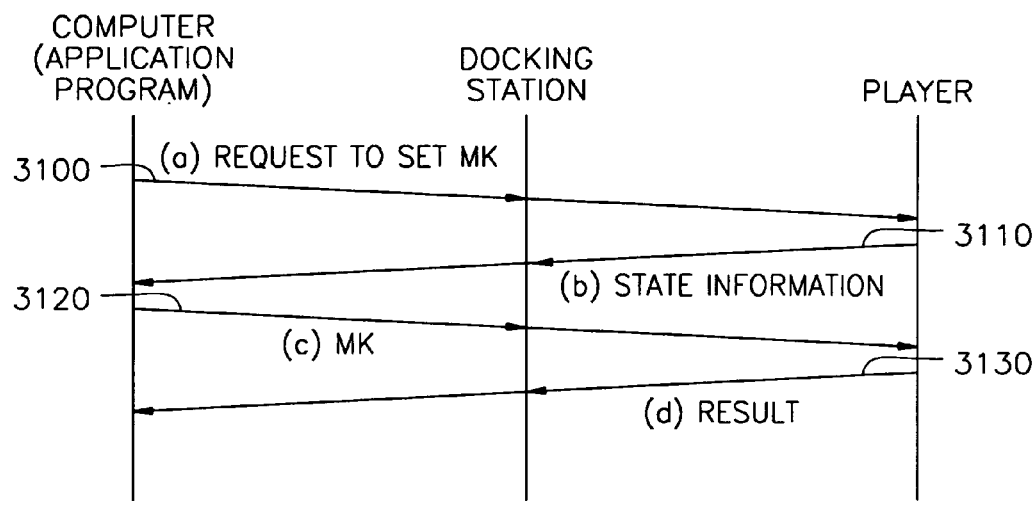
FIG. 31A is a simplified view of the execution order of 'set manufacturer key (MK)' command according to an embodiment of the present invention.
Figure 31B:
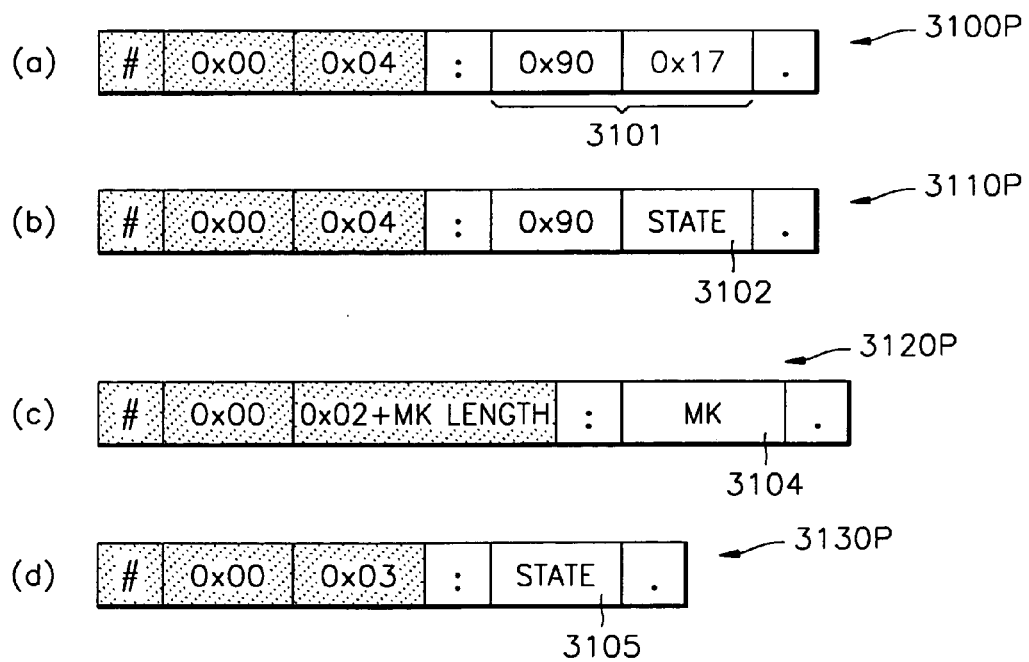
FIG. 31B shows the structure of data which are sent and received in each step of FIG. 31A.

FIG. 31A is a simplified view of the execution order of 'set manufacturer key (MK)' command according to an embodiment of the present invention, and FIG. 31B shows the structure of data which are sent and received in each step of FIG. 31A.

First, the application program of the computer sends 'set MK' request command in the form of (a) packet 3100P of FIG. 31B to the player in step 3100. (a) packet 3100P includes the basic fields (the value of the command length field is 4) and a 2-byte code value field 3101 having a value '0x9017'.

When the player is ready to set an MK, the player returns state information in the form of (b) packet 3110P of FIG. 31B in step 3110. (b) packet 3110P is a packet made by marking the success/failure state value in the second byte 3102 of the code value field 3101 of (a) packet 3100P.

When the computer receives a success state through (b) packet 3110P, the computer sends the MK of the portable personal device in the form of (c) packet 3120P to the player in step 3120. (c) packet 3120P includes the basic fields (the value of the command length field is a value obtained by adding 2 to the byte length of the MK) and an MK field 3104. Currently, the byte length of the MK is 128 bytes, which can change in the future according to the SDMI specification.

Finally, after setting the MK, the player returns the result in the form of (d) packet 3130P in step 3130. (d) packet 3130P includes the basic fields (the value of the command length field is 0x03) and a state field 3105 for indicating the success/failure state value.

31. Obtain Audible Meta Data

'Obtain audible meta data' command is used for obtaining information on a file storing audible digital contents provided by AUDIBLE Co. (hereinafter, referred to as audible meta data).

FIG. 32A is a simplified view of the execution order of 'obtain audible meta data' command according to an embodiment of the present invention, and FIG. 32B shows the structure of data which are sent and received in each step of FIG. 32A.

First, the application program of the computer sends a command requesting audible meta data of a certain file, storing audible digital contents (hereinafter, referred to as 'audible file') on an internal memory or an external memory of the player, in the form of (a) packet 3200P of FIG. 32B to the player in step 3200. (a) packet 3200P includes the basic fields (the value of the command length is a value obtained by adding 7 to the length of the audible file name), a 2-byte code value field 3201 having a value '0x9018', a media field 3202 for indicating the type of media or memories, and a file information field 3203. Here, the value of the media field 3202 is set to 0x4d for an internal memory, and set to 0x53 for an external memory. The file information field 3202 includes the file name and the byte length of the file name of the audible file. The file name basically adopts the fixed 8.3 format and an extended file name can also be used.

When the player is ready to send the audible meta data of the audible file, the player returns state information in the form of (b) packet 3210P of FIG. 32B in step 3210. (b) packet 3210P includes the basic fields (the value of the command length field is 4) and a code value field 3201 of (a)

packet 3200P, and the second byte of the code value field 3201 of (a) packet 3200P is set to a state value in Table 6.

TABLE 6

| State value | Meaning |
| --- | --- |
| 0 | Success |
| 1 | File does not exist |
| 2 | No audible meta data |
| 3 | Audible meta data damaged |

Next, in a case where the player sends a success state through (b) packet 3210P, the player sends audible meta data of the audible file in the form of (c) packet 3220P in a predetermined time-out time (for example, 3 seconds) to the computer in step 3220. (c) packet 3220P includes a 1086-byte audible meta data field 3205, a 4-byte play location field 3206 for indicating the current reproduction location in the audible file, and a 1-byte continuous play mark field 3207 for indicating whether or not to continue reproduction in the current reproduction location.

The audible meta data field 3205 includes the title (256 bytes) of digital contents stored or recorded in the audible file, a manufacturing number (80 bytes), an author name (256 bytes), a narrator name (256 bytes), etc.

32. Set a Secure Authentication Channel (SAC)

'Set SAC' command is used for setting an SAC complying with the SDMI specification between the computer and the player.

Figure 33A:
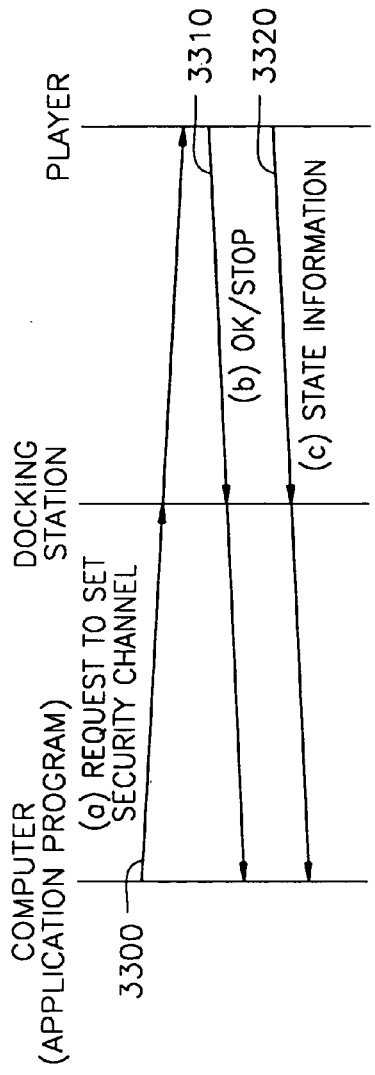
FIG. 33A is a simplified view of the execution order of 'set secured authentication channel (SAC)' command according to an embodiment of the present invention.
Figure 33B:
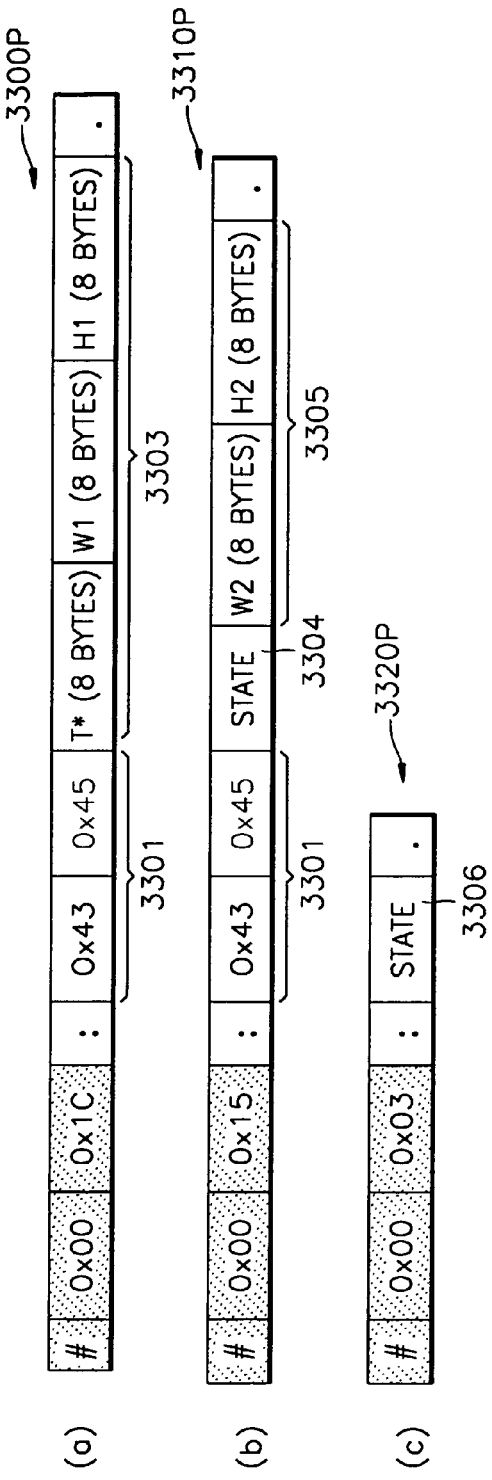
FIG. 33B shows the structure of data which are sent and received in each step of FIG. 33A.

FIG. 33A is a simplified view of the execution order of 'set SAC' command according to an embodiment of the present invention, and FIG. 33B shows the structure of data which are sent and received in each step of FIG. 33A.

First, the application program of the computer sends 'set SAC' request command in the form of (a) packet 3300P of FIG. 33B to the player in step 3300. (a) packet 3300P includes the basic fields (the value of the command length field is 0x1c), a 2-byte code value field 3301 having a value '0x4345', and an SAC parameter field 3303. 8-byte T* in the SAC parameter field 3303 is the result of ciphering through an MK and a temporary array value (T) for setting an SAC; 8-byte W1 is the ciphering result of random number generation according to value T; and 8-byte H1 is the result of a hash function.

When the player receives (a) packet 3300P, the player returns information on whether or not to continue the security verification process for setting the SAC, in the form of (b) packet 3310P in step 3310. (b) packet 3310P includes the basic fields (the value of the command length field is 0x15), a 2-byte code value field 3301 having a value '0x4345', a state information field 3304, and an SAC parameter field 3305 having 8-byte W2 and 8-byte H2. Here, when the state value of the state information field 3304 is '1', it means to continue the security verification process, while when the state value is '0', it means to stop the security verification process.

Next, in case that the player sends information, indicating to continue the security verification process, through (b) packet 3310P, the player sends information on whether or not to set the SAC in the form of (c) packet 3320P to the computer in step 3320. (c) packet 3320P includes the basic fields (the value of the command length field is 0x03) and a state field 3306 for indicating the success/failure state value.

33. Release SAC

'Release SAC' command is used for releasing an SAC set according to the SDMI specification between the computer and the player.

Figure 34A:
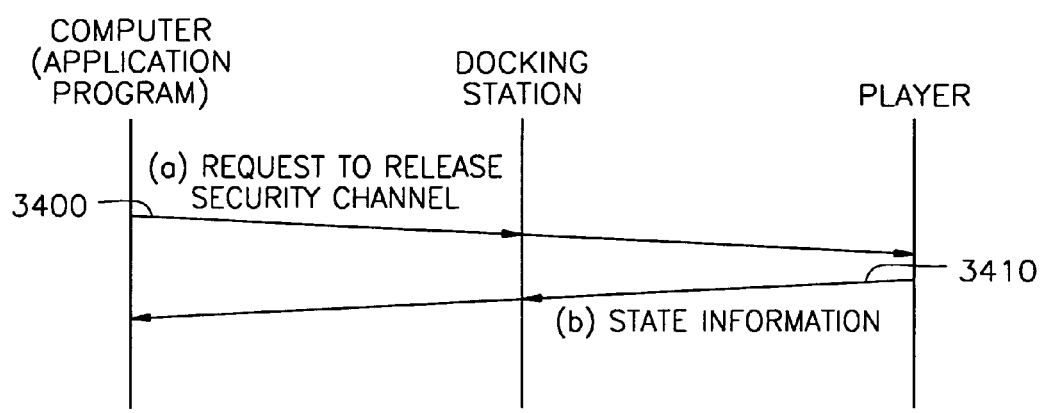
FIG. 34A is a simplified view of the execution order of 'release SAC' command according to an embodiment of the present invention.
Figure 34B:
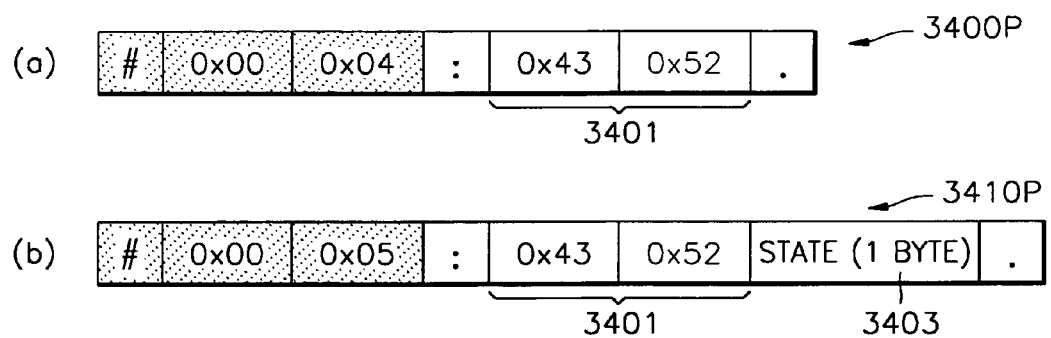
FIG. 34B shows the structure of data which are sent and received in each step of FIG. 34A.

FIG. 34A is a simplified view of the execution order of 'release SAC' command according to an embodiment of the present invention, and FIG. 34B shows the structure of data which are sent and received in each step of FIG. 34A.

First, the application program of the computer sends 'release SAC' request command in the form of (a) packet 3400P of FIG. 34B to the player in step 3400. (a) packet 3400P includes the basic fields (the value of the command length field is 0x4) and a 2-byte code field 3401 having a value '0x4352'.

When the player receives (a) packet 3400P, the player releases the SAC set between the computer and the player and returns the result in the form of (b) packet 3410P in step 3410. (b) packet 3410P includes the basic fields (the value of the command length field is 0x05), a code value field 3401 having a value '0x4352', and a state field 3403 for indicating the success/failure state value.

So far, a communication protocol for controlling a portable personal device having facilities for storing and playing digital contents by computer according to the embodiments of the present invention have been described. However, the present invention can be applied to control of ordinary external devices in addition to the portable personal device having facilities for storing and playing digital contents. As an example of controlling ordinary external devices, control of a unified audio device will now be explained.

Figure 35A:
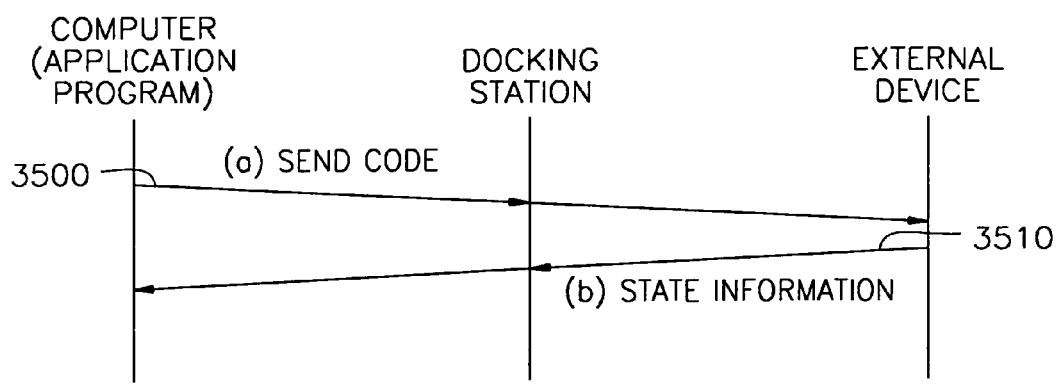
FIG. 35A is a simplified view of the execution order of control command for an integrated audio device through a computer.
Figure 35B:
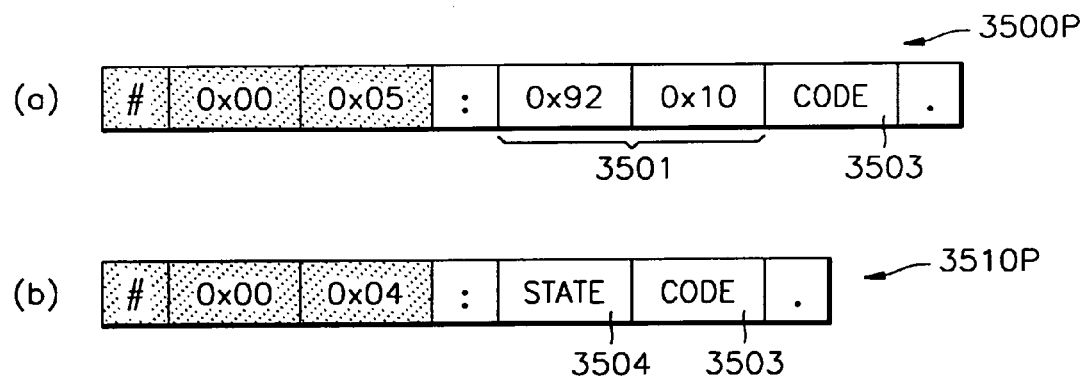
FIG. 35B shows the structure of data which are sent and received in each step of FIG. 35A.

FIG. 35A is a simplified view of the execution order of control command for an integrated audio device through a computer, and FIG. 35B shows the structure of data which are sent and received in each step of FIG. 35A.

First, the application program of the computer sends a control command for requesting an operation in the form of (a) packet 3500P of FIG. 35B to the unified audio device in step 3500. (a) packet 3500P includes the basic fields (the value of the command length field is 0x05), a 2-byte code value field 3501 having a value '0x9210', and a code field 3503 for a parameter indicating an operation of the unified audio device. The value of the code field 3503 can be set to, for example, codes in Table 7.

TABLE 7

| Code value | Meaning | Code value | Meaning |
| --- | --- | --- | --- |
| 0x01 | Power on | 0x41 | Tape/Reverse |
| 0x02 | Power off | 0x42 | Tape/Play |
| 0x03 | Volume on | 0x43 | Tape/Forward |
| 0x04 | Volume off | 0x44 | Tape/Record |
| 0x05 | CD open | 0x45 | Tape/Stop |
| 0x06 | CD close | 0x46 | Tape/Temporary stop |
| 0x10 | Controller ready | 0x61 | Tuner/− |
| 0x11 | CD ready | 0x62 | Tuner/+ |
| 0x12 | Tape ready | 0x63 | Tuner/Band |
| 0x13 | Tuner ready | 0x64 | Tuner/Tuning mode |
| 0x14 | Smart media ready | 0x81 | Smart media/Beginning |
| 0x21 | CD/Beginning | 0x82 | Smart media/End |
| 0x22 | CD/Play | 0x83 | Smart media/Play |
| 0x23 | CD/End | 0x84 | Smart media/Reverse |
| 0x24 | CD/Reverse | 0x85 | Smart media/Stop |
| 0x25 | CD/Stop | 0x86 | Smart media/Forward |
| 0x26 | CD/Temporary Stop | 0x87 | Smart media/Record |
| 0x27 | CD/Forward | 0x88 | Smart media/Temporary stop |
| 0x28 | CD/Repeat one or all | 0xa1 | Controller/Sleep |
| 0x29 | CD/Repeat A<->B | 0xa2 | Controller/Timer ON/OFF |

TABLE 7-continued

| Code value | Meaning | Code value | Meaning |
|---|---|---|---|
| 0x2a | CD/Shuffle | 0xa3 | Controller/Sound Power |
| | | 0xa4 | Controller/Surround Power |
| | | 0xa5 | Controller/Game power |

When the player receives (a) packet 3500P, the player carries out the corresponding operation, referring to the code value of the code field 3503 in (a) packet 3500P, and returns the result in the form of (b) packet 3510P in step 3510. (b) packet 3510P includes the basic fields (the value of the command length field is 0x04), a 1-byte state field 3504, and a code field 3503. The code field 3503 is the same as in (a) packet 3500P, and the state value in the state field can be set to values as shown in Table 8.

TABLE 8

| State value | Meaning |
|---|---|
| 0x00 | Success |
| 0x20 | CD not connected |
| 0x40 | Cassette not connected |
| 0x60 | Tuner not connected |
| 0x80 | Smart media not connected |
| 0xa0 | Controller not connected |

The present invention may be embodied in a general purpose digital computer by running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium.

According to the present invention, a standardized interface between a computer and a portable personal device having facilities for storing and playing digital contents through a serial or parallel cable is enabled. Therefore, time required for developing an internal communication module in a portable personal device and a communication application program in a computer can be reduced, compatibility between portable personal devices from different manufacturers can be guaranteed, and effectiveness of quality verification of a portable personal device can be enhanced.

Also, the interface between a computer and a portable personal device according to the present invention makes it easier to extend to new functions in a portable personal device and supports security functions of digital contents.

So far, the desirable embodiments of the present invention have been described. The present invention is not restricted to the above-described embodiments, and many variations are possible within the spirit and scope of the present invention, which can be easily understood by a person skilled in the field the present invention belongs to. Therefore, the scope of the present invention is not determined by the description but by the accompanying claims.

What is claimed is:

1. An operation method of a portable personal device having facilities for storing and playing digital contents by control from a computer through a serial or parallel cable, the method comprising the steps of:

(a) receiving a format request command from the computer through a serial or parallel cable for formatting an internal memory installed in the portable personal device or an external memory in an external memory card inserted from outside the portable personal device;

(b) sending from the portable personal device through a serial or parallel cable a signal indicating that the portable personal device is ready to format to the computer, when the portable personal device is ready to format;

(c) receiving an execution command from the computer through a serial or parallel cable for executing the format request command received in the step (a); and (d) formatting the corresponding memory, when the execution command is received in the step (c), and then sending the result to the computer through a serial or parallel cable, wherein the structure of the transmission data which is received or sent in the steps (a) through (d) includes a start separator character for indicating a start of transmission data, information on length of the transmission data, an intermediate separator character for indicating a start of a command code or state information, the command code or state information, and an end separator character for indicating an end of transmission data.

2. The operation method of claim 1, before the step (a) further comprising the steps of:

(e) receiving a start sub-command from the computer through a serial or parallel cable for indicating start of a new control command; and (f) sending state information of the portable personal device through a serial or parallel cable to the computer, when the sub-command is received in the step (e).

3. The operation method of claim 1 or claim 2, wherein sending and receiving data between the computer and the portable personal device through a serial or parallel cable in each step is mediated by a docking station.

4. An operation method of a portable personal device having facilities for storing and playing digital contents by control from a computer through a serial or parallel cable, the method comprising the steps of:

(a) receiving a refresh-directory request command from the computer through a serial or parallel cable for requesting a whole file information of a predetermined directory on an internal memory installed in the portable personal device or an external memory in an external memory card inserted from outside the portable personal device;

(b) sending from the portable personal device through a serial or parallel cable a signal indicating that the portable personal device is ready for refresh-directory to the computer, when the portable personal device is ready to send the whole file information of the directory;

(c) receiving an execution command from the computer through a serial or parallel cable for executing the refresh-directory request command received in the step (a); and (d) sending, when the execution command is received the step (c), file information including file name, file extension, file attribute, time, date and file size of each file in the directory, to the computer through a serial or parallel cable, wherein in the step (b), information on length of total data to be sent in the step (d) is sent together, and in the step (d), information on size of total memories and usable memories is sent together.

5. The operation method of claim 4, wherein the root directory or a sub directory can be designated as the predetermined directory.

6. The operation method of claim 4, before the step (a) further comprising the steps of:
(e) receiving a start sub-command from the computer through a serial or parallel cable for indicating a start of a new control command; and
(f) sending state information of the portable personal device to the computer through a serial or a parallel cable, when the start sub-command is received in the step (e).

7. The operation method of any one of claims 4–6, wherein sending and receiving data between the computer and the portable personal device through a serial or parallel cable in each step is mediated by a docking station.

8. The operation method of claim 7, wherein the step (d) further comprises the sub-step of:
(d1) synchronizing the docking station and the portable personal device, after receiving the execution command in the step (c), and before sending the file information.

9. An operation method of a portable personal device having facilities for storing and playing digital contents by control from a computer through a serial or parallel cable, the method comprising the steps of:
(a) receiving a file download request command from the computer through a serial or parallel cable for requesting to download a predetermined file into an internal memory installed in the portable personal device or into an external memory in an external memory card inserted from outside the portable personal device;
(b) sending to the computer through a serial or parallel cable a signal indicating that the portable personal device is ready to receive the predetermined file, when the portable personal device is ready to receive the predetermined file; and
(c) receiving the predetermined file sent on a block-by-block basis by the computer through a serial or parallel cable, wherein in the step (b) information on byte size of a unit block in the step (c) is also sent.

10. The operation method of claim 9, wherein information on the byte size of the unit block in the step (c) which is sent in the step (b) is a positive integer, and the byte size of the unit block in the step (c) is set to a value obtained by multiplying a value, which is obtained by raising 2 to the power of the positive integer, by 512.

11. The operation method of claim 9, wherein in the step (a) the file download request command includes a file name, date, time and file size of the predetermined file.

12. The operation method of claim 11, wherein an extended file name having a directory hierarchy structure can be used for the file name of the predetermined file included in the file download request command in the step (a).

13. The operation method of claim 9, wherein the step (c) further comprises the sub-steps of:
(c1) synchronizing the computer and the portable personal device before receiving the predetermined file from the computer; and
(c2) sending information on whether or not end block is normally received when each block of the predetermined file is received from the computer, except when a last block is received.

14. The operation method of claim 9, before the step (a) further comprising the steps of:

(d) receiving a start sub-command from the computer through a serial or parallel cable for indicating a start of a new control command; and
(e) sending the state information on the portable personal device through a serial or parallel cable to the computer, when the start sub-command is received in the step (d).

15. The operation method of any one of claims 9–14, wherein sending and receiving data between the computer and the portable personal device through a serial or parallel cable in each step is mediated by a docking station.

16. An operation method of a portable personal device having facilities for storing and playing digital contents by control from a computer through a serial or parallel cable, the method comprising the steps of:
(a) receiving a file download request command from the computer through a serial or parallel cable for requesting to download a predetermined file into an internal memory installed in the portable personal device or into an external memory in an external memory card inserted from outside the portable personal device;
(b) sending state information on file-receive readiness of the portable personal device to the computer through a serial or parallel cable; and
(c) receiving, when the state information on file-receive readiness sent in the step (b) indicates that the portable personal device is ready to receive a file, the predetermined file on a block-by-block basis sent by the computer through a serial or parallel cable,
wherein the file download request command in the step (a) includes file attributes, date, time, file size and name of the predetermined file, the state information on file-receive readiness in the step (b) includes information on a byte size of a unit block in the step (c), and, when a file having an identical file name to that of the predetermined file exists in the portable personal device, the state information further includes information on file size of the existing file.

17. The operation method of claim 16, wherein information on byte size of a unit block in the step (c) which is returned in the step (b) is a positive integer, and the byte size of the unit block in the step (c) is set to a value obtained by multiplying a value, which is obtained by raising 2 to the power of the positive integer, by 512.

18. The operation method of claim 16, wherein an extended file name having a directory hierarchy structure can be used for the file name of the predetermined file included in the file download request command in the step (a).

19. The operation method of claim 16, wherein the file download request command in the step (a) further includes information on a time limit in which the state information on file-receive readiness of the step (b) must be sent.

20. The operation method of claim 16, wherein the file download request command in the step (a) includes flags on whether or not the predetermined file is generated, whether or not the predetermined file is appended, whether or not the predetermined file to be received in the step (c) is to be reproduced during download, and whether or not information on a water mark to prevent copying is included.

21. The operation method of any one of claims 16–20, wherein sending and receiving data between the computer and the portable personal device through a serial or parallel cable in each step is mediated by a docking station.

22. An operation method of a portable personal device having facilities for storing and playing digital contents by control from a computer through a serial or parallel cable, the method comprising the steps of:
- (a) receiving a file upload request command from the computer through a serial or parallel cable for requesting to upload a predetermined file in an internal memory installed in the portable personal device or in an external memory in an external memory card inserted from outside the portable personal device, to the computer;
- (b) sending information on the size of the predetermined file to the computer through a serial or parallel cable, when the portable personal device is ready to upload the predetermined file to the computer; and
- (c) sending the predetermined file on a block-by-block basis to the computer through a serial or parallel cable.

23. The operation method of claim 22, wherein in the step (b) information on byte size of a unit block to be sent in the step (c) is also sent.

24. The operation method of claim 23, wherein information on the byte size of the unit block to be sent in the step (c) which is sent in the step (b) is a positive integer, and the byte size of the unit block in the step (c) is set to a value obtained by multiplying a value, which is obtained by raising 2 to the power of the positive integer, 512.

25. The operation method of claim 22, wherein an extended file name having a directory hierarchy structure can be used for the file name of the predetermined file.

26. The operation method of claim 22, before the step (a) further comprising the steps of:
- (d) receiving a start sub-command from the computer through a serial or parallel cable for indicating a start of a new control command; and
- (e) sending state information on the portable personal device to the computer through a serial or parallel cable, when the portable personal device receives the sub-command in the step (d).

27. The operation method of any one of claims 22–26, wherein sending and receiving data between the computer and the portable personal device through a serial or parallel cable in each step is mediated by a docking station.

28. The operation method of claim 22, wherein the step (c) further comprises the sub-steps of:
- (c1) receiving an execution command from the computer through a serial or parallel cable for executing the file upload request command received in the step (a), before sending the predetermined file to the computer; and
- (c2) receiving feedback corresponding to each block from the computer through a serial or parallel cable indicating whether or not the computer normally received each unit block of the predetermined file.

29. The operation method of claim 28, wherein sending and receiving data between the computer and the portable personal device through a serial or parallel cable in each step is mediated by a docking station, and the step (c1) further comprises the step of:
- (c11) synchronizing the docking station and the portable personal device, after receiving the execution command in the step (c1).

30. An operation method of a portable personal device having facilities for storing and playing digital contents by control from a computer through a serial or parallel cable, the method comprising the steps of:
- (a) receiving a file delete request command from the computer through a serial or parallel cable for requesting to delete a predetermined file in an internal memory installed in the portable personal device or in an external memory in an external memory card inserted from outside the portable personal device;
- (b) sending information indicating that the portable personal device is ready to delete the predetermined file, to the computer through a serial or parallel cable, when the portable personal device is ready to delete the predetermined file;
- (c) receiving an execution command from the computer through a serial or parallel cable for executing the file delete request command received in the step (a); and
- (d) deleting the predetermined file and sending a result to the computer through a serial or parallel cable, when the portable personal device receives the execution command in the step (c), wherein the structure of the transmission data which is received or sent in the steps (a) through (d) includes a start separator character for indicating a start of the transmission data, information on length of the transmission data, an intermediate separator character for indicating a start of a command code or state information, the command code or state information, and an end separator character for indicating an end of transmission data.

31. The operation method of claim 30, wherein an extended file name having a directory hierarchy structure can be used for the file name of the predetermined file.

32. The operation method of claim 30, wherein in the step (b), when the predetermined file does not exist in the portable personal device, the file name of the predetermined file is changed into characters of '?' and then returned to the computer.

33. The operation method of claim 30, before the step (a) further comprising the steps of:
- (e) receiving a start sub-command from the computer through a serial or parallel cable for indicating a start of a new control command; and
- (f) sending the state information of the portable personal device to the computer through a serial or parallel cable, when the portable personal device receives the start sub-command in the step (e).

34. The operation method of any one of claims 30–33, wherein sending and receiving data between the computer and the portable personal device through a serial or parallel cable in each step is mediated by a docking station.

35. An operation method of a portable personal device having facilities for storing and playing digital contents by control from a computer through a serial or parallel cable, the method comprising the steps of:
- (a) receiving a key registration request command from the computer through a serial or parallel cable for requesting to register a key to the portable personal device;
- (b) sending information indicating that the portable personal device is ready to register the key, to the computer through a serial or parallel cable, when the portable personal device is ready to register the key; and
- (c) receiving the key sent by the computer through a serial or parallel cable, wherein the key registration request command in the step (a) includes a byte length of the key.

36. The operation method of claim 35, wherein the byte length of the key included in the key registration request command in the step (a) is 1024 bytes.

37. The operation method of claim 35, before the step (a) further comprising the steps of:
- (d) receiving a start sub-command from the computer through a serial or parallel cable for indicating a start of a new control command; and (e) sending state information of the portable personal device to the computer through a serial or parallel cable, when the portable personal device receives the start sub-command in the step (d).

38. The operation method of any one of claims 35–37, wherein sending and receiving data between the computer and the portable personal device through a serial or parallel cable in each step is mediated by a docking station.

39. An operation method of a portable personal device having facilities for storing and playing digital contents by control from a computer through a serial or parallel cable, the method comprising the steps of:

(a) receiving a make-directory request command from the computer through a serial or parallel cable for requesting to make a predetermined directory in an internal memory installed in the portable personal device or in an external memory in an external memory card inserted from outside the portable personal device;

(b) sending information indicating that the portable personal device is ready to make the predetermined directory, to the computer through a serial or parallel cable, when the portable personal device is ready to make the predetermined directory;

(c) receiving an execution command from the computer through a serial or parallel cable for executing the make-directory request command received in the step (a); and (d) making the predetermined directory and sending the result to the computer through a serial or parallel cable, when the execution command is received in the step (c), wherein the structure of the transmission data which is received or sent in the steps (a) through (d) includes a start separator character for indicating a start of transmission data, information on length of the transmission data, an intermediate separator character for indicating a start of a command code or state information, the command code or state information, and an end separator character for indicating an end of transmission data.

40. The operation method of claim 39, wherein in the step (b), when the predetermined directory cannot be made, the name of the predetermined directory is changed into characters of '?' and then returned to the computer.

41. The operation method of claim 39, wherein the make-directory request command in the step (a) includes a directory name, date, and time of the predetermined directory.

42. The operation method of claim 39, before the step (a) further comprising the steps of:

(e) receiving a start sub-command from the computer through a serial or parallel cable for indicating a state of a new control command; and (f) sending state information of the portable personal device to the computer through a serial or parallel cable, when the portable personal device receives the start sub-command in the step (e).

43. The operation method of any one of claims 39–42, wherein sending and receiving data between the computer and the portable personal device through a serial or parallel cable in each step is mediated by a docking station.

44. An operation method of a portable personal device having facilities for storing and playing digital contents by control from a computer through a serial or parallel cable, the method comprising the steps of:

(a) receiving a state information request command from the computer through a serial or parallel cable for requesting the state information of the portable personal device;

(b) sending total byte length information of the state information of the portable personal device to the computer through a serial or parallel cable, when the state information request command is received in the step (a); and (c) sending the state information, including version, date, model name and security key of the portable personal device, to the computer through a serial or parallel cable.

45. The operation method of claim 44, wherein the state information sent in the step (c) further includes byte length information of the security key.

46. The operation method of claim 45, wherein the state information sent in the step (c) further includes a manufacturer key, byte length information of the manufacturer key, a manufacturer name, and byte length information of the manufacturer name.

47. The operation method of any one of claims 44–46, wherein sending and receiving data between the computer and the portable personal device through a serial or parallel cable in each step is mediated by a docking station.

48. An operation method of a portable personal device having facilities for storing and playing digital contents by control from a computer through a serial or parallel cable, the method comprising the steps of:

(a) receiving a security key registration request command from the computer through a serial or parallel cable for registering a security key in the portable personal device;

(b) sending information indicating that the portable personal device is ready to register the security key, to the computer through a serial or parallel cable, when the portable personal device is ready to register the security key;

(c) receiving the security key sent by the computer through a serial or parallel cable; and (d) sending information indicating whether or not the security key is normally received in the step (c), to the computer through a serial or parallel cable, wherein the structure of the transmission data which is received or sent in the steps (a) through (d) includes a start separator character for indicating a start of transmission data, information on length of the transmission data, an intermediate separator character for indicating a start of a command code or state information, the command code or state information, and an end separator character for indicating an end of transmission data.

49. The operation method of claim 48, wherein the security key is a proper identifier of the portable personal device.

50. The operation method of claim 48, wherein the security key is a proper identifier of a manufacturer of the portable personal device.

51. The operation method of claim 48, wherein byte length of the security key is 128 bytes.

52. The operation method of any one of claims 48–51, wherein sending and receiving data between the computer and the portable personal device through a serial or parallel cable in each step is mediated by a docking station.

53. A control method of a portable personal device having facilities for storing and playing digital contents by a computer connected to the portable personal device through a serial or parallel cable, the method comprising the steps of:

(a) sending a format request command to the portable personal device through a serial or parallel cable for formatting an internal memory installed in the portable personal device or an external memory in an external memory inserted from outside the portable personal device;

(b) receiving a response from the portable personal device through a serial or parallel cable for indicating that the portable personal device is ready for formatting;

(c) sending an execution command to the portable personal device through a serial or parallel cable for executing the format request command sent in the step (a); and (d) receiving through a serial or parallel cable a result of the execution of formatting the corresponding memory in the portable personal device, wherein the structure of transmission data which is received or sent in the steps (a) through (d) includes a start separator character for indicating a start of transmission data, information on length of the transmission data, an intermediate separator character for indicating a start of a command code or state information, the command or state information, and an end separator character for indicating an end of transmission data.

54. The control method of claim 53, before the step (a) further comprising the steps of:

(e) sending a start sub-command to the portable personal device through a serial or parallel cable for indicating a start of a new control command; and (f) receiving state information of the portable personal device from the portable personal device through a serial or parallel cable.

55. A control method of a portable personal device having facilities for storing and playing digital contents by a computer connected to the portable personal device through a serial or parallel cable, the method comprising the steps of:

(a) sending a refresh-directory request command to the portable personal device through a serial or parallel cable for requesting a whole file information of a predetermined directory in an internal memory installed in the portable personal device or an external memory in an external memory inserted from outside the portable personal device;

(b) receiving a response indicating that the portable personal device is ready to refresh the predetermined directory, from the portable personal device through a serial or parallel cable;

(c) sending an execution command to the portable personal device through a serial or parallel cable for executing the refresh-directory request command sent in the step (a);

(d) receiving file information including file name, file extension, file attributes, time, date and file size of each file in the predetermined directory, from the portable personal device through a serial or parallel cable, wherein the response received in the step (b) includes length information of a whole data to be received in the step (d), and in the step (d), information on size of a whole memory and available memory is also received.

56. The control method of claim 55, wherein the root directory or a sub-directory can be designated as the predetermined directory.

57. The control method of claim 55, before the step (a) further comprising the steps of:

(e) sending a start sub-command to the portable personal device for indicating a start of a new control command; and (f) receiving state information of the portable personal device from the portable personal device through a serial or parallel cable.

58. A control method of a portable personal device having facilities for storing and playing digital contents by a computer connected to the portable personal device through a serial or parallel cable, the method comprising the steps of:

(a) sending a file download request command to the portable personal device through a serial or parallel cable for requesting to download a predetermined file into an internal memory installed in the portable personal device or into an external memory in an external memory card inserted from outside the portable personal device;

(b) receiving a response indicating that the portable personal device is ready to receive the predetermined file, from the portable personal device through a serial or parallel cable; and (c) sending the predetermined file on a block-by-block basis to the portable personal device through a serial or parallel cable, wherein the response received in the step (b) includes byte size information of a unit block of the predetermined file to be sent in the step (c).

59. The control method of claim 58, wherein the byte size information of the unit block of the predetermined file to be sent in the step (c) which is included in response received in the step (b) is a positive integer, and the byte size of the unit block of the predetermined file to be sent in the step (c) is set to a value obtained by multiplying a value, which is obtained by raising 2 to the power of the positive integer, by 512.

60. The control method of claim 58, wherein the file download request command in the step (a) includes a file name, a date, a time and a file size of the predetermined file.

61. The control method of claim 60, wherein an extended file name having a directory hierarchy structure can be used as the file name of the predetermined file included in the file download request command in the step (a).

62. The control method of claim 58, wherein the step (c) further comprises the sub-steps of:

(c1) synchronizing the computer and the portable personal device before sending the predetermined file to the portable personal device; and (c2) receiving feedback corresponding to each block from the portable personal device through a serial or parallel cable indicating whether or not the portable personal device normally received each unit block of the predetermined file.

63. The control method of claim 58, before the step (a) further comprising the steps of:

(d) sending a start sub-command to the portable personal device through a serial or parallel cable for indicating a start of a new control command; and (e) receiving state information of the portable personal device from the portable personal device through a serial or parallel cable.

64. A control method of a portable personal device having facilities for storing and playing digital contents by a computer connected to the portable personal device through a serial or parallel cable, the method comprising the steps of:

(a) sending a file download request command to the portable personal device through a serial or parallel cable for requesting to download a predetermined file into an internal memory installed in the portable personal device or into an external memory in an external memory card inserted from outside the portable personal device;

(b) receiving state information of the portable personal device on preparation of receiving the predetermined file, from the portable personal device through a serial or parallel cable; and (c) sending the predetermined file on a block-by-block basis to the portable personal device through a serial or parallel cable, when the state information of the portable personal device, received in the step (b), indicates that the portable personal device is ready to receive the file, wherein the file download request command in the step (a) includes file attributes, date, time, file size and file name of the predetermined file, the state information of the portable personal device received in the step (b) includes byte size information of a unit block of the predetermined file to be sent in the step (c), and when a file having an identical file name to that of the predetermined file exists in the portable personal device, the state information further includes file size information of the file in the portable personal device.

65. The control method of claim 64, wherein the byte size information of the unit block of the predetermined file to be sent in the step (c), which is included in the state information of the portable personal device, received in the step (b), is a positive integer, and the byte size of the unit block of the predetermined file to be sent in the step (c) is set to a value obtained by multiplying a value, which is obtained by raising 2 to the power of the positive integer, by 512.

66. The control method of claim 64, wherein an extended file name having a directory hierarchy structure can be used as a file name of the predetermined file included in the file download request command in the step (a).

67. The control method of claim 64, wherein the file download request command in the step (a) further includes information on a time limit in which the state information of the portable personal device on preparation of receiving the file in the step (b) must be received.

68. The control method of claim 64, wherein the file download request command in the step (a) includes flags on whether or not the predetermined file is made, whether or not the predetermined file is appended, whether or not the predetermined file to be sent in the step (c) is reproduced during download, and whether or not information on a water mark to prevent copying is included.

69. A control method of a portable personal device having facilities for storing and playing digital contents by a computer connected to the portable personal device through a serial or parallel cable, the method comprising the steps of:

(a) sending a file upload request command to the portable personal device through a serial or parallel cable for requesting to upload a predetermined file in an internal memory installed in the portable personal device or in an external memory in an external memory card inserted from outside the portable personal device, to the computer;

(b) receiving file size information of the predetermined file from the portable personal device through a serial or parallel cable; and (c) receiving the predetermined file on a block-by-block basis from the portable personal device through a serial or parallel cable.

70. The control method of claim 69, wherein in the step (b), byte size information of a unit block to be received in the step (c) is also received.

71. The control method of claim 70, wherein the byte size information of the unit block to be received in the step (c) which is received in the step (b) is a positive integer, and the byte size of the unit block received in the step (c) is set to a value obtained by multiplying a value, which is obtained by raising 2 to the power of the positive integer, by 512.

72. The control method of claim 69, wherein an extended file name having a directory hierarchy structure can be used as a file name of the predetermined file.

73. The control method of claim 69, before the step (a), further comprising the steps of:

(d) sending a start sub-command to the portable personal device through a serial or parallel cable for indicating a start of a new control command; and (e) receiving state information of the portable personal device from the portable personal device through a serial or parallel cable.

74. The control method of claim 69, wherein the step (c) further comprises the steps of:

(c1) sending an execution command to the portable personal device through a serial or parallel cable for executing the file upload request command sent in the step (a), before the predetermined file is received from the portable personal device; and (c2) sending feedback corresponding to each block from the computer to the portable personal device through a serial or parallel cable on whether or not the computer normally received each unit block of the predetermined file.

75. A control method of a portable personal device having facilities for storing and playing digital contents by a computer connected to the portable personal device through a serial or parallel cable, the method comprising the steps of:

(a) sending a file delete request command to the portable personal device through a serial or parallel cable for requesting to delete a predetermined file in an internal memory installed in the portable personal device or in an external memory in an external memory card inserted from outside the portable personal device;

(b) receiving a response indicating that the portable personal device is ready to delete the predetermined file, from the portable personal device through a serial or parallel cable;

(c) sending an execution command for executing the file delete request command sent in the step (a), to the portable personal device through a serial or parallel cable; and (d) receiving a result of deleting a corresponding file in the portable personal device, through a serial or parallel cable, wherein the structure of the transmission data which is received or sent in the steps (a) through (d) includes a start separator character for indicating a start of transmission data, information on length of the transmission data, an intermediate separator character for indicating a start of a command code or state information, the command code or state information, and an end separator character for indicating an end of transmission data.

76. The control method of claim 75, wherein an extended file name having a directory hierarchy structure can be used as the file name of the predetermined file.

77. The control method of claim 75, before the step (a), further comprising the steps of:

(e) sending a start sub-command to the portable personal device through a serial or parallel cable for indicating a start of a new control command; and (f) receiving state information of the portable personal device from the portable personal device through a serial or parallel cable.

78. A control method of a portable personal device having facilities for storing and playing digital contents by a computer connected to the portable personal device through a serial or parallel cable, the method comprising the steps of:

(a) sending a state information request command to the portable personal computer through a serial or parallel cable for requesting state information of the portable personal device;

(b) receiving total byte length information of the state information of the portable personal device to be sent to the computer, from the portable personal device through a serial or parallel cable; and (c) receiving the state information including version, date, model name and security key of the portable personal device, through a serial or parallel cable.

79. The control method of claim 78, wherein the state information received in the step (c) further includes byte length information of the security key.

80. The control method of claim 79, wherein the state information received in the step (c) further includes a manufacturer key, byte length information of the manufacturer key, a manufacturer name, and byte length information of the manufacturer name.

81. A control method of a portable personal device having facilities for storing and playing digital contents by a computer connected to the portable personal device through a serial or parallel cable, the method comprising the steps of:

(a) sending a security key registration request command to the portable personal device through a serial or parallel cable for requesting to register a security key in the portable personal device;

(b) receiving a response indicating that the portable personal device is ready to register a security key, from the portable personal device through a serial or parallel cable;

(c) sending the security key to the portable personal device through a serial or parallel cable; and (d) receiving a response indicating whether or not the security key sent in the step (c) is normally received, from the portable personal device through a serial or parallel cable, wherein the structure of the transmission data which is received or sent in the steps (a) through (d) includes a start separator character for indicating a start of transmission data, information on length of the transmission data, an intermediate separator character for indicating a start of a command code or state information, the command code or state information, and an end separator character for indicating an end of transmission data.

82. The control method of claim 81, wherein the security key is a proper identifier of the portable personal device.

83. The control method of claim 81, wherein the security key is a proper identifier code of a manufacturer of the portable personal device.

84. The control method of claim 81, wherein byte length of the security key is 128 bytes.

85. An operation method of a portable personal device having facilities for storing and playing digital contents by control from a computer through a serial or parallel cable, the method comprising the steps of:

(a) receiving in the portable personal device a meta data request command from the computer through a serial or parallel cable for requesting meta data that is information required for reproducing digital contents in which a security function is set, downloading a file from the computer, or uploading a file to the computer;

(b) when the meta data request command is received in the step (a), returning total byte length information of meta data to be sent to the computer through a serial or parallel cable; and (c) sending meta data, including a type of an encryption algorithm, a type of a hash algorithm, and a version of a random number generator, used by the portable personal device, to the computer through a serial or parallel cable.

86. The operation method of claim 85, wherein sending and receiving data between the computer and the portable personal device through a serial or parallel cable in each step is mediated by a docking station.

87. An operation method of a portable personal device having facilities for storing and playing digital contents by control from a computer through a serial or parallel cable, the method comprising the steps of:

(a) receiving a security channel set request command from the computer through a serial or parallel cable for setting a security channel between the computer and the portable personal device;

(b) sending information on whether or not to continue a security inspection process for setting the security channel between the computer and the portable personal device, to the computer through a serial or parallel cable, when the security channel set request command is received in the step (a); and (c) sending information on whether or not the security channel is successfully set, to the computer through a serial or parallel cable, wherein the structure of the transmission data which is received or sent in the steps (a) through (d) includes a start separator character for indicating a start of transmission data, information on length of the transmission data, an intermediate separator character for indicating a start of a command code or state information, the command code or state information, and an end separator character for indicating an end of transmission data.

88. The operation method of claim 87, wherein sending and receiving data between the computer and the portable personal device through a serial or parallel cable in each step is mediated by a docking station.

89. An operation method of a portable personal device having facilities for storing and playing digital contents by control from a computer through a serial or parallel cable, the method comprising the steps of:

(a) receiving an audible meta data request command from the computer through a serial or parallel cable for requesting the audible meta data including title, manufacturing number, author and narrator of digital contents recorded in a predetermined file in an internal memory installed in the portable personal device or in an external memory in an external memory card inserted from outside the portable personal device;

(b) sending the state information of the predetermined file to the computer through a serial or parallel cable, when the audible meta data request command is received in the step (a); and (c) sending the audible meta data of the predetermined file to the computer through a serial or parallel cable, wherein in the step (c), a current play location and a continuous-reproduction indicator of the predetermined file are also sent.

90. The operation method of claim 89, wherein the audible meta data request command in the step (a) includes byte length information of a file name of the predetermined file, and an extended file name having a directory hierarchy structure can be used as the file name of the predetermined file.

91. The operation method of claim 89, wherein sending and receiving data between the computer and the portable personal device through a serial or parallel cable in each step is mediated by a docking station.

92. An operation method of a portable personal device having facilities for storing and playing digital contents by control from a computer through a serial or parallel cable, the method comprising the steps of:
   (a) receiving a request command from the computer through the serial or parallel cable;
   (b) sending from the portable personal device through the serial or parallel cable a signal indicating that the portable personal device is ready to execute the request command to the computer, when the portable personal device is ready to execute the request command;
   (c) receiving an execution command from the computer through the serial or parallel cable for executing the request command received in step (a); and
   (d) executing the request command, when the execution command is received in step (c), and then sending the result to the computer through the serial or parallel cable.

93. The operation method of claim 92, wherein the request command is a format request command, a refresh-directory request command, a file download request command, a file upload request command, a file delete request command, a key registration request command, a make-directory request command, a state information request command, or a secret key registration request command.

94. A control method of a portable personal device having facilities for storing and playing digital contents by a computer connected to the portable personal device through a serial or parallel cable, the method comprising the steps of:
   (a) sending a request command to the portable personal device through the serial or parallel cable;
   (b) receiving a response from the portable personal device through the serial or parallel cable for indicating that the portable personal device is ready to execute the request command;
   (c) sending an execution command to the portable personal device through the serial or parallel cable for executing the request command sent in step (a); and
   (d) receiving through the serial or parallel cable a result of the execution in the portable personal device.

95. The control method of claim 94, wherein the request command is a format request command, a refresh-directory request command, a file download request command, a file upload request command, a make-directory request command, a state information request command, or a secret key registration request command.

* * * * *